United States Patent
Huang et al.

(10) Patent No.: US 12,436,599 B1
(45) Date of Patent: Oct. 7, 2025

(54) SYSTEMS FOR ENABLING QUICK INTERACTIONS WITH A USER'S FREQUENT CONTACTS FROM WITHIN A WATCH-FACE USER INTERFACE OF A WRIST-WEARABLE DEVICE AND METHODS OF USE THEREOF

(71) Applicant: META PLATFORMS TECHNOLOGIES, LLC, Menlo Park, CA (US)

(72) Inventors: Willy Huang, San Francisco, CA (US); Yana Azova, Brooklyn, NY (US); Christine Eun, Menlo Park, CA (US); Paul Hamilton, Brooklyn, NY (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 96 days.

(21) Appl. No.: 18/164,544

(22) Filed: Feb. 3, 2023

Related U.S. Application Data

(60) Provisional application No. 63/307,623, filed on Feb. 7, 2022.

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G06F 1/163* (2013.01); *G06F 3/0482* (2013.01);
(Continued)

(58) Field of Classification Search
CPC .................................................. G06F 3/048–05
See application file for complete search history.

(56) References Cited

U.S. PATENT DOCUMENTS 8,860,674 B2  10/2014  Lee et al.
9,952,433 B2  4/2018  Um et al.
(Continued)

FOREIGN PATENT DOCUMENTS

CN  108881778 A  11/2018
KR  20150094197 A  8/2015
WO  0055978 A1  9/2000

OTHER PUBLICATIONS

Invitation to Pay Additional Fees for International Application No. PCT/US2023/012510 mailed May 23, 2023, 12 pages.
(Continued)

*Primary Examiner* — Gabriel Mercado
(74) *Attorney, Agent, or Firm* — Morgan, Lewis & Bockius LLP

(57) ABSTRACT

Systems and methods are provided for enabling quick interactions with a user's frequent contacts from a wrist-wearable device. The method includes displaying, at a wrist-wearable device, a user interface including a plurality of representations of contacts. The plurality of representations of contacts includes a first representation of a first contact that is associated with an image-sharing application, and a second representation of a second contact that is associated with a fitness application that allows a user of the wrist-wearable device to compare performance of a physical activity against at least the second contact. The method includes, responsive to an input selecting the first representation of the first contact, causing activation of an imaging device for capturing an image. The method includes responsive to another input, capturing an image using the imaging device and causing the image to be sent to the first contact via the image-sharing application.

20 Claims, 37 Drawing Sheets

(51) Int. Cl.
  *G06F 1/16* (2006.01)
  *G06F 3/0482* (2013.01)
  *H04L 51/10* (2022.01)
  *H04L 51/216* (2022.01)
  *H04N 23/63* (2023.01)

(52) U.S. Cl.
  CPC ............ *H04L 51/10* (2013.01); *H04L 51/216* (2022.05); *H04N 23/631* (2023.01); *G02B 2027/0138* (2013.01); *G02B 2027/0178* (2013.01)

(56) References Cited

U.S. PATENT DOCUMENTS

| | | | |
|---|---|---|---|
| 11,200,869 B1 | 12/2021 | Post et al. | |
| 2005/0099494 A1* | 5/2005 | Deng | H04N 1/3876 348/36 |
| 2013/0080954 A1* | 3/2013 | Carlhian | H04M 1/27475 715/838 |
| 2013/0282844 A1* | 10/2013 | Logan | H04M 3/42263 709/204 |
| 2015/0111558 A1 | 4/2015 | Yang | |
| 2016/0165128 A1* | 6/2016 | Krug | H04N 23/62 348/207.1 |
| 2016/0337595 A1* | 11/2016 | Kim | G06F 1/1694 |
| 2017/0357501 A1* | 12/2017 | Ledet | G06F 8/33 |
| 2018/0109906 A1* | 4/2018 | Sentz | H04W 12/06 |
| 2019/0184234 A1* | 6/2019 | Packles | A63B 24/0087 |
| 2019/0208114 A1* | 7/2019 | Ginat | G06V 20/56 |
| 2021/0244316 A1 | 8/2021 | Khaled | |
| 2021/0312917 A1* | 10/2021 | Weksler | G06F 3/167 |
| 2022/0050655 A1* | 2/2022 | Chiang | H04N 21/4122 |
| 2023/0418544 A1* | 12/2023 | Imai | G02B 27/0172 |
| 2024/0019997 A1* | 1/2024 | Han | G06F 9/451 |
| 2024/0020917 A1* | 1/2024 | Ni | G04G 21/00 |
| 2024/0031315 A1* | 1/2024 | Aher | H04L 51/52 |

OTHER PUBLICATIONS

Wikipedia., "List of Fitbit Products," Jan. 22, 2022 [Retrieved on May 9, 2023], 5 pages, Retrieved from the Internet: URL: https://en.wikipedia.org/w/index.php?title=List_of_Fitbit_productsoldid=1067265991.

Wikipedia., "Smartwatch," Jan. 14, 2022 [Retrieved on May 9, 2023], 9 pages, Retrieved from the Internet: URL: https://en.wikipedia.org/w/index.php?title=Smartwatcholdid=1065618864.

International Search Report and Written Opinion for International Application No. PCT/US2023/012510, mailed Jul. 14, 2023, 16 pages.

International Preliminary Report on Patentability for International Application No. PCT/US2023/012510, mailed Aug. 22, 2024, 12 pages.

* cited by examiner

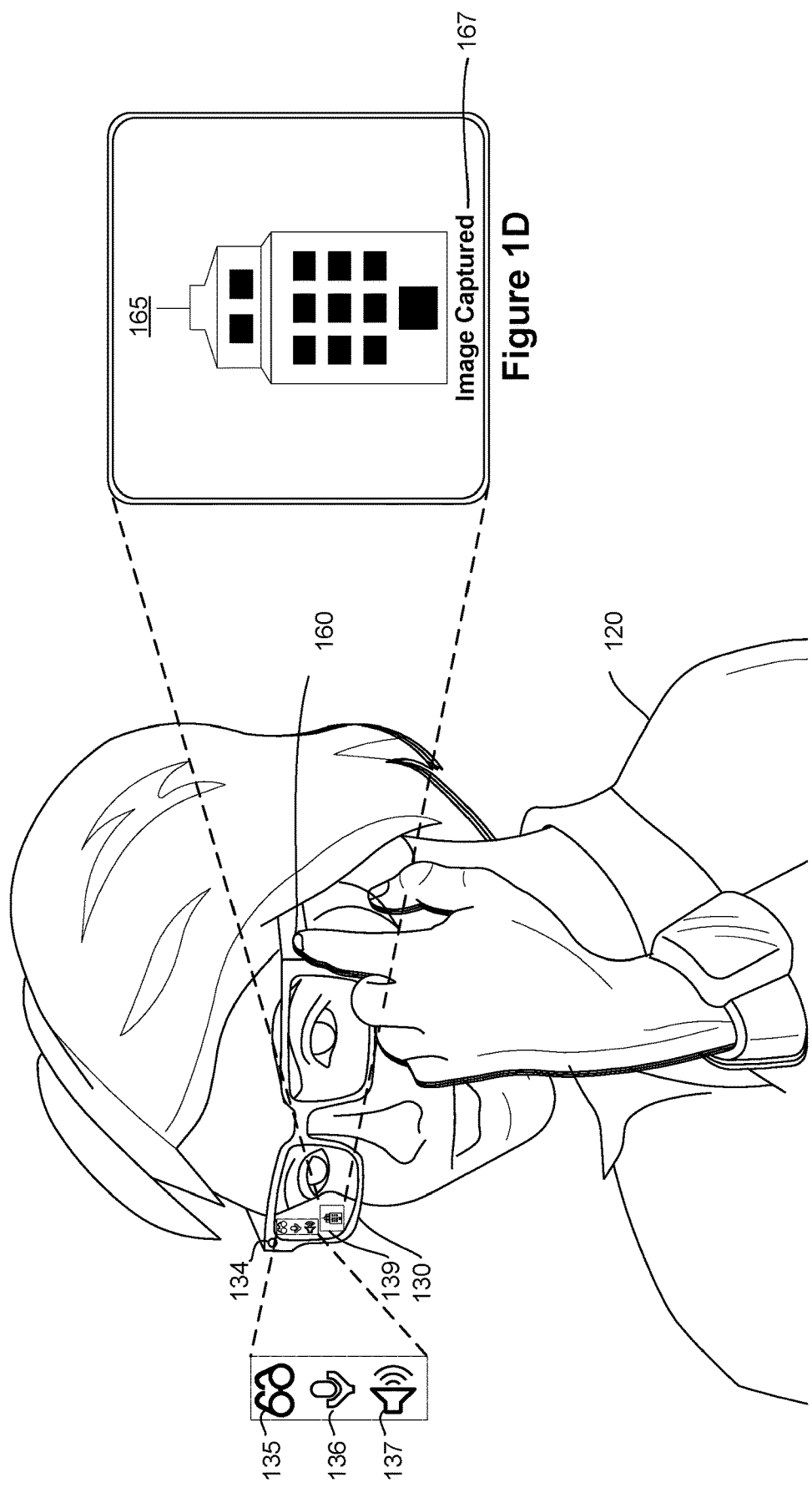

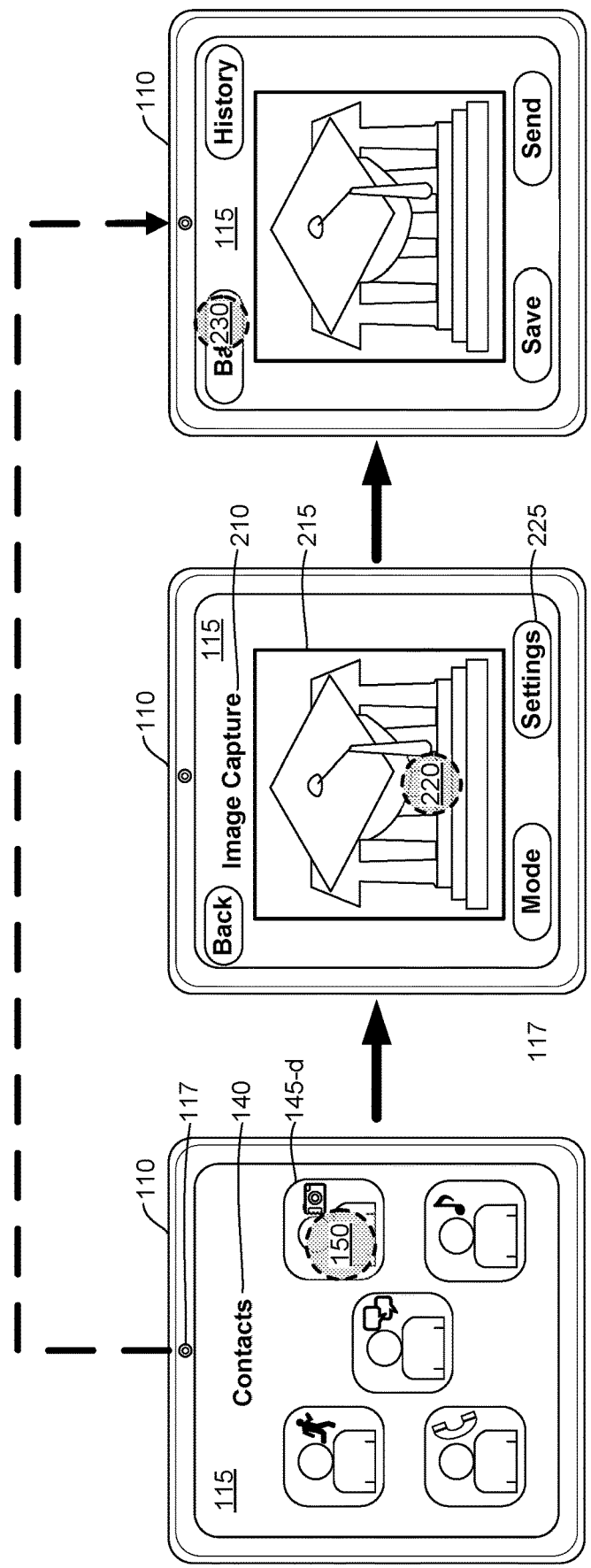

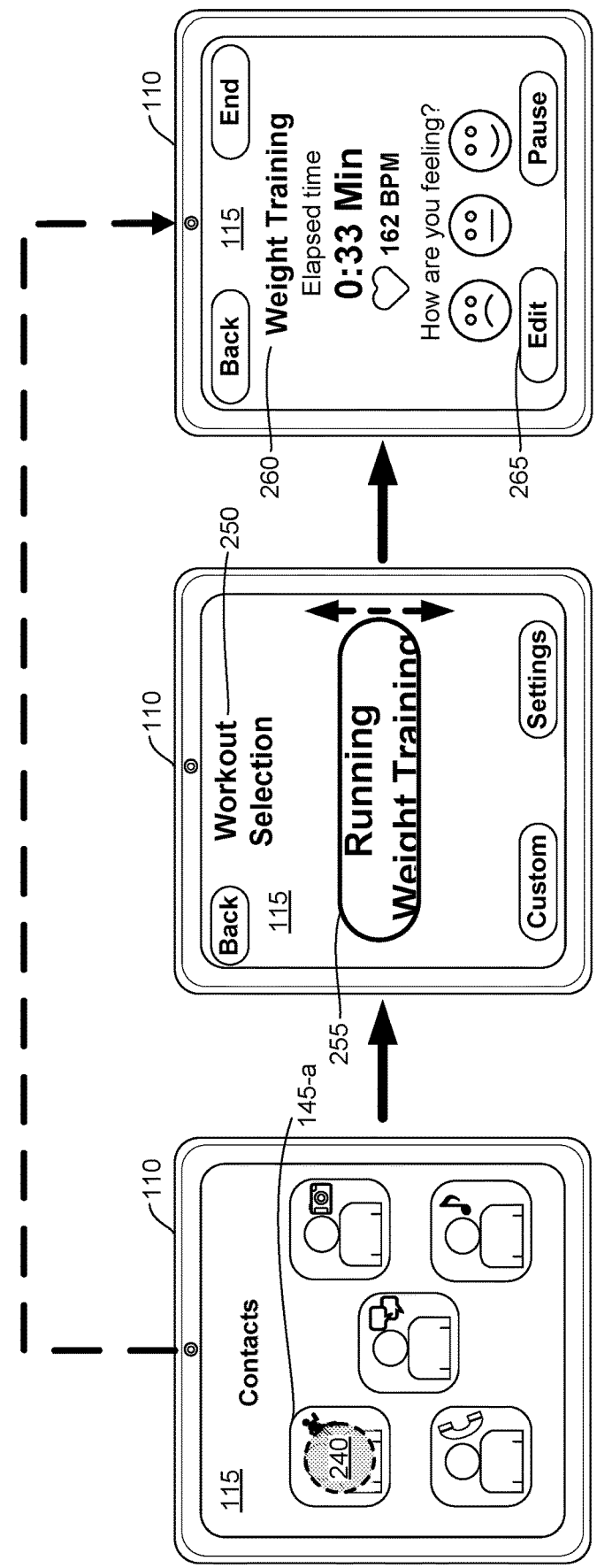

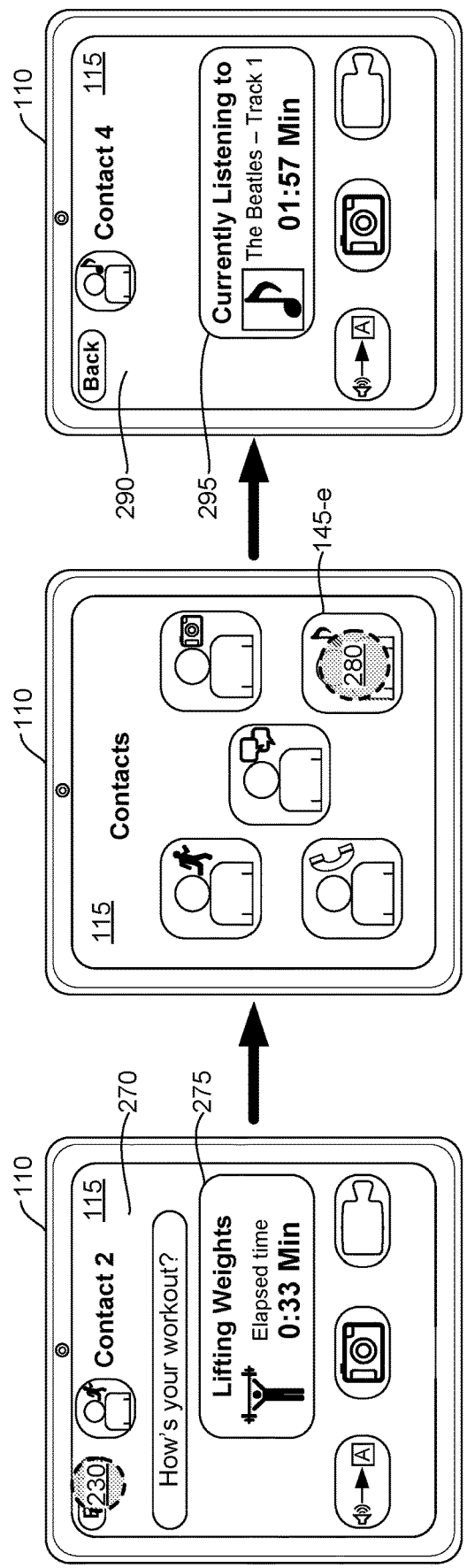

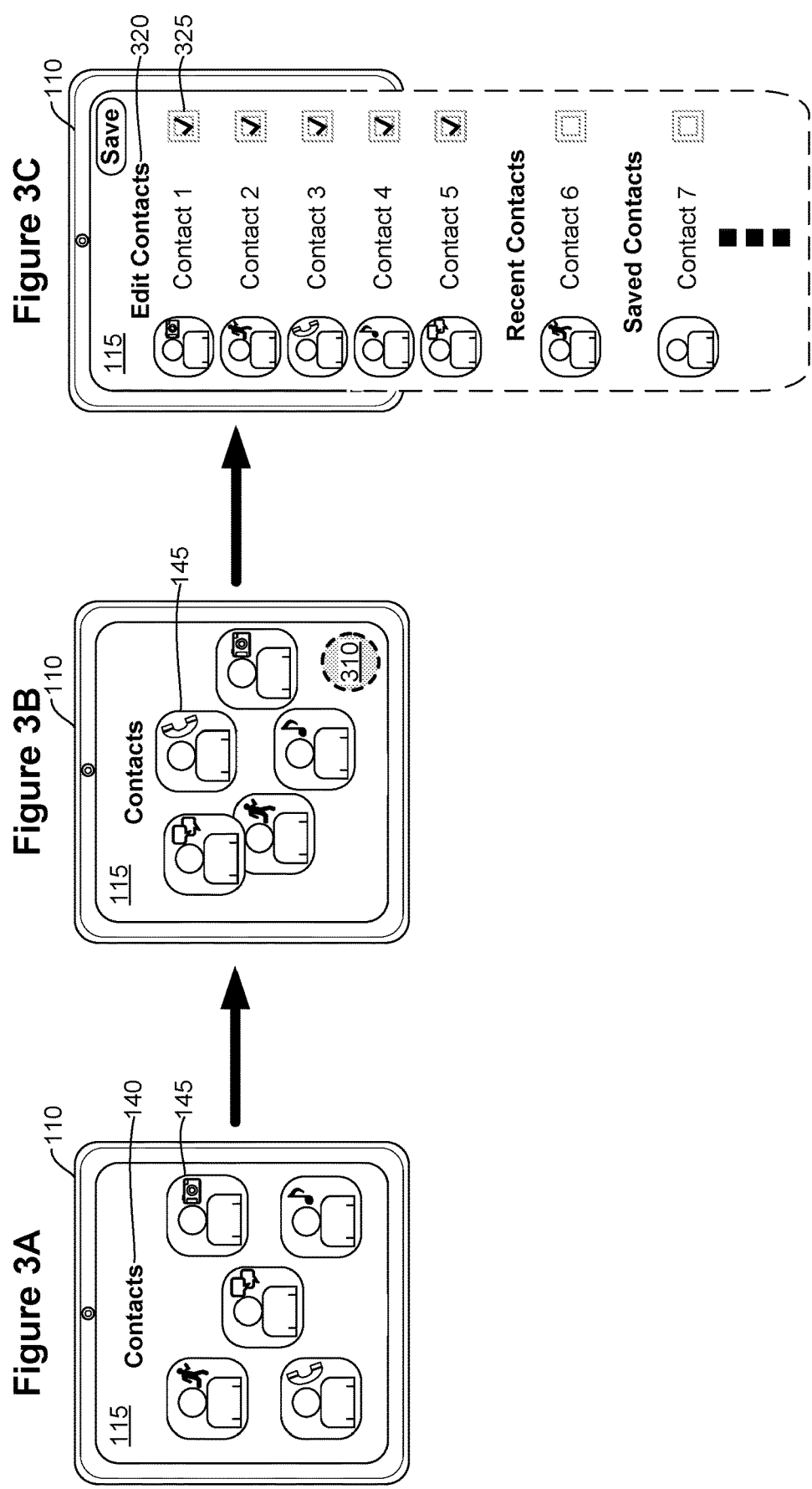

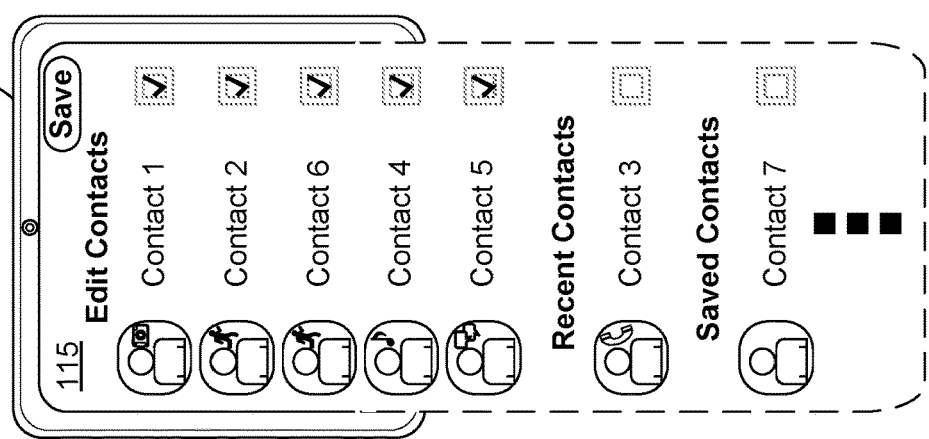
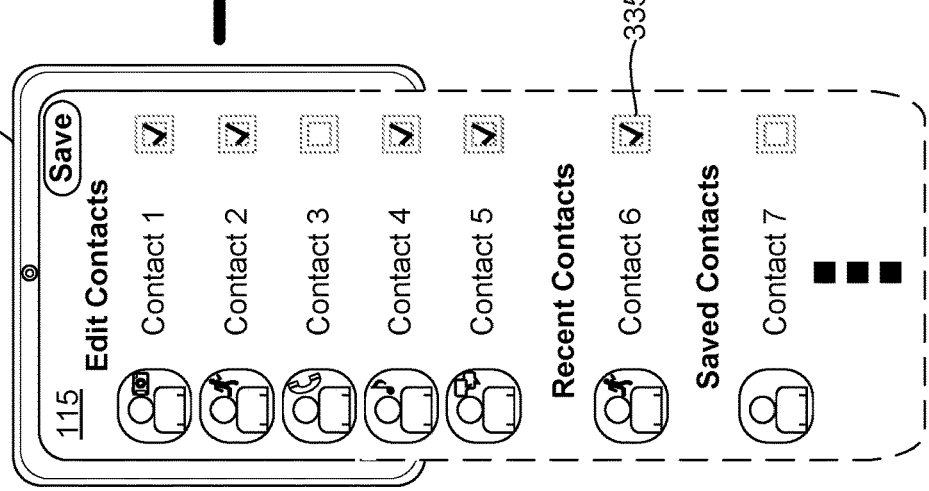
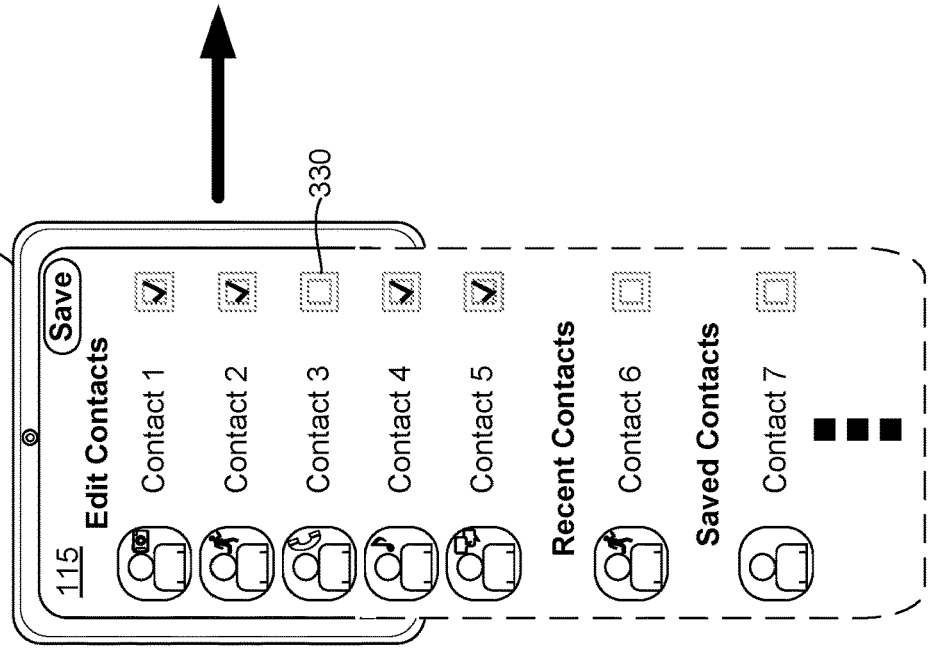

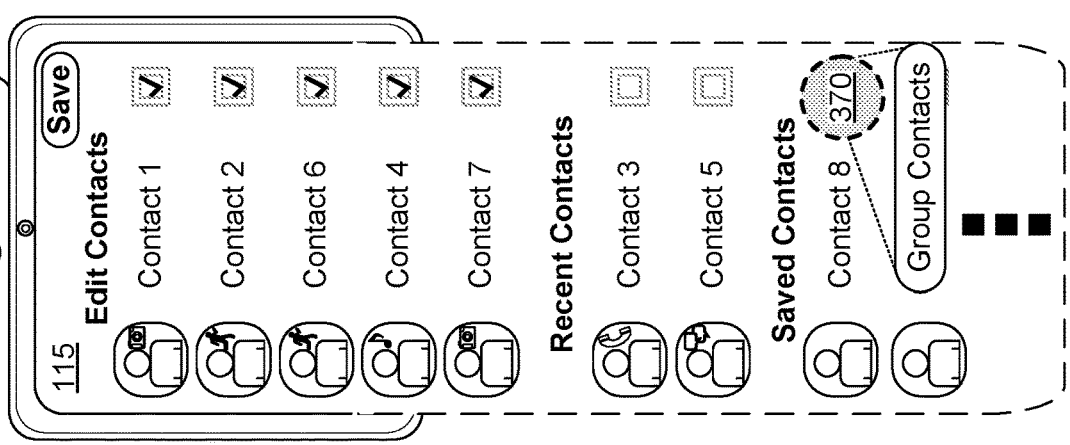
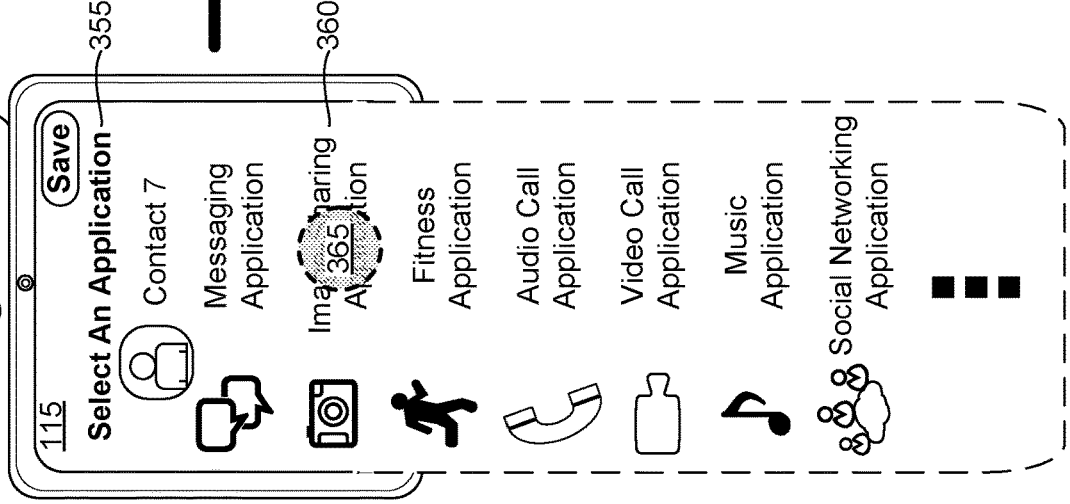
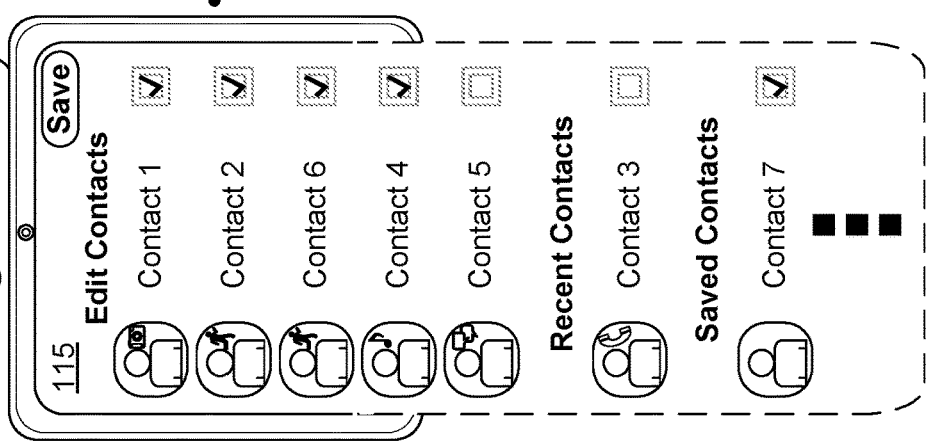

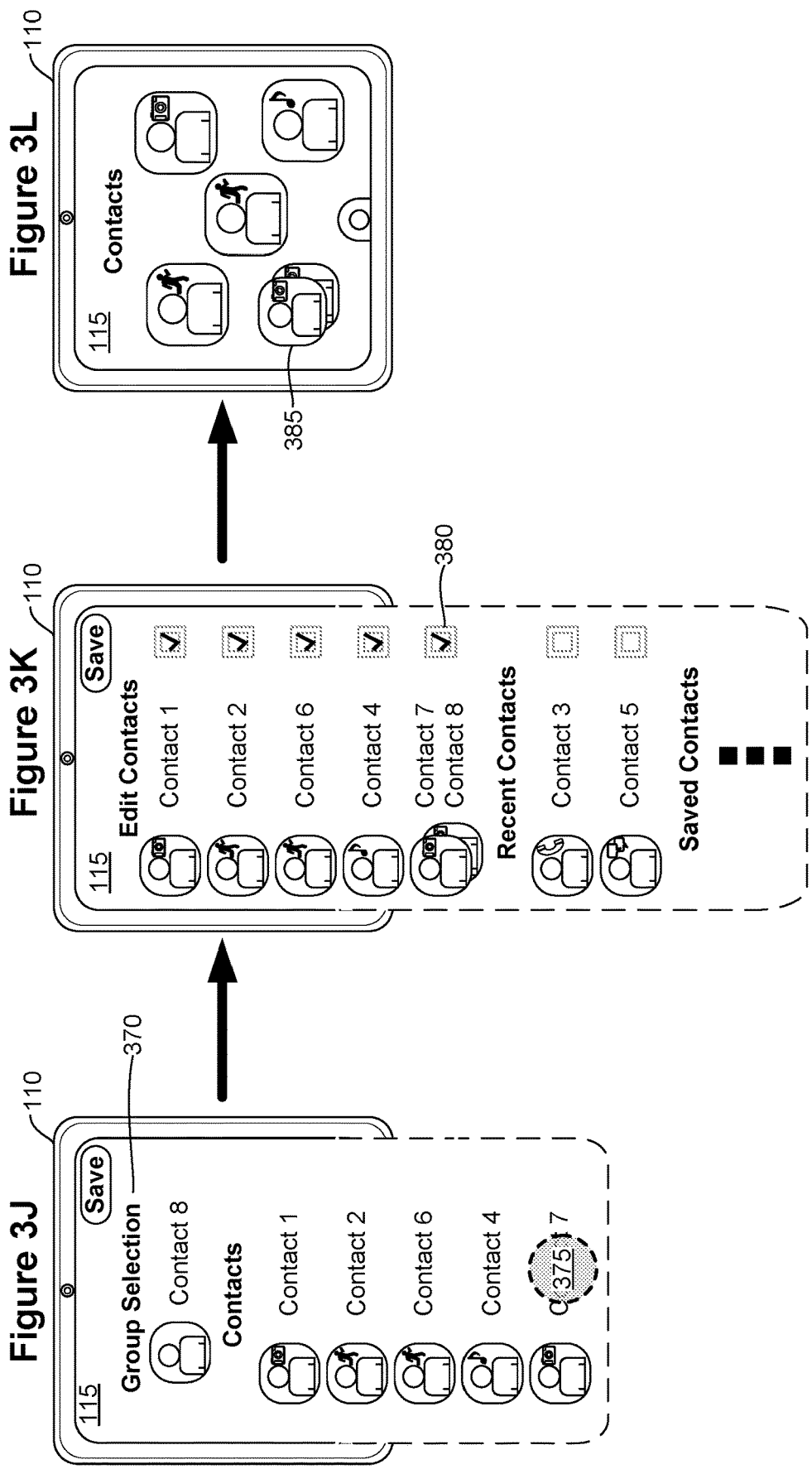

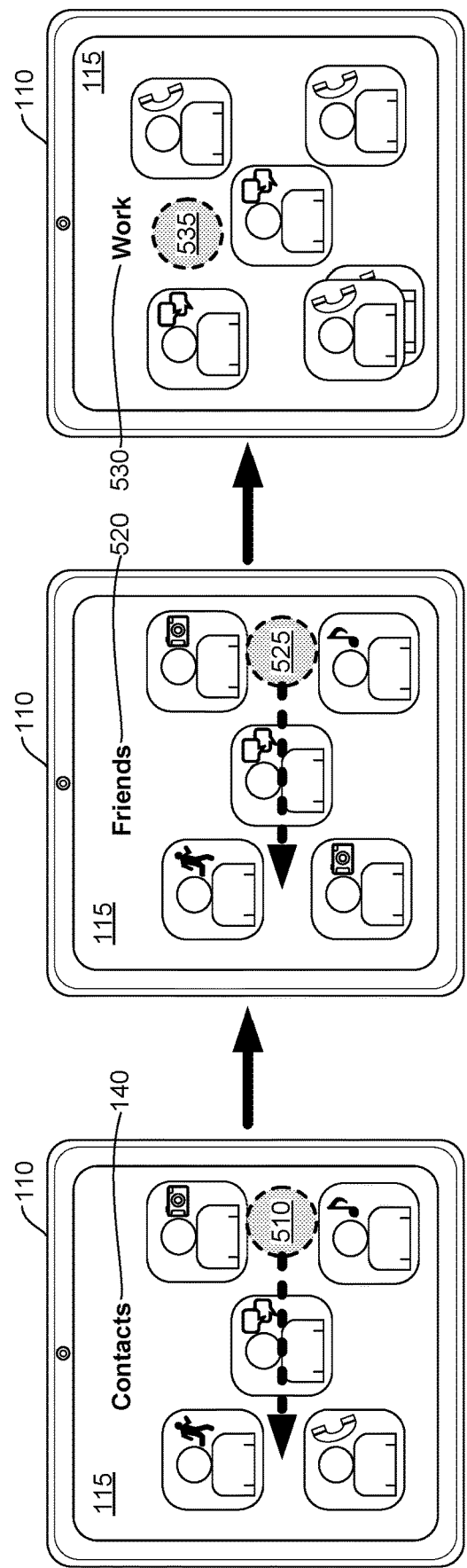

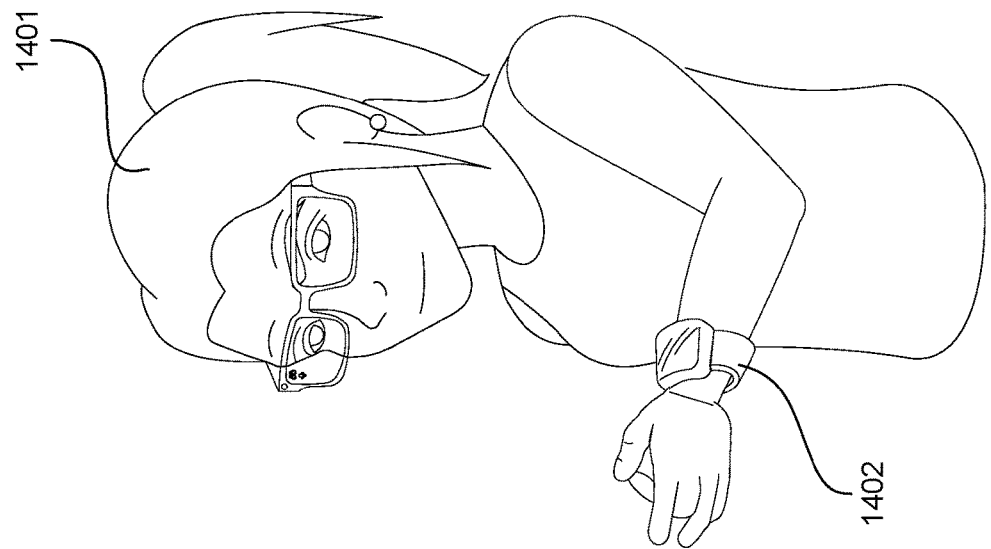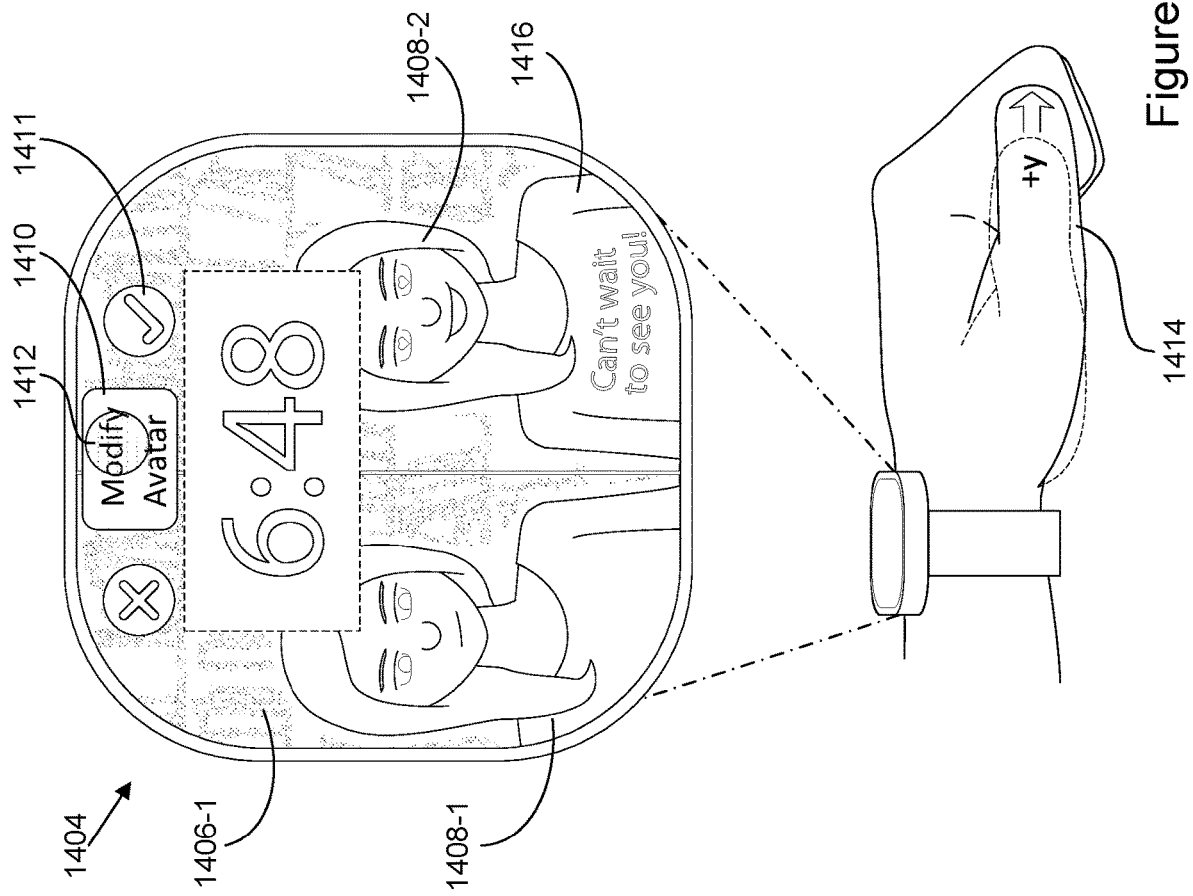
Figure 10A

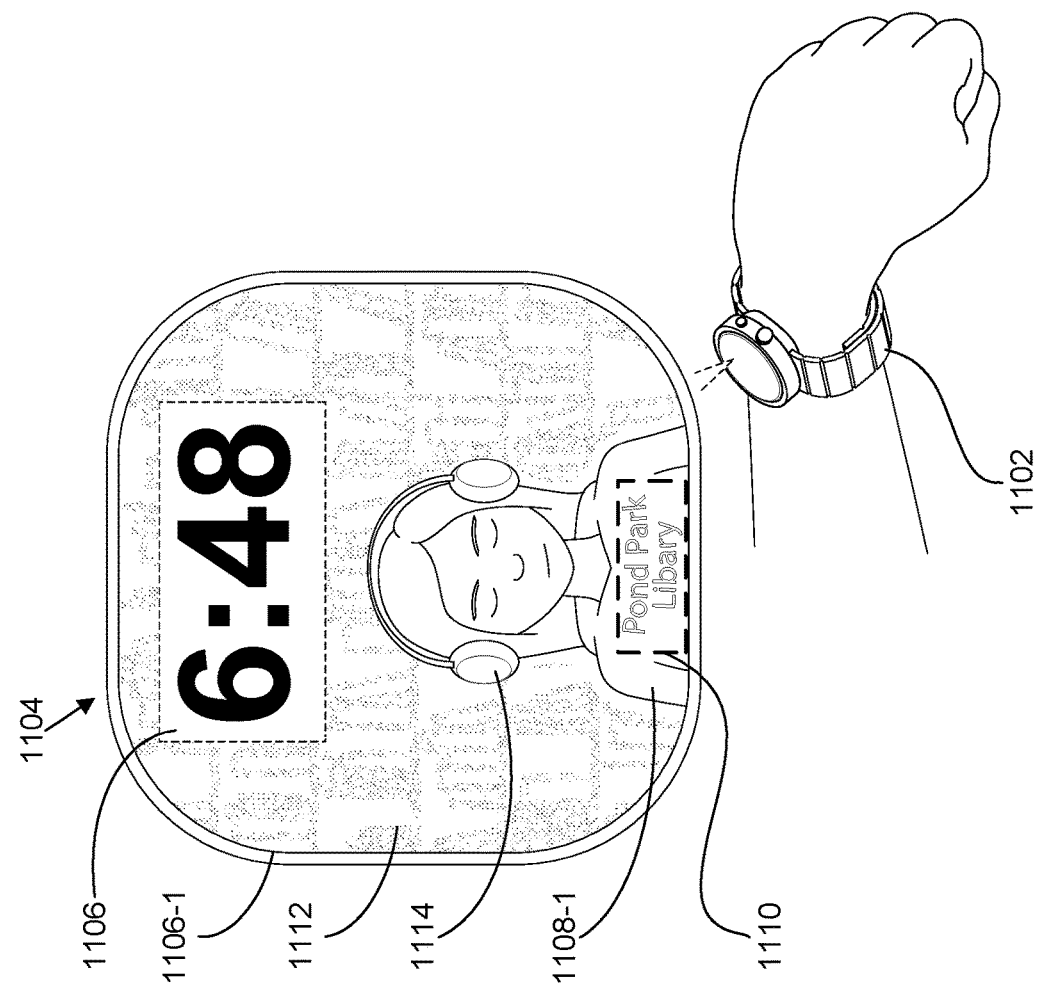
Figure 11A

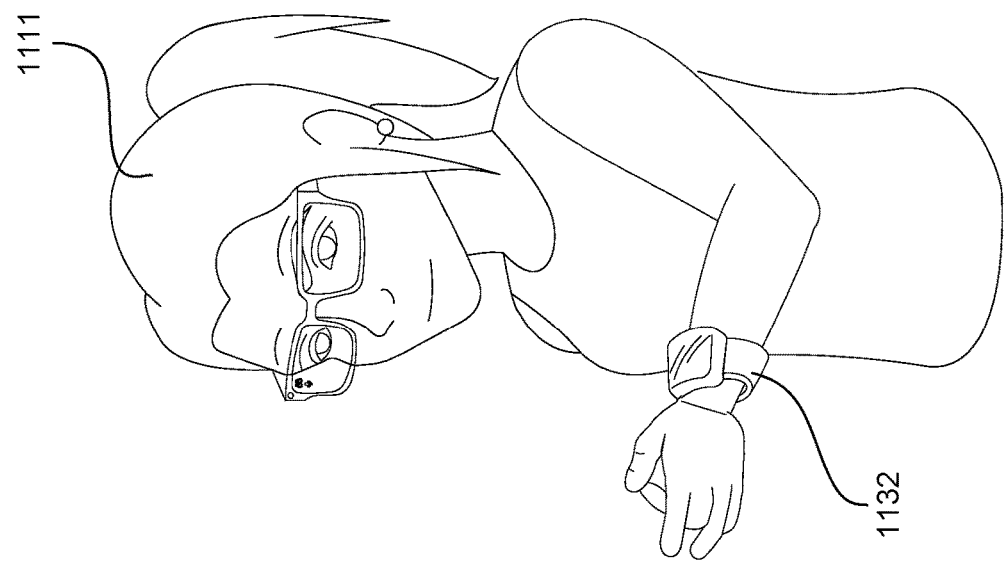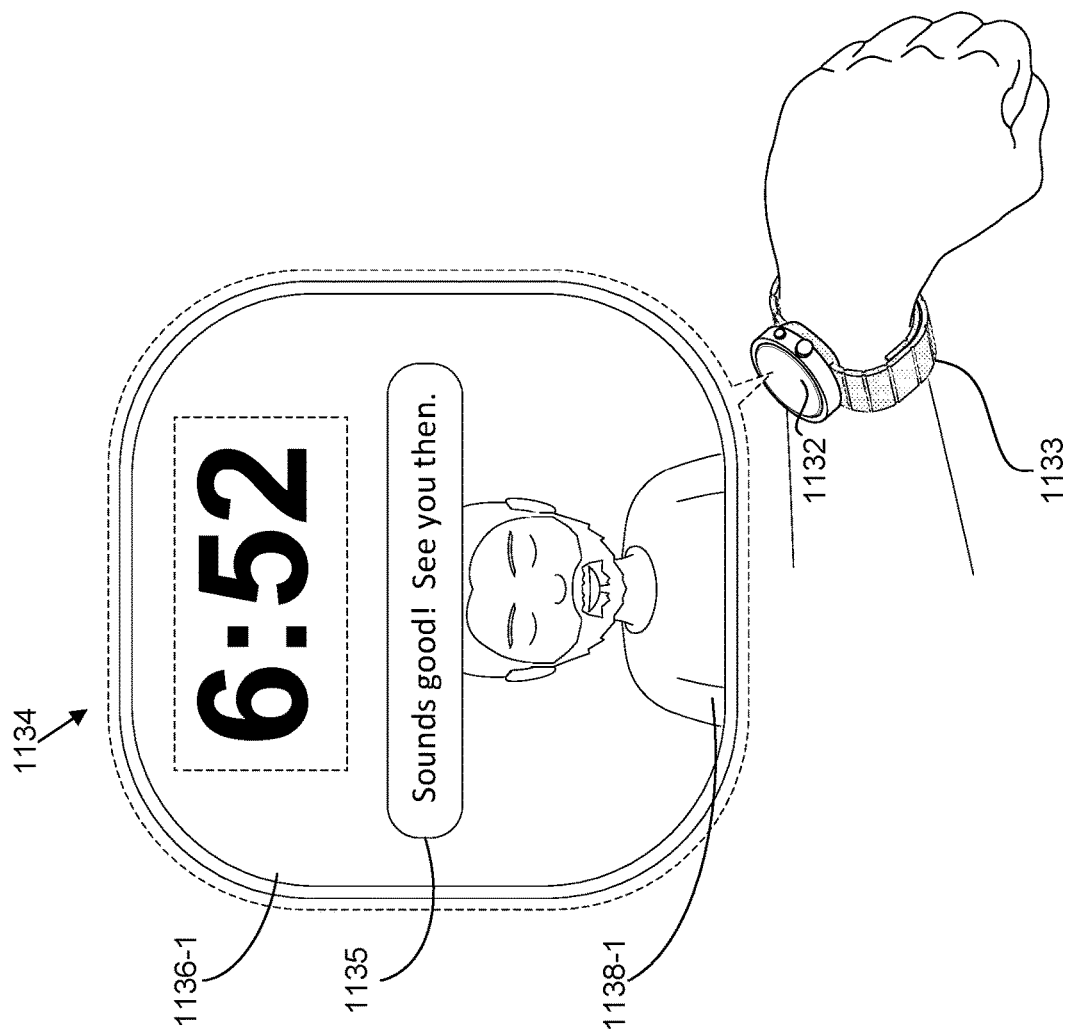
Figure 11C

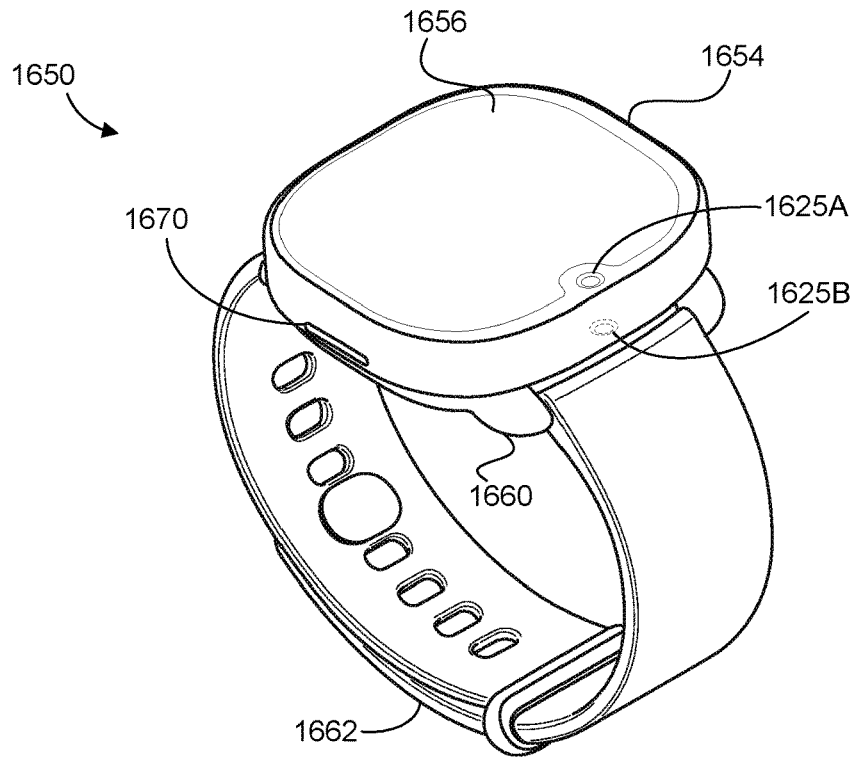
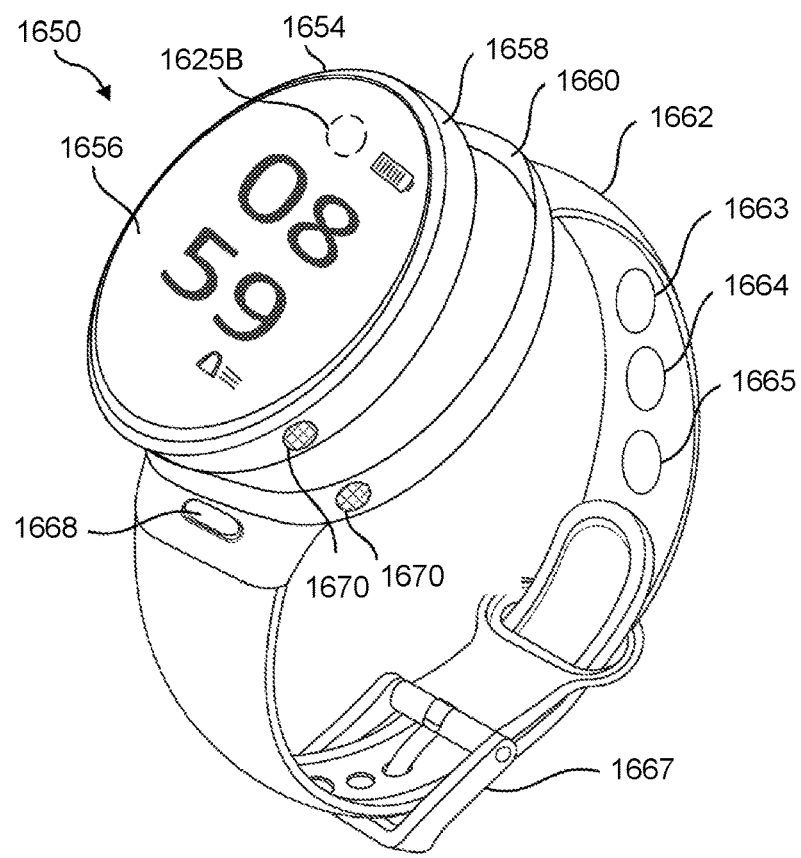
Figure 14A

SYSTEMS FOR ENABLING QUICK INTERACTIONS WITH A USER'S FREQUENT CONTACTS FROM WITHIN A WATCH-FACE USER INTERFACE OF A WRIST-WEARABLE DEVICE AND METHODS OF USE THEREOF

CROSS-REFERENCE TO RELATED APPLICATIONS

This application claims priority to U.S. Prov. App. No. 63/307,623, filed on Feb. 7, 2022, and entitled "Systems for Enabling Quick Interactions With a User's Frequent Contacts From Within a Watch-Face User Interface of a Wrist-Wearable Device and Methods of Use Thereof," which is hereby incorporated by reference in its entirety.

TECHNICAL FIELD

The present disclosure relates generally to wearable devices and methods for enabling quick and efficient interactions with contacts, more particularly, to wrist-wearable devices configured to seamlessly activate applications and associated hardware components (e.g., imaging devices, displays, microphones, etc. of the wrist-wearable device and/or devices communicatively coupled to the wrist-wearable device, such as devices, e.g., an imaging device, of a head-worn wearable device) to capture and share data (e.g., image data, workout data, and other examples discussed below) with contacts. The present disclosure also relates generally to head-worn wearable devices and wrist-wearable devices that operate in a coordinated fashion to capture and present data that can be shared quickly and efficiently to contacts of the user.

BACKGROUND

Computing devices, such as computers, phones, and tablets, require users to navigate through a number of different user interfaces and/or provide multiple inputs to access applications and/or interact with other users, particularly when sharing data with other users. Requiring multi-step input processes through different applications and then through different user interfaces within those different applications requires a user to stop performing an activity (removing themselves from an experience) to interact with the computing devices for an extended time period, thereby wasting time and creating user dissatisfaction with such inefficient use cases. Additionally, requiring multi-step input processes for sharing data via computing devices requires the devices to be powered on longer and consume their available energy, thereby depleting what can be a limited power supply. Techniques for connecting a user with their contacts are inadequate as they require direct user intervention at multiple points in the process (e.g., a user has to select activate an application, perform an action at the application, request to share content from the application, locate a contact they wish to share content with, select and share the content with the contact), thereby becoming burdensome to users, while also inefficiently making use of limited computing and power resources for certain computing devices (particularly wrist-wearable devices).

As such, there is a need for addressing one or more of the drawbacks discussed above by developing techniques to enable quick and efficient interactions with a user's frequent contacts from within a watch-face user interface of a wrist-wearable device.

SUMMARY

The wrist-wearable devices, head-worn wearable devices, and methods of use thereof (as well as systems including both wrist-wearable and head-worn devices) described herein address one or more of the above-mentioned drawbacks by seamlessly allowing a user to interact with their contacts using the wrist-wearable devices and/or the head-worn wearable devices, and by seamlessly performing one or more actions associated with applications at the wrist-wearable devices and/or the head-worn wearable devices. As one example, the wrist-wearable devices and methods described herein, responsive to selection of a first representation of a first contact that is associated with an image-sharing application, can cause activation of an imaging device for capturing an image and after capturing the image using the imaging device, cause the image to be sent to the first contact via the image-sharing application. This can be done without requiring the user to perform a lengthy sequence of inputs, instead, in some embodiments, the number of user inputs (e.g., single taps on a display of the wrist-wearable device) can be as few as two (one user input at the first representation of the first contact to cause activation of the imaging device and one user input to capture an image using the imaging device, which image can then be shared immediately (and without a further instruction from the user to cause/request the sharing) within a conversation thread including at least the first contact. The plurality of representations of contacts included on the watch-face user interface can be associated with any number of applications and provide a user with an easy and convenient way to utilize the functions of a wrist-wearable device, a head-worn wearable device, and/or other devices described herein to quickly and efficiently share data with contacts using a minimal number of inputs, thereby preserving limiting computing and power resources, and further/ supporting sustained interactions with wrist-wearable and head-worn wearable devices to produce improved man-machine interfaces. As discussed below, the watch-face user interface can at least include two different representations of contacts, each associated with a different type of application (e.g., one associated with the image-sharing application discussed above, and the other associated with a fitness application). When a representation of an additional contact that is associated with a first application is selected (e.g., via a single tap input on the display of the wrist-wearable device), in some embodiments, the wrist-wearable device can proceed to initiate monitoring of a physical activity and can share data about that physical activity with the additional contact (thus, in this example, only a single input need be provided to initiate an interaction and sharing of data from the fitness application with the additional user, as compared to needing to open a fitness application, select certain information to share, open a different application, select a contact within that different application, and then provide additional inputs after selected that contact to share the certain information with the contact). Associations between respective contacts and applications (and, in particular, associations of contacts with image-sharing applications and other applications) can be automatically determine without inputs from a user (e.g., the wrist-wearable device can monitor a user's patterns of interacting with particular contacts via particular applications and then determine appropriate associations, which feature can be made available based on an opt-in process) or selected for association with respective applications by a user.

Further, the wrist-wearable devices described herein improve users' daily activities and productivity by reducing the number of direct inputs required by a user to access an application and/or connect with others. For example, the wrist-wearable devices and methods described herein, in one embodiment, provide improved techniques for single input interactions between a user and their contacts. In particular, a user, in some embodiments, can share data via image-sharing applications, share physical activity information with their contacts, message their contacts, etc. with just one or two inputs in the form of tap inputs on a display of the wrist-wearable device. The reduced number of required inputs do not exhaust power and processing resources of a wrist-wearable device extending the battery life of the wrist-wearable device.

To help further the above goals, and as was briefly noted above, some embodiments described herein also make use of components of other wearable devices, such as a head-worn device (e.g., smart glasses or virtual reality headset), including speaker, microphone, and/or camera of these other wearable devices to allow for seamlessly capturing and sharing data between the user and others. For instance, in some embodiments, a user can request, via the wrist-wearable device, to capture and share an image with a contact, and the wrist-wearable device, responsive to the request, can cause an imaging device of a head-worn device to activate and be used in the capture of an image to be shared with the contact. Determinations can also be conducted as to whether an imaging device of the wrist-wearable device or the head-worn wearable device should be utilized (e.g., based on current power levels at each of the devices and/or based on available computing resources at each of the devices, and the like), and the appropriate imaging device can be activated based on those determinations, thereby furthering the benefits of making efficient use of limited power and computing resources at wearable devices. Additional examples are explained in further detail below.

(A1) In accordance with some embodiments, a method for enabling quick interactions with a user's frequent contacts from within a watch-face user interface of a wrist-wearable device is disclosed. The method includes displaying, on a display of a wrist-wearable device, a watch-face user interface including a plurality of representations of contacts. The plurality of representations of contacts includes at least a first representation of a first contact is associated with an image-sharing application and a second representation of a second contact is associated with a fitness application that allows a user of the wrist-wearable device to compare performance of a physical activity against at least the second contact, the fitness application being distinct from the image-sharing application. In other words, in these embodiments, the watch-face user interface includes representations of contacts that are associated with at least two different types of applications, and the associations can be automatically determined by the system or can be selected by the device based on how a user frequently interacts with certain contacts (this is discussed more in the detailed description that follows, and the use of automatic associations can be something that a user needs to opt-in to use). The method includes, responsive to a first user input selecting the first representation of the first contact, causing activation of an imaging device for capturing an image of the physical world using the imaging device. While the imaging device is activated and responsive to a second user input, the method includes capturing an image using the imaging device and, after capturing the image using the imaging device, causing the image to be sent to the first contact via the image-sharing application. In some embodiments, the causing the image to be sent to the first contact can occur without receiving an express instruction to share an image; in other words, after the image is captured, it can be immediately sent to the first contact, such that the entire interaction from the watch-face user interface to capturing an image and sharing that image can occur with as few as two inputs. For other types of applications associated with representations of contacts, the activating an application and sharing data from that application can occur with just one input (e.g., for the fitness application, as is discussed more below).

(A2) In some embodiments of A1, the method further includes, responsive to the first user input and in conjunction with activating the imaging device, displaying a user interface that allows for capturing the image using the imaging device.

(A3) In some embodiments of A2, the user interface that allows for capturing the image using the imaging device includes a user interface element that when selected causes the wrist-wearable device to display a conversation thread of the image-sharing application. The conversation thread includes images shared between a user of the wrist-wearable device and at least the first user.

(A4) In some embodiments of any of A1-A3, causing the image to be sent to the first contact includes sending the image in a conversation thread of the image-sharing application. The conversation thread includes images shared between a user of the wrist-wearable device and at least the first contact.

(A5) In some embodiments of any of A1-A4, capturing the image using the imaging device includes capturing a plurality of images, and the method further includes, before causing the image to be sent to the first contact, displaying user interface elements associated with each image of the plurality of images. Responsive to an additional user input that selects a respective user interface element associated with the image, the method includes causing the image to be sent to the first contact.

(A6) In some embodiments of any of A1-A5, the method further includes, responsive to an additional user input selecting the second representation of the second contact, causing activation of the fitness application, and displaying a user interface that allows for monitoring performance of a physical activity. The method further includes notifying the second contact that the user is currently performing the physical activity.

(A7) In some embodiments of any of A1-A6, displaying, on the display of the wrist-wearable device, the watch-face user interface includes displaying a third representation of a third contact that is associated with the image-sharing application, and the method further includes, responsive to an additional user input selecting the third representation of the third contact, ceasing to display the watch-face user interface and causing activation of the imaging device for capturing another image of the physical world using the imaging device. The method further includes, while the imaging device is activated and responsive to one more user input, capturing the other image using the imaging device and, after capturing the other image using the imaging device, causing the other image to be sent to the third contact via the image-sharing application. In other words, respective representations on the watch-face user interface can be associated with a same application but with different users, thereby allowing for quick and easy sharing of a same type of data with different users.

(A8) In some embodiments of any of A1-A7, the method further includes, before displaying, on the display of the wrist-wearable device, the watch-face user interface including the plurality of representations of contacts, determining based on previous user actions with a respective contact, a respective application, selected from among multiple available applications, to associate with each representation of the plurality of representations of contacts. The plurality of representations of contacts are determined such that the first contact is associated with the image-sharing application based on the previous user actions indicating that a user of the wrist-wearable device frequently interacts (e.g., at least 50-75% of the user's interactions with the first contact occur by way of the image-sharing application) with the first contact via the image-sharing application, and the second contact is associated with the fitness application based on the previous user actions indicating that the user of the wrist-wearable device frequently interacts (e.g., at least 50-75% of the user's interactions with the second contact occur by way of the fitness application) with the second contact via the fitness application.

(A9) In some embodiments of any of A1-A8, the first user input is a single tap input over the first representation of the first contact.

(A10) In some embodiments of any of A1-A9, the first user input selecting the first representation of the first contact is a long press that remains in contact with a portion of the display of the wrist-wearable device used to display the first representation of the first contact for at least a predefined period of time, and the method further includes, responsive to the long press and before imaging device is activated, displaying, on the display of a wrist-wearable device, a plurality of user interface elements, each interface element including one or more image capture modes available for the imaging device.

(A11) In some embodiments of any of A1-A10, the first user input selecting the first representation of the first contact causes the wrist-wearable device to present one or more images received from and/or sent to the first contact associated via the image-sharing application within a predetermined period of time.

(A12) In some embodiments of any of A1-A11, at least one respective contact associated with one of the plurality of representations of contacts is user selected for inclusion on the watch-face user interface, and an association between the at least one respective contact and a respective application is also user selected.

(A13) In some embodiments of any of A1-A12, the plurality of representations of contacts move around to different respective positions within the watch-face user interface based on movement of a user that is wearing the wrist-wearable device.

(A14) In some embodiments of any of A1-A13, a respective representation of the plurality of representations of contacts moves around the watch-face user interface based on activity of a respective contact associated with the respective representation.

(A15) In some embodiments of any of A1-A14, the plurality of representations of contacts displayed on the watch-face user interface includes a third representation of a third contact associated with a messaging application that allows the user of the wrist-wearable device to view messages between the user and the third contact and a fourth representation of a fourth contact is associated with a calling application that allows the user of the wrist-wearable device to view audio and/or video calls between the user and the fourth contact. The messaging application messaging being distinct from the image-sharing and fitness applications and the calling application being distinct from the image-sharing application, the fitness application, and the messaging application.

(A16) In some embodiments of any of A1-A15, the first contact includes a first plurality of contacts.

(A17) In some embodiments of any of A1-A16, the first contact and the second contact are the same.

(A18) In some embodiments of any of A1-A17, the first contact and the second contact are distinct.

(A19) In some embodiments of any of A1-A18, causing activation of the imaging device includes, in accordance with a determination that the wrist-wearable device is communicatively coupled with a head-worn wearable device that includes the imaging device, causing activation of the imaging device by sending an instruction to the head-worn wearable device that is communicatively coupled to the wrist-wearable device.

(A20) In some embodiments of A19, the method further includes, while the imaging device of the head-worn wearable device is activated, displaying on the display of the wrist-wearable device a user interface that includes a live image from the imaging device of the head-worn wearable device.

(B1) In accordance with some embodiments, a method for presenting animated avatars corresponding to users based on respective statuses is disclosed. The method includes, at a wrist-wearable device configured to present, via a display, an interactive user interface that includes an animated avatar corresponding to a user of a different electronic device, the animated avatar based on a first status (e.g., a current status) of the user (e.g., an automatically-reflected context): (i) in response to receiving a status indication, related to a second status of the user (e.g., an explicitly or implicitly shared status update), from the different electronic device, modifying, by the wrist-wearable device (e.g., generating, which can occur automatically, without user intervention), the animated avatar to create a modified animated avatar based on the second status such that the modified animated avatar is representative of the second status of the user, and (ii) presenting, via the display, the interactive user interface including the modified animated avatar. In some embodiments, the status indication is related to a change from the first status (e.g., shared via one or more social media applications). That is, the second three-dimensional visual representation reflects a second status of the user, different from the first status associated with the first three-dimensional visual representation. In some embodiments, the display can display the user of the electronic device (e.g., an avatar selfie).

(B2) In some embodiments of B1, the interactive user interface is a watch-face user interface, and the modified animated avatar is presented without any interaction by a wearer with the wrist-wearable device.

(B3) In some embodiments of B2, (i) the animated avatar based on the first status is presented at a first time, (ii) the display of the wrist-wearable device is caused to dim at a second time after the animated avatar has been presented, and (iii) the presenting of the modified animated avatar based on the second status is caused in response to detecting an in-air hand gesture.

(B4) In some embodiments of any of B1-B3, the status indication includes one or more of: (i) a content item shared the user, (ii) a state of mind of the user, (iii) a message shared by the user, (iv) a location of the user, (v) an activity performed by the user, and (vi) an environmental condition associated with the location of the user.

(B5) In some embodiments of any of B1-B4, the interactive user interface includes a contextual-information visual representation associated with one of (i) the animated avatar and (ii) the modified animated avatar, and the contextual-information visual representation is based on a respective status of the user.

(B6) In some embodiments of B5, the contextual-information visual representation includes a background element depicting an aspect of a current environment of the user.

(B7) In some embodiments of any of any of B5-B6, a first contextual-information visual representation associated with the first status is presented in conjunction with the animated avatar, and in accordance with receiving the status indication, presenting a second contextual-information visual representative associated with the second status in conjunction with presenting the modified animated avatar.

(B8) In some embodiments of any of B5-B7, a respective contextual-information visual representation is different from but related to a respective status of the user.

(B9) In some embodiments of B8, the contextual-information visual representation is a second contextual-information visual representation, and the method further includes (i) before the status indication causing the modified animated avatar to be presented, a first contextual-information visual representation is presented in conjunction with the animated avatar, and (ii) irrespective of a set of content associated with the status indication, causing the second contextual-information visual representation to be presented in conjunction with the first contextual-information visual representation.

(B10) In some embodiments of any of B1-B9, causing the wrist-wearable device to present the modified animated avatar includes animating the second status of the user received via the status indication of the user.

(B11) In some embodiments of any of B1-B10, the animated avatar is displayed at a wake screen user interface of the wrist-wearable device, the wake screen user interface is caused to transition from a first mode to a second mode, and automatically, without further user input, the first and second three-dimensional visual representations are continuously animated at the wake screen user interface.

(B12) In some embodiments of B1-B 11, causing the wrist-wearable device to present the modified animated avatar includes presenting a transitional animated avatar that illustrates a continuous change the animated avatar and the modified animated avatar.

(B13) In some embodiments of B1-B12, the status indication is a first status indication. The method further includes, in accordance with receiving a second status indication related to a third status of the user received from the different electronic device, generating another modified animated avatar based on the third status of the user such that the other modified animated avatar is representative of the third status of the user. And the method includes causing the wrist-wearable device to present, via the display, the interactive user interface including the other modified animated avatar, where the third status of the user includes a content item shared by the user from a sharing application.

(B14) In some embodiments of B1-B13, in accordance with receiving an input from the wearer of the wrist-wearable directed to the modified animated avatar, causing the wrist-wearable device to present, via the display, the second status of the user in conjunction with a portion of the modified animated avatar.

(B15) In some embodiments of B14, the second status of the user includes a content item shared by the user via a sharing application and causing the wrist-wearable device to present the second status of the user in conjunction with the portion of the modified animated avatar includes presenting the content item and the modified animated avatar as being related to the content item.

(B16) In some embodiments of B1-B15, the interactive user interface is configured to receive wearer input for responding to a respective status of the user.

(B17) In some embodiments of B1-B16, the user is a first contact of the wearer, the status indication is a first status indication, and the interactive user interface is a first interactive user interface. The method further includes, in accordance with receiving a second status indication, related to a respective status of a second contact of the wearer, received from another different device, obtaining a fourth three-dimensional visual representation of the second contact based on the respective status of the second contact such that the fourth three-dimensional visual representation of the second contact is representative of the respective status of the second contact. The method further includes causing the wrist-wearable device to present, via the display, a second interactive user interface including the fourth modified animated avatar.

(B18) In some embodiments of B1-B17, the user is associated with a plurality of linked applications, and the status indication is received from one of the plurality of linked applications.

(B19) In some embodiments of B1-B18, the interactive user interface is a first interactive user interface. The method includes, responsive to a wearer input (e.g., a swipe gesture) directed to the first interactive user interface, displaying a second interactive user interface. The second interactive user interface includes a plurality of animated avatars corresponding to a plurality of users, where each respective user of the plurality of users is different from the user of the different electronic device. Each respective animated avatar of the plurality of the plurality of animated avatars in the second interactive user interface is based on a collective status of the plurality of users.

(B20) In some embodiments of B19, the method further includes, in accordance with receiving a respective status indication for a first subset of the plurality of users, the respective status indication related to a status of the first subset of the plurality of user received from distinct electronic devices, obtaining animated avatars of the first subset of the plurality of users based on the status of the first subset of the plurality of users based on the status of the first subset of the plurality of users such that the respective animated avatars of the first subset of the plurality of users is representative of the status of the first subset of the plurality of users. The method includes causing the wrist-wearable device to present, via a, the second interactive user interface including the respective animated avatars of the first subset of the plurality of users and the collective status for a second subset of the plurality of users, the second subset of the plurality of users excluding the first subset of the plurality of users. For example, one respective user of the plurality of users may have updated an element of their status (e.g., a current status) at a social-media application (e.g., sharing that they are currently located in Philadelphia), and the corresponding three-dimensional visual representation associated with the respective user can be adjusted to reflect the shared status update.

In some embodiments the updating of the visual representation of the second interactive user interface causes an additional three-dimensional visual representation to be displayed at the second interactive user interface. For example, the second interactive user interface may reflect a list of contacts of the wearer of the wrist-wearable device, and based on one of the contacts of the wearer becoming co-located (e.g., physically, virtually, and/or relationally (e.g., via a relationship status)) with another user of a different electronic device, the other user can be displayed at the second interactive user interface, even if the other user of the different electronic device is not a contact of the wearer that is associated with the second interactive user interface.

(B21) In some embodiments of B20, the first subset of the plurality of users is one user.

(B22) In some embodiments of any of B20-B21, the first subset of the plurality of users is at least two users, and the respective animated avatars, and the respective animated avatars of the first subset of the plurality of users each include at least one shared visual element of the status of the first subset of the plurality of users. For example, two of the users may be playing a two-player VR video game, and the shared visual representation relates to an activity that both of the respective users are participating in within the VR video game (e.g., chasing a fairy, slaying a dragon, etc.). In some embodiments, the representation of the users participating in the shared activity does not correspond precisely to what the users are doing. For example, two users engaging with the same artificial-reality application that includes a sport activity could be represented as two users slaying a dragon, or as playing a different sport than the sport activity in the artificial-reality application.

(B23) In some embodiments of B22, the at least two users of the first subset of the plurality of users are not in physical proximity to each other (e.g., the users are not in the same room, state, country, etc.), and the at least one shared visual element of the status of the first subset of the plurality of users includes an indication that the at least two users of the first subset of the plurality of users are virtually co-located within a portion of a VR environment. For example, the indication can include information about a VR application (e.g., a VR video game) that the users are interacting with.

(B24) In some embodiments of any one of B1-B23, the user is a first contact, and the status indication is a first status. The method further includes, while displaying one of (i) the animated avatar and (ii) the modified animated avatar, causing display, within the interactive user interface, of a different animated avatar associated with the wearer, the different animated avatar presented in conjunction (e.g., simultaneously and/or sequentially within a same portion of an animation, side-by-side in respective animations) with the one of (i) the animated avatar and the (ii) modified animated avatar of the user.

(B25) In some embodiments of B1-B24, the status indication includes a device identifier, and the modified animated avatar includes a representation of a device used by the user based on the device identifier.

(B26) In some embodiments of B25, the device identifier is associated with a device from the group consisting of: (i) a smartphone, (ii) a computer, (iii) a wrist-wearable device, and (iv) a detachable structural component of the wrist-wearable device.

(B27) In some embodiments of any one of B1-B26, the status indication is received responsive to a determination that the user and the wearer of the wrist-wearable device are within a predetermined proximity.

(B28) In some embodiments of B27, the determination the user and the wearer of the wrist-wearable device are within the predetermined proximity is based on a determination that the user and the wearer are co-located.

(B29) In some embodiments of any one of B1-B28, the method further includes, in accordance with receiving a user input at the interactive user interface, causing an adjustment to a view of the interactive user interface displayed by the display of the wrist-wearable device, where the adjustment to the view of the interactive user interface causes a change in perspective in the view of the interactive user interface.

(B30) In some embodiments of B29, the interactive user interface is a first interactive user interface, and the method further includes, while displaying a second interactive user interface including a plurality of animated avatars corresponding to a respective plurality of user, in accordance with receiving a user input at the interactive user interface, causing an adjustment to a view of the second interactive user interface displayed by the display of the wrist-wearable device, wherein the adjustment to the view of the second interactive user interface causes a change in perspective in the view of the second interactive user interface such that a second subset of the plurality of users is displayed instead of a first subset of the plurality of users.

(B31) In some embodiments of B1-B30, a wearer of the wrist-wearable device is associated with a wearer animated avatar, and the method further includes: (i) presenting the wearer animated avatar including a selectable user interface element for causing the wearer animated avatar to be shared with the user of the different electronic device via the display of the wrist-wearable device, and (ii) responsive to wearer selection of the selectable user interface user interface element, providing the wearer animated avatar to be shared with the user of the different electronic device (e.g., shared with another user of a different electronic device).

(B32) In some embodiments of any one of B1-B31, the method includes (i) receiving a wearer input responsive to the modified animated avatar, (ii) obtaining (e.g., generating) a wearer animated avatar based on the wearer input such that the wearer animated avatar is representative of the wearer input, and (iii) causing the wrist-wearable device to present, via the display, the wearer animated avatar responsive to the modified animated avatar. In some embodiments, the wearer animated avatar is provided to the user of the different electronic device and is provided as modified based on the wearer input.

(B33) In some embodiments of any one of B1-B32, the interactive user interface is caused to display the animated avatar and the modified animated avatar at the display of the wrist-wearable device concurrently or sequentially.

(B34) In some embodiments of B33, while the animated avatar and the modified animated avatar are being displayed at the interactive user interface, responsive to a wearer gesture, adjusting a visual element of the animated avatar and the modified animated avatar (e.g., in real time).

(B35) In some embodiments of B34, (i) the wearer gesture is an in-air hand gesture, and (ii) the in-air hand gesture is detected, at least in part, by one or more sensors of the wrist-wearable device.

(B36) In some embodiments of any one of B34-B35, (i) the animated avatar and the modified animated avatar include humanoid-shaped three-dimensional objects, and (ii) the humanoid-shaped three-dimensional objects including at least one characterization element corresponding to the user of the different electronic device.

(B37) In some embodiments of B36, (i) the adjusting of the visual element of the modified animated avatar is based on a selection of an accessory item, and (ii) based on the selection of the accessory item, the accessory item is presented as being worn by the humanoid three-dimensional object in the modified animated avatar.

(C1) In a different aspect, a wrist-wearable device is used in conjunction with performance of the method of any of A1-B37 is provided. A capsule portion (which can be detachable from the band portion of the wrist-wearable device) of the wrist-wearable device can also be used in conjunction with performance of the method of any of A1-B37.

(D1) In another aspect, means for performing the method of any of A1-B37 is provided, and the means can include hardware and software components of a wrist-wearable device and/or head-worn wearable device.

(E1) In one more aspect, a non-transitory, computer-readable storage medium is provided. The storage medium can include instructions that, when executed by a wrist-wearable device, cause the wrist-wearable device to perform or cause performance of the method of any of A1-B37.

(F1) In yet one more aspect, a system comprising a head-worn wearable device and a wrist-wearable device is provided. The system can be configured to perform the method of any of A1-B37 using the head-worn wearable device and the wrist-wearable device.

(G1) In one further aspect, a non-transitory, computer-readable storage medium is provided. The storage medium can include instructions that, when executed by a head-worn wearable device, cause the head-worn wearable device to perform or cause performance of the method of any of A1-B37.

Note that the various embodiments described above can be combined with any other embodiments described herein. It should be noted that the language used in the specification has been principally selected for readability and instructional purposes, and not necessarily have been selected to delineate or circumscribe the subject matter described herein.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in this art will appreciate upon reading this disclosure.

FIGS. 1A-1G illustrate example user interfaces and inputs for enabling quick interactions between a user and one or more contacts using a wrist-wearable device and a head-worn wearable device, in accordance with some embodiments.

FIGS. 2A-2I illustrate example user interfaces and inputs for enabling quick interactions between the user and one or more contacts using a wrist-wearable device, in accordance with some embodiments.

FIGS. 3A-3L illustrate example user interfaces and inputs for editing and updating the plurality of representations of contacts that is presented on a watch-face user interface, in accordance with some embodiments.

FIGS. 5A-5F illustrate navigation through one or more pluralities of representations of contacts, in accordance with some embodiments.

FIGS. 10A-10B illustrate customization of an animated avatar at a wrist-wearable device, in accordance with some embodiments.

FIGS. 11A-11H illustrate examples of animated avatars presented at wrist-wearable devices, in accordance with some embodiments.

FIGS. 14A-14E illustrate an example wrist-wearable device, in accordance with some embodiments.

In accordance with common practice, like reference numerals may be used to denote like features throughout the specification and figures.

DETAILED DESCRIPTION

Figure 1B:
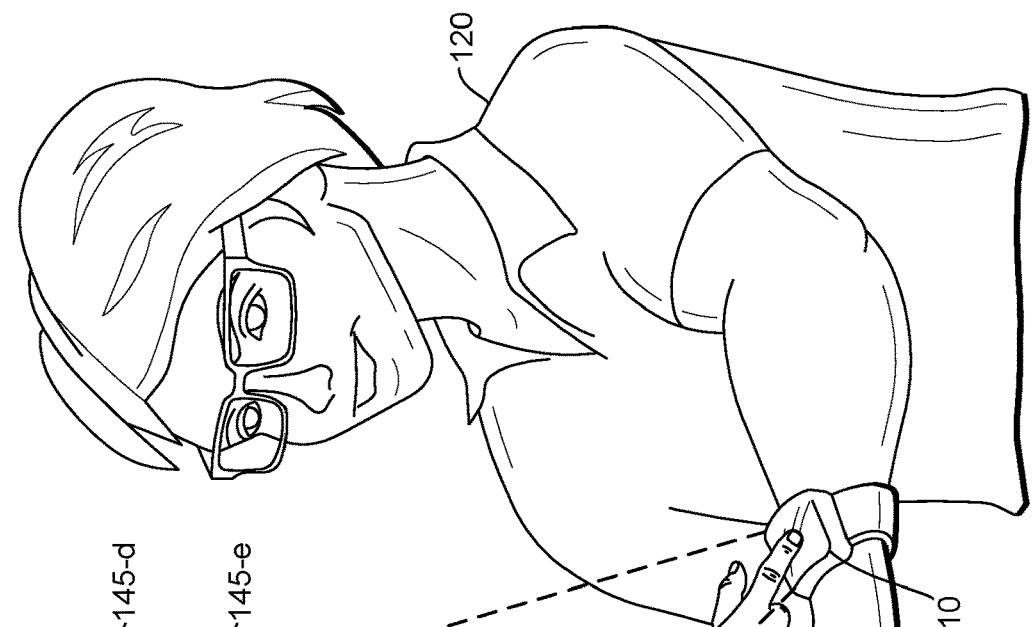

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

FIGS. 1A-1G illustrate example user interfaces and inputs for enabling quick interactions between a user and one or more contacts using a wrist-wearable device and a head-worn wearable device, in accordance with some embodiments. In particular, the wrist-wearable device 110 displays, on a display 115, a watch-face user interface (e.g., a watch-face user interface that includes an indication of the current time (10:00 AM in the depicted example) as well as a first group of representations of contacts that are associated with particular applications (e.g., referred to as a contacts user interface 140 herein, which contacts user interface 140 is a part of the watch-face user interface, but other groups of representations of contacts can also be displayed as part of the watch-face user interface including any of the example groups discussed with reference to FIGS. 5A-5C) including a plurality of representations of contacts 145. The wrist-wearable device 110 is configured to receive and present video and/or audio data via the display 115 and a speaker. The wrist-wearable device 110 is further configured to capture video data and/or audio data, via an imaging device 117 (e.g., a camera) and a microphone 16216 (FIGS. 14A-14B) and send the captured data to another device (e.g., computing device, such as a phone, tablet, laptop, a head-worn wearable device, a wrist-wearable device, etc.) distinct from the wrist-wearable device 110. In some embodiments, the wrist-wearable device 110 includes one or more sensors (e.g., any of the sensors 1825, such as a heart rate sensor 1058, neuromuscular-signal sensors (e.g., electromyography (EMG) sensors), SpO2 sensors, altimeter, thermal sensor or thermal couple, ambient light sensor, ambient noise sensor; FIG. 14C).

In some embodiments, the wrist-wearable device 110 is communicatively coupled to a head-worn wearable device 130 or other electronic device (e.g., smartphone 125). In some embodiments, the head-worn wearable device 130 includes a speaker and an imaging device 134. In some embodiments, the lenses of the head-worn wearable device 130 include an on-screen display (e.g., a heads-up display (HUD) 139; FIG. 1C). Alternatively, or additionally, in some embodiments, the head-worn wearable device 130 includes one or more indicators (e.g., LEDs) that communicate to a user notification and/or hardware components that are being currently utilized (e.g., microphone, speakers, and/or camera are active). Examples of the indicators provided via the head-worn wearable device 130 are provided below in reference to FIG. 1C. In some embodiments, the wrist-wearable device 110 utilizes one or more components of the head-worn wearable device 130 (or other electronic device (e.g., smartphone 125) communicatively coupled to the wrist-wearable device 110) to cause the performance of one or more actions, such as capturing image data, capturing audio data, presenting image data, presenting audio data, receiving data, and/or transmitting data.

Figure 1A:

Referring to FIGS. 1A and 1B, the user 120 utilizes the wrist-wearable device 110 to view the plurality of representations of contacts 145. Each representation of a contact 145 is associated with an application (which association can be graphically depicted within each respective representation via an icon of the application, as is shown in the example of FIG. 1B in which application icons are depicted in an upper-right corner of each of the representations). For example, in FIG. 1B, a first representation of a contact 145-*a* is associated with a fitness application, a second representation of a contact 145-*b* is associated with a messaging application, a third representation of a contact 145-*c* is associated with a calling application, a fourth representation of a contact 145-*d* is associated with an image sharing application, and a fifth representation of a contact 145-*e* is associated with a music application. Non-limiting examples of the applications that can be associated with a respective representation of a contact include video and/or audio calling applications, fitness applications, image-sharing applications, video-sharing applications, live-streaming applications, gaming applications, file-sharing applications (e.g., use for transferring files from one place or device to another place or device), social media-sharing applications, media-sharing or streaming applications (e.g., music, shows, or other streaming services), location-sharing applications, etc. In some embodiments, a representation of a contacts provides the user 120 with the ability to view status updates directly from the watch-face user interface (e.g., avatars of the contacts displayed within representations can be depicted as performing an activity that the contact is performing on their own device, such as watching a movie, driving, etc.). As one example, a status update indicating that the contact associated with representation 145-*a* is watching a movie can be represented by an avatar of that contact eating popcorn. In this way, the watch-face user interface can be used to provide the user 120 with immediate access to status updates related to their closest contacts, while also giving them a quick way to share data with those contacts directly from the watch-face user interface.

Figure 1F:
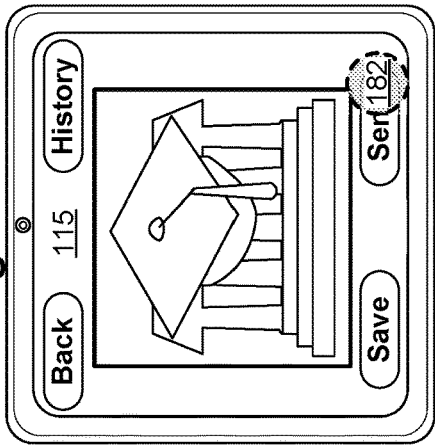
Figure 1G:
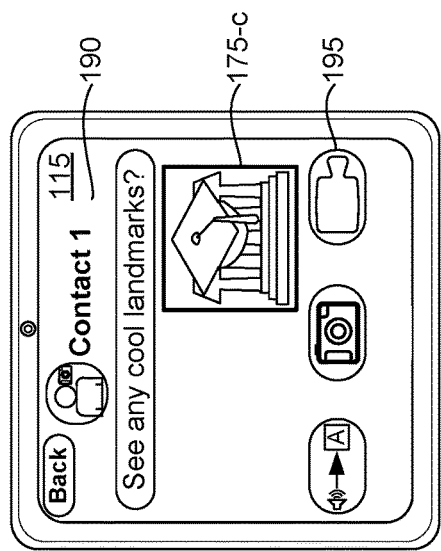
Figure 1E:
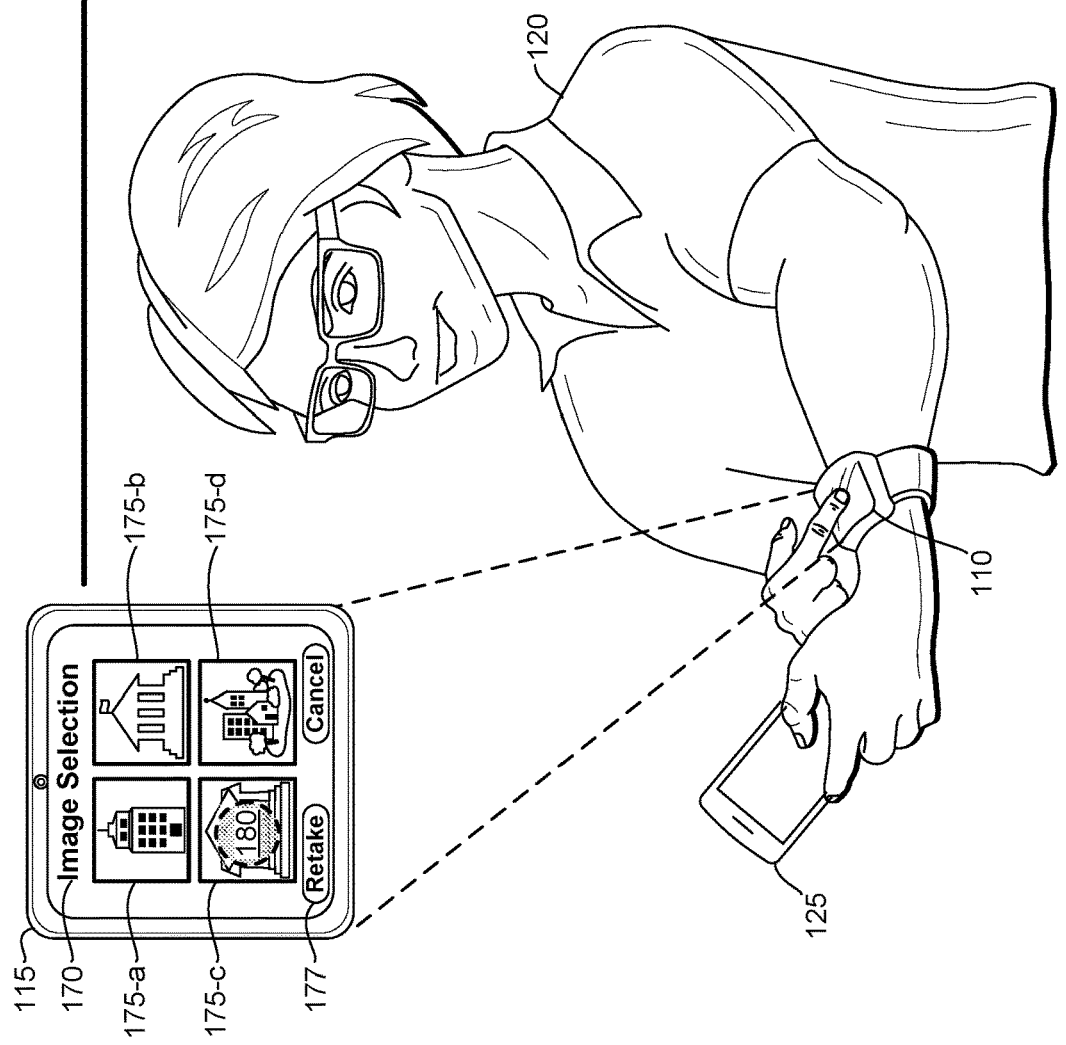

Selection of a representation of a contact of the plurality of representations of contacts 145 causes activation of an application that is used to interact with (e.g., share data with) the contact. In some embodiments, selection of a representation of a contact of the plurality of representations of contacts 145 causes activation of one or more hardware components that are used by the associated application. In some embodiments, the selection of the representation of the contact of the plurality of representations of contacts 145 can cause the activation of one or more hardware components integrated with and/or communicatively coupled to the wrist-wearable device 110. For example, as shown in FIGS. 1B and 1C, selection of the fourth representation of a contact 145-*d* (represented by user input 150, FIG. 1B) causes the activation of an image-sharing application as well as an imaging device 134 of the head-worn wearable device 130 (in some embodiments, a determination is made as to whether to user the head-worn wearable device's imaging sensor or the imaging sensor of the wrist-wearable device should be used, which determination can be based on the head-worn wearable device being communicatively coupled to the wrist-wearable device and, optionally, based on performance thresholds based on computing and/or power values at the head-worn wearable device and/or the wrist-wearable device). The imaging device 134 of the head-worn wearable device 130, in this example, is used to capture one or more images of the physical world to be shared with the selected contact (e.g., Contact 1; FIG. 1G, where Contact 1 is the contact associated with representation 145-*d* of FIG. 1B) via the image-sharing application.

Figure 9:
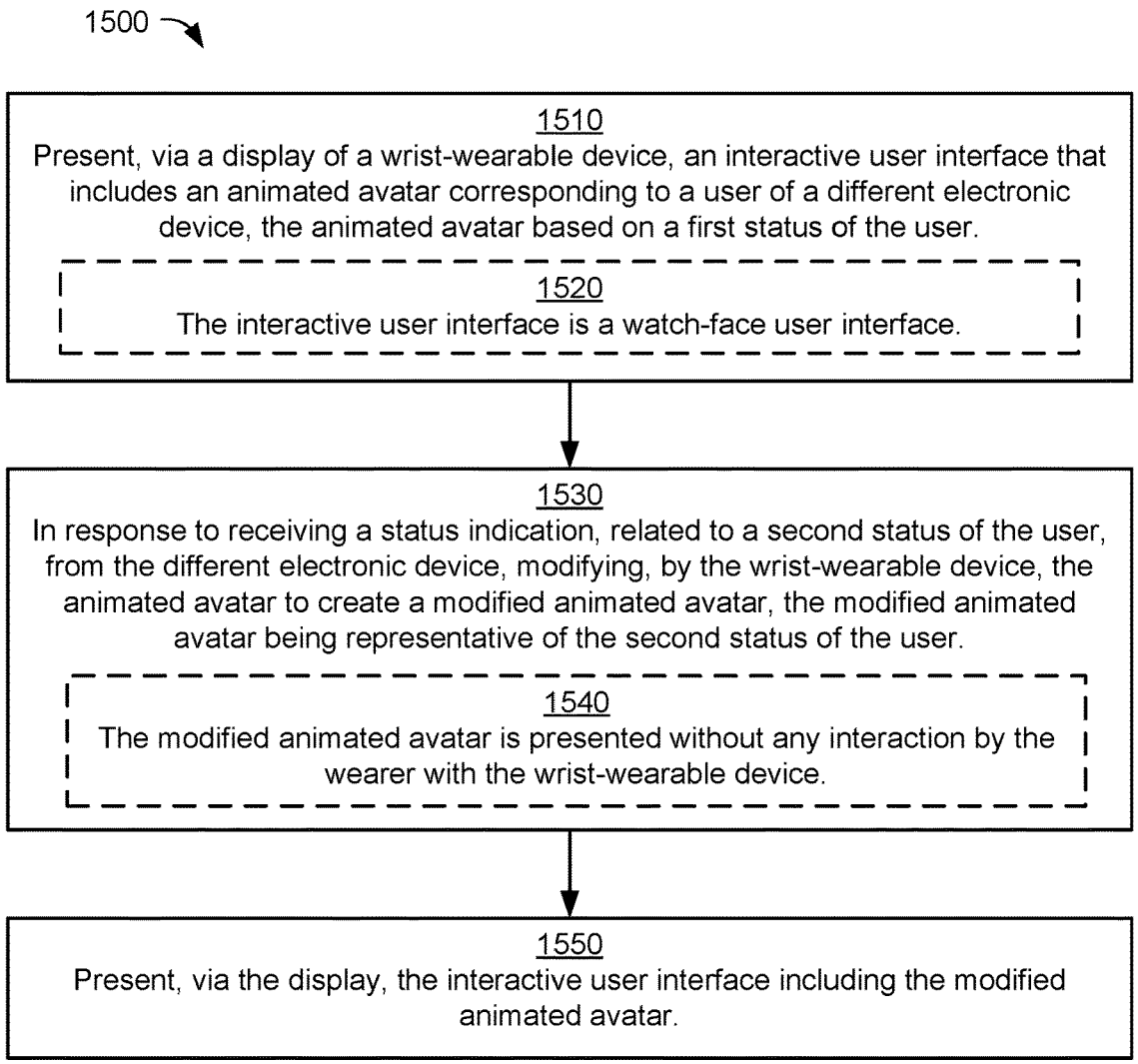
FIG. 9 illustrates a detailed flow diagram of a method for present animated avatars corresponding to users based on respective users' statuses, in accordance with some embodiments.

In some embodiments, the user input 150 is a long press on a portion of the display 115 that causes one or more additional options to be presented to a user. A long press, for purposes of this disclosure, can be press on a portion of a touch display detected for at least a predetermined period of time (e.g., two seconds). The additional options are related to the application. For example, a long press directed to a representation of a contact related to an image-sharing application can present image-capture configuration options, including options for selecting a number of images to be captured, a capture timer, etc. Although FIG. 1B illustrates selection of a representation of a contact via a user input 150 provided via a touch command at the display 115, the user 120 can select the representation of the contact via a voice command, detection of one or more gestures (e.g., hand gestures, finger movements, or thumb movements recognized by the wrist-wearable device 110 using one or more neuromuscular sensors 965; FIG. 9), and/or actuation of a button.

In some embodiments, indicators are provided on either or both of the displays of the wrist-wearable device 110 and the head-worn wearable device 130 to indicate the hardware components that are being currently utilized. For instance, in the example of FIG. 1C, at least a video-capturing indicator 135, an audio-capturing indicator 136, and/or audio-presentation indicator 137 are presented to the user via the head-worn wearable device 130. The indicators provide the user 120 with quickly-interpretable indicators that a camera, microphone, and speaker, respectively, of the head-worn wearable device 130 are being utilized. In some embodiments, the video-capturing indicator 135 is displayed in a first color (e.g., green), the audio-capturing indicator 136 is displayed in a second color (e.g., yellow), and the audio-presentation indicator 137 is displayed in a third color (e.g., red). Each respective indicator is only displayed once the corresponding hardware of that device is being utilized. Alternatively, in some embodiments, when the corresponding hardware is not being utilized, the applicable indicator can be displayed with a level of transparency to indicate an inactive state.

After the user 120 selects of the fourth representation of the contact 145-*d* to causes the activation of the image-sharing application and the imaging device 134 of the head-worn wearable device 130, the user 120 can provide an input to capture one or more images. In some embodiments, the input is provided at one of the wrist-wearable device 110 (e.g., via a touch command at a display 115 and/or actuation of a button) and/or the head-worn wearable device 130 (e.g., at a frame 160 of the head-worn wearable device 130). In some embodiments, the input is initiated via a voice command and/or one or more detected gestures (e.g., in-air hand gestures detected by the wrist-wearable device, which can include a thumb making contact with digits on the user's hand (e.g., using detected EMG signals) and do not require contacting a display or even a physical device). In some embodiments, while the imaging device 134 of the head-worn wearable device 130 is active, the wrist-wearable device 110 (via display 115) and/or the head-worn wearable device 130 (via HUD 139) present to the user 120 a field of view of the imaging device 134 of the head-worn wearable device 130. In this way, the user 120 is able to focus on objects within the field of view of the imaging device and can thus view a preview of the objects they are intending to capture.

After the user 120 provides an input to capture one or more images, the user 120 is notified (e.g., via an audio, visual, or haptic (e.g., vibration) cue) that an image was captured. The notification can be provided via the wrist-wearable device 110 and/or the head-worn wearable device 130. For example, as shown in FIG. 1D, the HUD 139 of the head-worn wearable device 130 shows a captured image 165 of the field of view of the imaging device 134 of the head-worn wearable device 130 as well as a notification 167 that the image has been captured.

In some embodiments, the user 120 is presented with a user interface including one or more captured images 175 for user selection. For example, shown in FIG. 1E, the user is presented with an image-selection user interface 170 including a first image 175-*a*, a second image 175-*b*, a third image 175-*c*, and a fourth image 175-*d* for user selection (each of the images 175 would have been captured via the imaging device of the head-worn wearable device in this example). In some embodiments, the image-selection user interface 170 includes images 175 captured by the imaging device after it was activated (responsive to user selection of a representation of a contact). Although four images are shown in the image-selection user interface 170, any number of images 175 can be include in the image-selection user interface 170. In some embodiments, the user can scroll through the different images 175 presented in the image-selection user interface 170 to select the one or more desired images.

The image-selection user interface 170 includes one or more user interface elements 177 that provide the user 120 with additional flexibility. For example, the image-selection user interface 170 can include a user interface element that allows the user to retake one or more images and a user interface element for cancelling the action (e.g., sharing of captured image(s) with the contact associated with representation 145-*d* in this ongoing example). The above examples are non-limiting. Additional user interface elements can include a settings user interface element that allows the user 120 to define one or more capture settings, a save user interface element that allows the user 120 to save one or more images, a history or gallery image user interface that allows the user 120 to view previously captured (or sent) images. In some embodiments, the user interface elements 177 are based on the application being used.

In some embodiments, after user selection of one or more images 175 (represented by user input 180), a confirmation user interface is optionally presented to the user 120. For example, as shown in FIG. 1F, the user 120 can be presented with a user interface including one or more user interface elements that allow the user to save the selected images, send the selected images, review an image history, return, etc. Selection of the send user interface element (as shown by user input 182), causes the image to be sent to the contact associated with the representation that was selected from the watch-face user interface via the associated application. For example, shown in FIG. 1G, the selected third image 175-*c* is sent to Contact 1 via the image-sharing application (e.g., the image-sharing application is updated to include an electronic message with the image 175-*c* (or at least a thumbnail representation of the image 175-*c*). In some embodiments, after the image is sent, the user 120 is presented with a messaging user interface or an interaction user interface 190 that provides a history of one or more interactions between the user 120 and the selected contact via the associated application. In some embodiments, the interaction user interface 190 includes one or more user interface elements 195 that allow for the user to further interact with the selected contact. For example, the one or more user interface elements 195 can include a voice-to-text command, an image-capture command, a video-capture command, a text-messaging command, and others. In some embodiments, the confirmation user interface shown in FIG. 1F is optional such that one or more images 175 selected from the image-selection user interface 170 can be sent to the selected contact without any need to display the confirmation user interface depicted in FIG. 1F. In some embodiments, a captured image (captured via the imaging device of the head-worn wearable device and/or the imaging device of the wrist-wearable device can be sent immediately after capturing, such that the user interfaces of FIGS. 1E-1G need not be presented at all as images are immediately sent as they are captured, and no additional inputs need be received from the user 120 to cause the sharing action).

FIGS. 2A-2I illustrate example user interfaces and inputs for enabling quick interactions between the user and one or more contacts using a wrist-wearable device 110, in accordance with some embodiments. As described above in reference to FIGS. 1A-1G, the wrist-wearable device 110 displays, on a display 115, a watch-face user interface (e.g., contacts user interface 140) including a plurality of representations of contacts 145. The wrist-wearable device 110, responsive to a selection of a contact of the plurality of representations of contacts 145 (represented by user input 150) causes activation of an application that is used to interact with the contact, as well as one or more hardware components that are used by the associated application.

As shown in FIGS. 2A and 2B, selection of the representation 145-*d* of a contact causes the activation of an associated application (in this example, an image-sharing application) as well as activation of an imaging device 117 of the wrist-wearable device 110. As compared to the example provided above in reference to FIGS. 1A-1G, the user 120 in the context of the example of FIGS. 2A-2C is either not wearing any head-worn wearable device or the system makes a decision to use the imaging sensor of the wrist-wearable device instead of an imaging device of the head-worn wearable device (e.g., because the head-worn wearable device has a low battery, such that activating its imaging sensor would cause battery level at the head-worn wearable device to drop below a threshold level, such as 10% of overall battery power). The imaging device 117 (which can be one of two imaging sensors, including a front-facing imaging device and a rear-facing imaging device) of the wrist-wearable device 110 is used to capture one or more images of the physical world to be shared with the selected contact (e.g., Contact 1; FIG. 1G) via the image-sharing application. As described above in reference to FIG. 1B, the selection of the representation of the contact 145-*d* can be a user input 150 provided at the wrist-wearable device 110, such as touch command at the display 115, a detected gesture, a voice command, etc. After selection of the fourth representation of the contact 145-*d*, an image capture user interface 210 is presented to the user 120.

The image-capture user interface 210 presents a field of view of the imaging device 117 (which, in this example, is the rear-facing imaging device, but in other examples can be the front-facing imaging sensor) of the wrist-wearable device 110 and allows the user 120 to capture one or more images via the wrist-wearable device 110. More specifically, the user 120 can provide one or more user inputs (e.g., input 220) to capture an image using the imaging device 117 of the wrist-wearable device. In some embodiments, the wrist-wearable device 110 includes one or more optional user interface elements 225 that allow the user 120 to adjust one or more capture settings. For example, as shown in FIG. 2B, the image capture user interface 210 includes a "mode" user interface element that allows the user switch between different camera modes of the imaging device 117 (e.g., HDR mode, panoramic mode, night mode, etc.) and a settings user interface element that allows the user to adjust one or more capture settings (e.g., minimum size, filters, overlays, etc.). Although FIG. 2B shows the capture of a single image 215, the imaging device 117 of the wrist-wearable device 110 can also permit capturing of a plurality of images as described above in reference to FIG. 1E.

After capturing an image or images, the user is presented with an optional confirmation user interface as shown in FIG. 2C and described above in reference to FIG. 1F. In some embodiments, selection of the fourth representation of the contact 145-*d* causes the imaging device 117 of the wrist-wearable device 110 to automatically capture the image 215 and present the image to the user 120 for confirmation before sending the image. Alternatively, in some embodiments, after the image is captured, it is automatically sent to the selected contact and no confirmation user interface is presented at all (in this use case, the wrist-wearable device thus is able to allow a user to click on the fourth representation, capture an image, and share that image using just two inputs-one to select the fourth representation and one to cause capturing of the image). Additional details concerning sending of images via the wrist-wearable device 110 are described above in reference to FIGS. 1A-1G.

FIG. 2C further shows a user input 230 selecting a user interface element "back," which causes the wrist-wearable device 110 to cease the sharing operation and to return to present, via display 115, the watch-face user interface including the plurality of representations of contacts 145 as shown in FIG. 2D. In FIG. 2D, the user 120 selects (represented by user input 240) a first representation of a contact 145-*a* of the plurality of representations of contacts 145. The first representation of a contact 145-*a* is associated with a fitness application that allows the user 120 of the wrist-wearable device 110 to share and/or compare performance of a physical activity against at least the contact associated with the first representation 145-*a*. Similar to the selections of the fourth representation of the contact 145-*d*, selection of the first representation of the contact 145-*a* causes activation of the fitness application and, can optionally (in the event that a new exercise activity is initiated, rather than sharing existing exercise data) also activate one or more hardware components that are used by the fitness application (e.g., one or more sensors 1825 described with respect to FIG. 16C such as a hear rate sensor, an SpO2 sensor, GPS, etc.).

In some embodiments, selection of the first representation of the contact 145-*a* causes the wrist-wearable device 110 to present, via display 115, a workout-selection interface 250. The workout-selection interface 250 includes a user input element 255 that allows the user 120 to scroll through and select a workout (or other physical activity) to initiate. For example, the user 120 can select to initiate a weight training session by selecting "Weight Training" user input element 255. Although the user input element 255 is shown as a scrollable list of different elements, the user input element 255 can be a drop-down menu, a list of one or more user interface elements, one or more radio buttons, one or more check boxes, etc. In some embodiments, the workout-selection interface 250 includes one or more user interface elements that allow the user to customize their workout. For example, the user 120 can manually input their type of workout, their target heart rate, running pace, repetition counts, etc. In some embodiments, presentation of the workout-selection interface 250 is optional. In such cases, selection of the first representation of the contact 145-*a* causes the wrist-wearable device 110 to initiate a generalized workout tracker or initiate a workout based on the user 120's history and/or preferences. For example, the user 120 can define a workout schedule and selection of the first representation of the contact 145-*a* causes the wrist-wearable device 110 to initiate the workout type defined in the workout schedule. As another example, the wrist-wearable device 110 can track the user's workouts over a predetermined period of time (e.g., the last week, the last month, etc.) and, when the first representation of the contact 145-*a* is selected, initiate a workout type based on the workouts performed in the predetermined period of time.

Turning to FIG. 2F, a workout interface 260 presented by the display 115 of the wrist-wearable device 110 is shown. The workout interface 260 allows the user 120 to monitor the performance of a physical activity and includes information relative to the user 120's current physical activity. In some embodiments, the workout interface 260 includes one or more user interface elements 265 that allow the user 120 to customize their workout, pause their workout, edit their workout, end their workout, etc. In some embodiments, the user interface elements 265 of the workout interface 260 include one or more subjective input elements that allows the user 120 to provide feedback on the workout. The user 120's workout is tracked and saved by the wrist-wearable device.

In some embodiments, activation of the fitness application via selection of a representation of a contact also causes the wrist-wearable device 110 to notify the associated contact of the physical activity being performed by the user 120 via the fitness application. For example, as shown in FIG. 2G, selection of the first representation of the contact 145-*a* causes the wrist-wearable device 110 to notify "Contact 2" of the user 120's current physical activity via the user interface element 275 that includes information concerning the user 120's performance of the physical activity. The user 120 can define the type of information that is shared with this one particular contact and/or to restrict information shared with all contacts. For example, the user 120 can define information to include or exclude from fitness-related notifications provided to contacts, such as heart rate, workout type, workout duration, etc. In some embodiments, activation of the fitness application (via selection of a representation of a contact) causes the wrist-wearable device 110 to display an interaction interface 270 associated with the fitness application between Contact 2 and the user 120. Similar to the user interface described above in reference to FIG. 1G, the interaction user interface 270 can include one or more user interface elements that allow the user 120 to further interact with the contact or return to the previous watch-face user interface (e.g., as shown by user input 230 selecting to go "Back"). While the fitness-related example of FIGS. 2D-2G depict and describe sharing ongoing data concerning performance of a physical activity, data concerning completed physical activities can also be selected for sharing (e.g., data concerning a completed run, bike ride, rowing activity, etc. can be included as available sharing options from within a user interface like FIG. 2E; in some embodiments, selection of the representation 145-a can cause immediate sharing of a most-recently completed physical activity, such that the user interfaces of FIGS. 2E-2F need not be presented at all and data concerning this physical activity can be initiated via a single input provided on the watch-face user interface).

In FIG. 2H (which can be re-displayed after user input 230 shown in FIG. 2G), selection of a fifth representation of a contact 145-e causes the activation of a media-streaming application and, optionally also activate one or more hardware components that are used by the media-streaming application. For example, selection of the fifth representation of the contact 145-e can cause speakers and/or a display of the wrist-wearable device 110 or speakers and/or displays communicatively coupled to the wrist-wearable device 110 to activate such that media content (e.g., music, shows, podcasts, movies, etc.) can be presented to the user 120. As shown in FIG. 2I, selection of the fifth representation of the contact 145-e causes the wrist-wearable device 110 to notify the associated contact (e.g., "Contact 4") of the current media content that the user 120 is consuming (e.g., The Beatles—Track 1). In some embodiments, activation of the media streaming application (via selection of a representation of a contact) causes the wrist-wearable device 110 to display an interaction interface 290 between Contact 4 and the user 120. In some embodiments, the interaction interface 290 can be a general messaging interface of the device (e.g., a text messaging interface integrated or installed on the wrist-wearable device 110 or other device communicatively coupled to the wrist-wearable device 110). The interaction interface 290 is similar to the user interfaces described above in reference to FIGS. 1G and 2G. In some embodiments, selection of the representation 145-e can cause the device to immediately share data concerning a mostly-recently listened-to song (on the wrist-wearable device and/or listened-to on a device that is logged-in to a social-media account associated with both the wrist-wearable device and other electronic devices associated with the same social-media account) with a contact associated with representation 145-e, such that no interaction user interface 290 need be presented and the sharing of the data concerning the mostly-recently listened-to song can be sent to the contact associated with representation 145-e using just a single input provided at the watch-face user interface.

Although not shown, in some embodiments, selection of the fifth representation of the contact 145-e can cause the wrist-wearable device 110 to display, via display 115, a media streaming user interface that allows the user 120 to select media content items (e.g., songs, playlists, shows, podcasts, music videos, etc.), store media content items in local memory (e.g., memory 16400; FIG. 14C), share media content with other users, edit media content items, etc. The non-limiting examples provided above are provided as illustrations of the different applications that can be caused to activate via selection of a representation of a contact (of the plurality of representations of contacts 145). Different applications not shown and described in FIGS. 1A-2I can be caused to activate based on selecting certain representations of contacts from the watch-face user interface. As described below in reference to FIGS. 3A-3L, the user 120 can associate different applications with the plurality of representations of contacts 145, and can, in certain embodiments, configure the interaction sequences for sharing of data (such as configuring whether to sharing most recent items or allow for selection of particular items).

FIGS. 3A-3I illustrate example user interfaces and inputs for editing and updating the plurality of representations of contacts that is presented on a watch-face user interface, in accordance with some embodiments. FIG. 3A illustrates a wrist-wearable device 110 displaying, on a display 115, a group of representations of the watch-face user interface (e.g., group of contacts representation in the contacts user interface 140) including a plurality of representations of contacts 145. In some embodiments, each representation of a contacts of the plurality of representations of contacts 145 is configured to move around the watch-face user interface in accordance with certain contact-specific or general movement criteria. For example, as shown in FIG. 3B, the position of the plurality of representations of contacts 145 changes. In some embodiments, each representation of a contacts of the plurality of representations of contacts 145 moves based on physical movement or activity of the user 120 (e.g., a general movement criteria that applies to all of the representations) and/or based on activity occurring at the device of one of the contacts (e.g., a contact-specific movement criteria that can apply to one representation associated with one contact, but not with all of the representations associated with other contacts). For example, while the user 120's arm is stationary, the plurality of representations of contacts 145 can move slowly around the watch-face user interface, and, once the user 120 moves their arm, the plurality of representations of contacts 145 can move faster around the watch-face user interface (with respect to the initial movement). In some embodiments, the movement of the plurality of representations of contacts 145 is based on the respective interactions between the contact and the user 120. For example, a contact with a recent interaction with the user 120 (e.g., sent and/or received messages, notifications, etc.) can have a representation of a contact that moves faster than a representation of another contact that has not had any recent interaction with the user 120.

The plurality of representations of contacts 145 can be edited by the user 120. In particular, the user 120 can add or remove one or more contacts, group one or more contacts, select one or more applications to associate with a representation of a contact. In some embodiments, the plurality of representations of contacts 145 includes a predetermined number of representations (e.g., at least two, at least five, at least seven, etc.). In some embodiments, the user 120 enters a contact editing user interface 320 via a user input 310 provided at the watch-face user interface. In some embodiments, the user input is a long press that causes one or more options to be presented to the user 120. Alternatively, in some embodiments, the user input 310 is selection of a user interface element (not shown).

The contact-editing user interface 320 (shown in FIG. 3C, and which can be accessed in one example after the user 120 provides a long-press input 310, shown in FIG. 3B, over a predetermined portion of the watch-face user interface with the plurality of representations of contacts) includes the one or more contacts included in the plurality of representations of contacts 145, one or more recent contacts, and/or one or more stored contacts. For example, as shown in FIG. 3C, contact-editing user interface 320 includes user interface elements each associated with one of contacts 1-5 (which are included in the plurality of representations of contacts 145), a recent contact (e.g., contact 6), and a saved contact (e.g., contact 7). In some embodiments, contacts of the plurality of representations of contacts 145 are identified by a checked box 325. Alternatively, contacts of the plurality of representations of contacts 145 can be identified based on highlighting, bolding, one or more radio buttons, and/or placement within a particular list. In some embodiments, the contact-editing user interface 320 includes one or more user interface elements that allow the user to further customize the plurality of representations of contacts 145 and/or save any changes to the plurality of representations of contacts 145.

FIG. 3D illustrates the removal of a contact from the plurality of representations of contacts 145. For example, in the depicted example of FIG. 3D, "Contact 3" is selected by the user 120 for removal from the plurality of representations of contacts 145 (identified by unchecked box 330), which then causes an update to the watch-face user interface such that a representation of Contact 3 would no longer be displayed on the watch-face user interface. FIG. 3E illustrates, the addition of contact 6 to the plurality of representations of contacts 145 (identified by checked box 335), which then causes an update to the watch-face user interface such that a representation of Contact 6 would then be displayed on the watch-face user interface. As shown in FIG. 3F, after "Contact 6" is added to the plurality of representations of contacts 145, it is moved to be together with the Contacts 1, 2, 4, and 5 within the user interface of FIG. 3F so that the active contacts user in conjunction with the watch-face user interface are grouped together. Similarly, "Contact 3" is moved under recent contacts.

FIGS. 3G and 3H illustrate association of an application with a representation of a contact. In some embodiments, the wrist-wearable device 110 automatically associates an application with a contact based on the recent activity and/or history of the user 120's interactions with the contact. For example, if the user consistently shares images (e.g., 50-75% of the user 120's interactions with contact 1 related to sharing images with contact 1) with contact 1, contact 1 can automatically be associated with an image-sharing application. Alternatively, if a contact has not been associated with an application or the user 120 would like to manually select an application to associate with a contact, the user can be presented with an application selection user interface 355. For example, in FIG. 3G, the user 120 selects to remove contact 5 from the plurality of representations of contacts 145 and add Contact 7. Contact 7, as shown in FIG. 3G, is not associated with an application. After selection of Contact 7, the user 120 can be presented with the application selection user interface 355 to associate Contact 7 with a particular application. For example, as shown in FIG. 3H, user input 365 selects to associate the image-sharing application 360 to contact 7. As described above in reference to FIGS. 1A-1G, non-limiting examples of the applications that can be associated with a representation of a contact include, video and/or audio calling applications, fitness applications, image-sharing applications, video-sharing applications, live streaming applications, game applications, file-sharing applications, social media-sharing applications, media sharing or streaming applications, location sharing applications, etc.

Turning to FIG. 3I, the user 120 can select to create a group of contacts to include in the plurality of representations of contacts 145. More specifically, the user 120 can select a contact to group with one or more contacts of the plurality of representations of contacts 145. For example, as shown in FIG. 3I, the user 120 selects contact 8 to group with another contact. In some embodiments, user input 370 (selecting contact 8) is a long press that causes an additional user interface element to be displayed to the user 120 (i.e., "Group Contacts"). In some embodiments, responsive to selection of the group contacts user interface element causes the wrist-wearable device 110 to display a group selection user interface 370 as shown in FIG. 3J. The group selection user interface 370 allows the user 120 to select at least one other contact in the plurality of representations of contacts 145 to group together. For example, the user 120 selects (represented by user input 375) to group Contact 8 with Contact 7. After grouping the one or more contacts together, the user can save the grouping. As shown in FIG. 3K, after the group is defined, the group is shown as a selected for inclusion in the plurality of representations of contacts 145 (e.g., checked box 380).

FIG. 3L shows the watch-face user interface with an updated plurality of representations of contacts 145. For example, as shown in FIG. 3L, the plurality of representations of contacts 145 incudes grouped Contacts 7 and 8 (represented by representation of a contact 385; a selection of contact 385 would cause sharing of data from the associated application with both of Contacts 7 and 8, thus allowing for quick and easy sharing of data with multiple different contacts directly from a watch-face user interface).

Figure 4C:
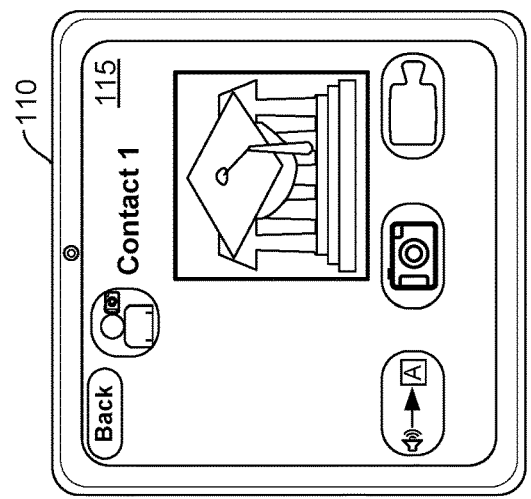
FIGS. 4A-4C illustrate quick sharing of an image with a contact from within an application, in accordance with some embodiments.
Figure 4B:
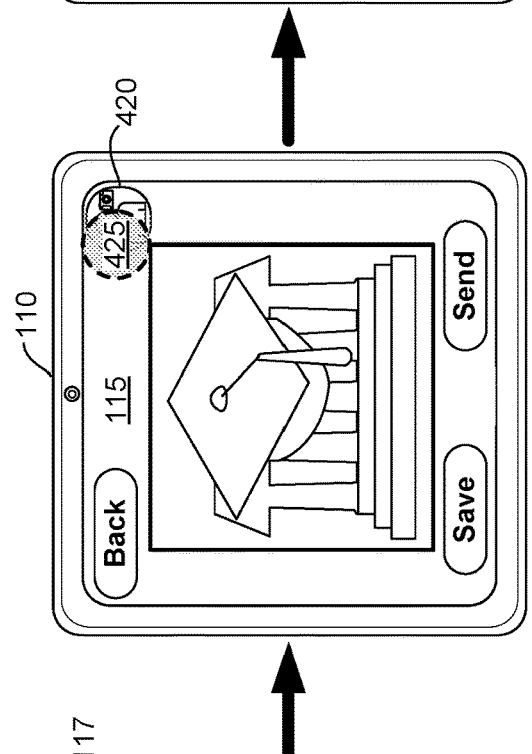
Figure 4A:
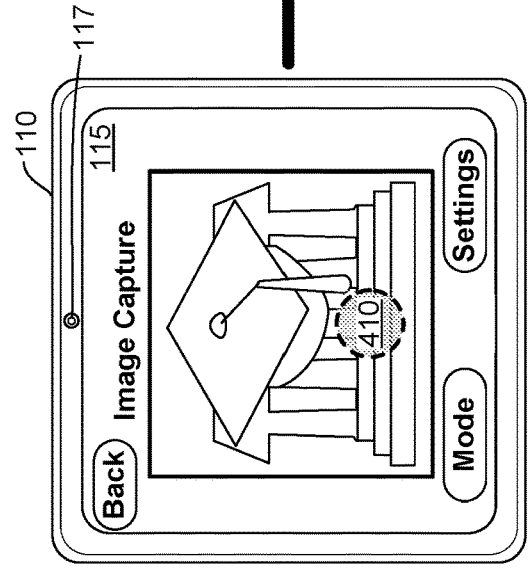

FIGS. 4A-4C illustrate quick sharing of an image with a contact from within an application, in accordance with some embodiments. In some embodiments, a user 120 (FIG. 1A-1G) can quickly interact with one or more contacts of plurality of representations of contacts 145 from within an application of the wrist-wearable device 110 (in addition to the quick sharing interactions available via the watch-face user interface) that is being used by the user. For example, in FIG. 4A, the user 120, via an image capturing application, captures one or more images using an imaging device 117 of the wrist-wearable device. After capturing an image (as shown by user input 410), the user is presented with a user interface that allows the user 120 to share information with one or more contacts of the plurality of representations of contacts. For example, FIG. 4B illustrates a representation of a contact 420 that, once selected by the user 120 (as shown by user input 425), causes the wrist-wearable device to send the captured image to the contact as shown in FIG. 4C. This additional feature provides the user 120 with greater flexibility in interacting with their contacts. More specifically, the user 120 can use different applications and quickly share information with a contact directly from within the application.

FIGS. 5A-5F illustrate navigation through one or more pluralities of representations of contacts, in accordance with some embodiments. In some embodiments, the user 120

(FIGS. 1A-1G) can store more than one plurality of representations of contacts for access via a watch-face user interface of a wrist-wearable device 110. In some embodiments, each plurality of representations of contacts is displayed, via display 115, in respective watch-face user interfaces. For example, FIG. 5A shows a first plurality of representations of contacts in a first watch-face user interface (e.g., contacts user interface 140), FIG. 5B shows a second plurality of representations of contacts in a second watch-face user interface (e.g., friends user interface 520), and FIG. 5C illustrates a third plurality of representations of contacts in a third watch-face user interface (e.g., work user interface 530). In some embodiments, the user 120 can navigate through each watch-face user interface via a user input dragging to the left and/or the right. For example, a first touch command 510 at the display 115 pressing down and moving to the left can cause the wrist-wearable device 110 to switch from the contacts user interface 140 to the friends user interface 520 and a second touch command 525 at the display 115 pressing down and moving to the left can cause the wrist-wearable device 110 to switch from the friends user interface 520 to the work user interface 530. Although the above examples describe touch commands, different inputs such as voice commands, hand gestures, button actuations, etc. can be used to navigate through the watch-face user interfaces.

Figure 5F:
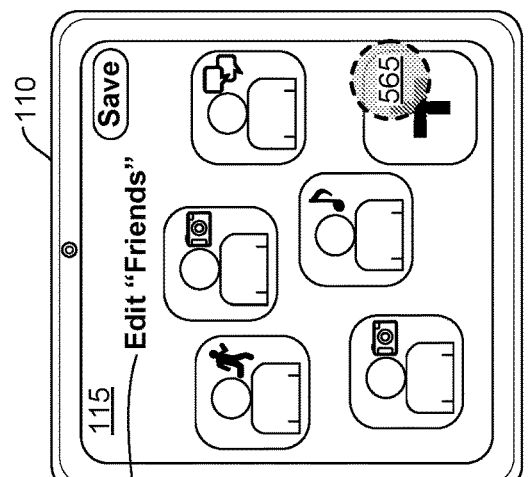
Figure 5E:
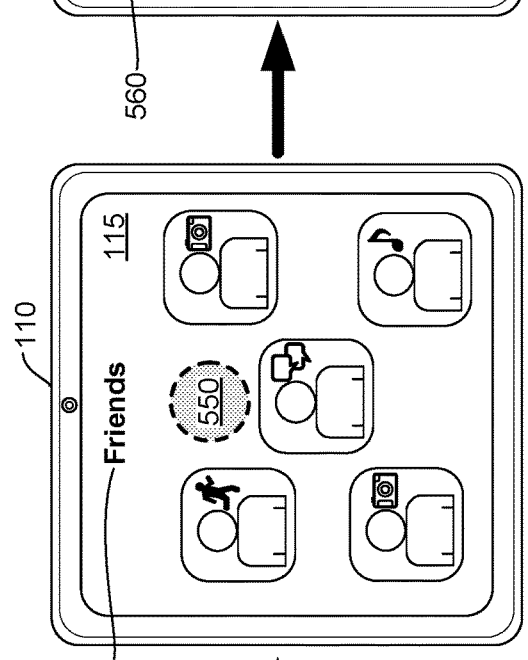
Figure 5D:
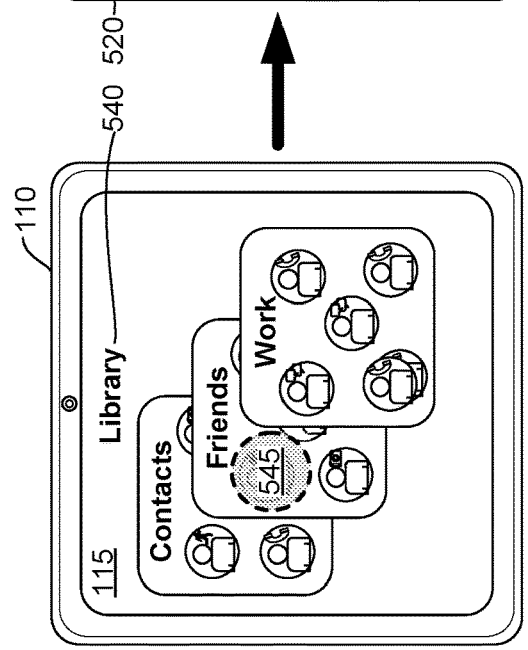

In some embodiments, the user 120 can provide an input to view a library of the pluralities of representations of contacts. For example, a user input 535 (e.g., a long press and/or one or more gestures (e.g., a double tap, triple tap, dragging motion, etc.) can be used to present the user 120 with a library user interface 540 including respective watch-face user interfaces for each plurality of representations of contacts. For example, as shown in FIG. 5D, after receiving user input 535, the wrist-wearable device 110 presents the user with watch-face user interfaces for each plurality of representations of contacts that the user 120 can select and focus on. As an example, user input 545 selecting the friends user interface 520 cause the wrist-wearable device to display, on display 115, the friends user interface 520 as shown in FIG. 5E.

In some embodiments, the user 120 can edit the contacts associated with each plurality of representations of contacts. For example, as shown in FIGS. 5E and 5F, the user 120 provides a user input 550 (e.g., a long press or other user gesture) that causes the wrist-wearable device 110 to present a contacts-editing user interface 560 for the second plurality of representations of contacts. FIG. 5F illustrates another embodiment of a contact-editing user interface 560. In some embodiments, the contact-editing user interface 560 allows the user 120 to update one or more representations contacts as described above in reference to FIGS. 3A-3L.

Figure 6A:
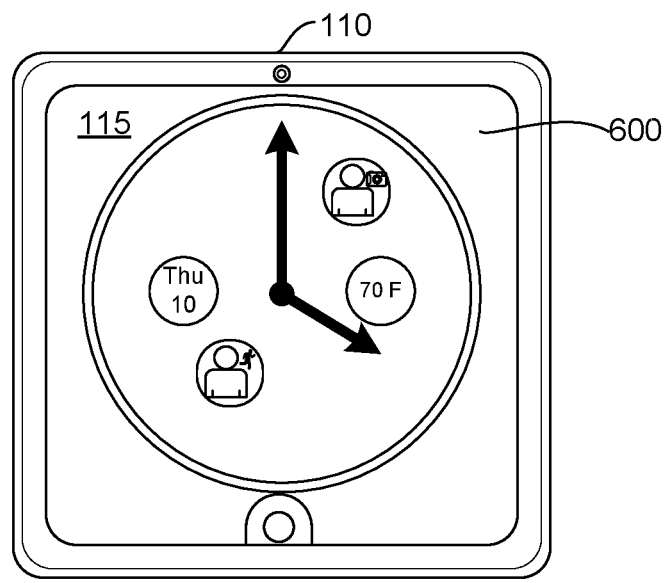
FIGS. 6A and 6B illustrate different examples of watch-face user interfaces, in accordance with some embodiments.
Figure 6B:
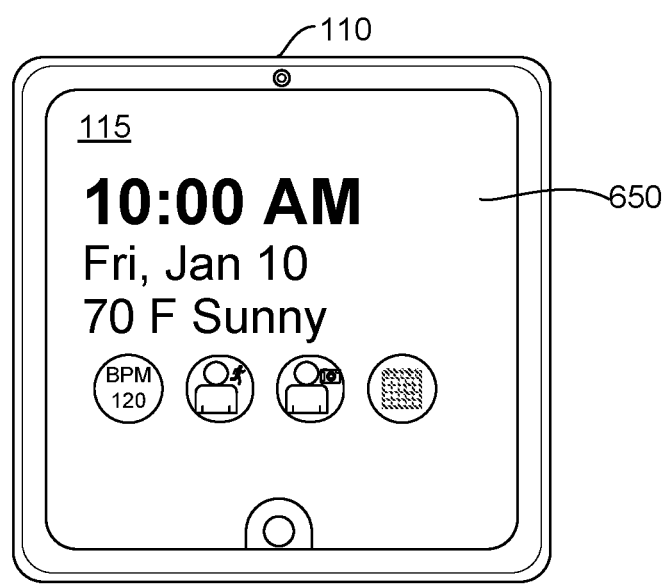

FIGS. 6A and 6B illustrate different examples of watch-face user interfaces, in accordance with some embodiments. Each of a first watch-face user interface 600 and a second watch-face user interface 650 illustrate a plurality of representations of contacts along with a clock and/or one or more other user interface elements that provide relevant information to a user. In some embodiments, the watch-face user interfaces can be customized by the user to include information that they determine to be relevant. In some embodiments, one or more representations of contacts of the plurality of contacts 145 (FIGS. 1A-1G) can be added as part of a widget displayed in the watch-face user interface. For example, one or more representations of contacts are included as part of the clock widgets in the first and second watch-face user interfaces 600 and 650.

Figure 7:
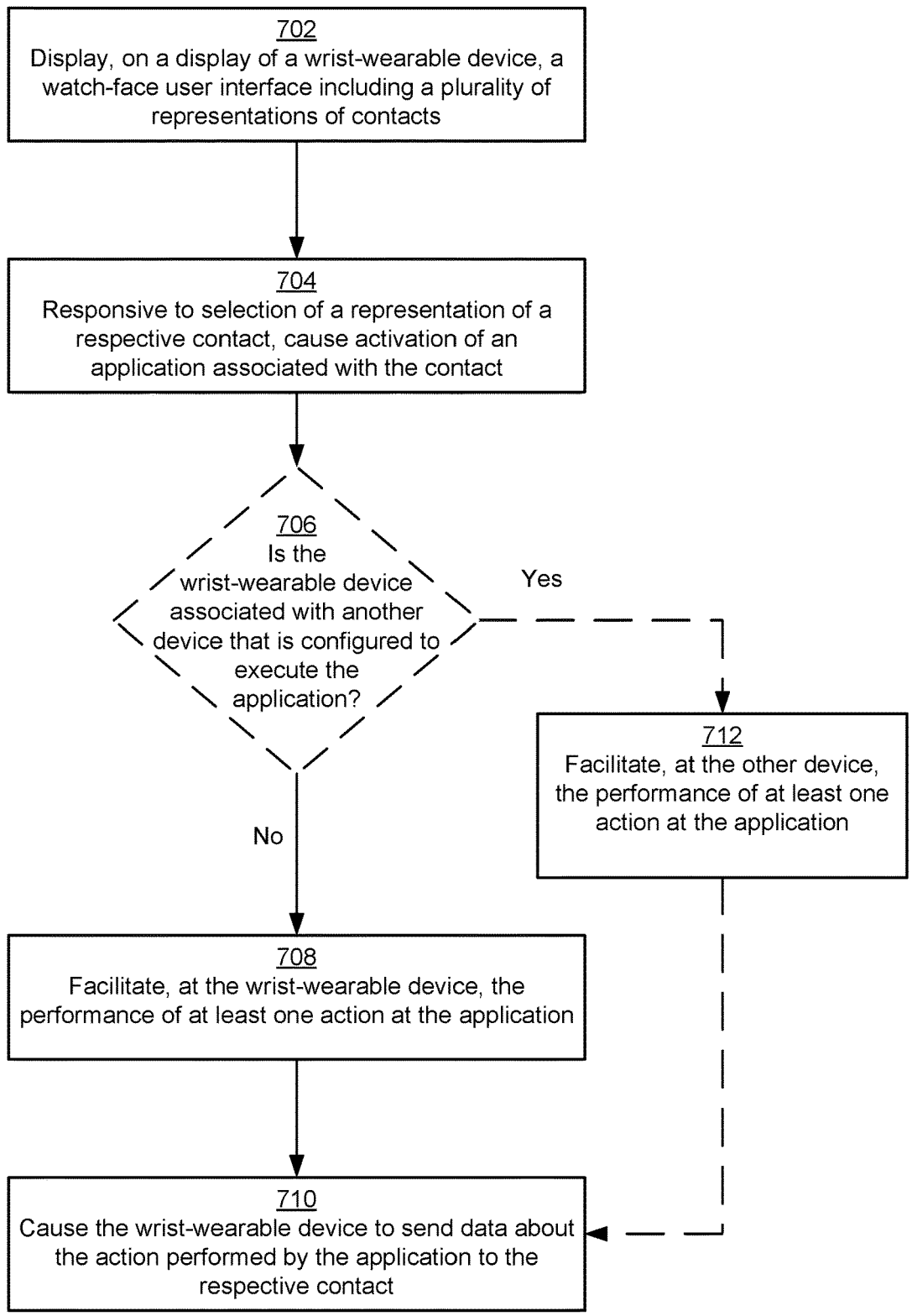
FIG. 7 illustrates a flow diagram of a method for enabling quick interactions with a user's frequent contacts from within a watch-face user interface of a wrist-wearable device, in accordance with some embodiments.

FIG. 7 illustrates a flow diagram of a method for enabling quick interactions with a user's frequent contacts from within a watch-face user interface of a wrist-wearable device, according to some embodiments. Operations (e.g., steps) of the method 700 can be performed by one or more processors (e.g., central processing unit 16004; FIG. 14C) of a wrist-wearable device 110. In some embodiments, the wrist-wearable device 110 is coupled with one or more sensors (e.g., any of the sensors 1825, such as a heart rate sensor 1058, neuromuscular-signal sensors (e.g., electromyography (EMG) sensors), SpO2 sensors, altimeter, thermal sensor or thermal couple, ambient light sensor, ambient noise sensor; FIG. 14C), a display 115, a speaker, an imaging sensor 16104 (e.g., imaging device 117; FIGS. 2A-2I), and a microphone to perform the one or more operations. At least some of the operations shown in FIG. 7 correspond to instructions stored in a computer memory or computer-readable storage medium (e.g., memory 16400; FIG. 14C). Operations of the method 700 can be performed by the wrist-wearable device 110 alone or in conjunction with one or more processors and/or hardware components of another device communicatively coupled to the wrist-wearable device 110 (e.g., a head-worn wearable device, a smartphone, a laptop, a tablet, etc.) and/or instructions stored in memory or computer-readable medium of the other device communicatively coupled to the wrist-wearable device 110.

The method 700 includes displaying (702), on a display of a wrist-wearable device, a watch-face user interface including a plurality of representations of contacts. Responsive to selection of a representation of a respective contact, the method 700 includes causing (704) activation of an application associated with the contact. For example, as described above in reference to FIGS. 1A-2I, each contact of the plurality of representations of contacts can be associated with a contact and can be used to quickly and efficiently interact with the selected contact.

The method 700 further determines (706) whether the wrist-wearable device is associated with another device that is configured to execute the application. In accordance with a determination that the wrist-wearable device is not associated with another device that is configured to execute the application ("No" at operation 706), the method includes facilitating (708), at the wrist-wearable device, the performance of at least one action at the application and causing (710) the wrist-wearable device to send data about the action performed by the application to the respective contact. For example, as shown and described in reference to FIGS. 2A-2I, actions of respective applications can be performed at the wrist-wearable device and shared with contacts selected by the user.

Alternatively, in accordance with a determination that the wrist-wearable device is associated with another device that is configured to execute the application ("Yes" at operation 706), the method includes facilitating (712), at the other device, the performance of at least one action at the application and causing (710) the wrist-wearable device to send the action performed by the application to the contact. For example, as shown and described in reference to FIGS. 1A-1G, actions of respective applications can be performed at a head-worn wearable device and shared with contacts selected by the user.

Figure 8:
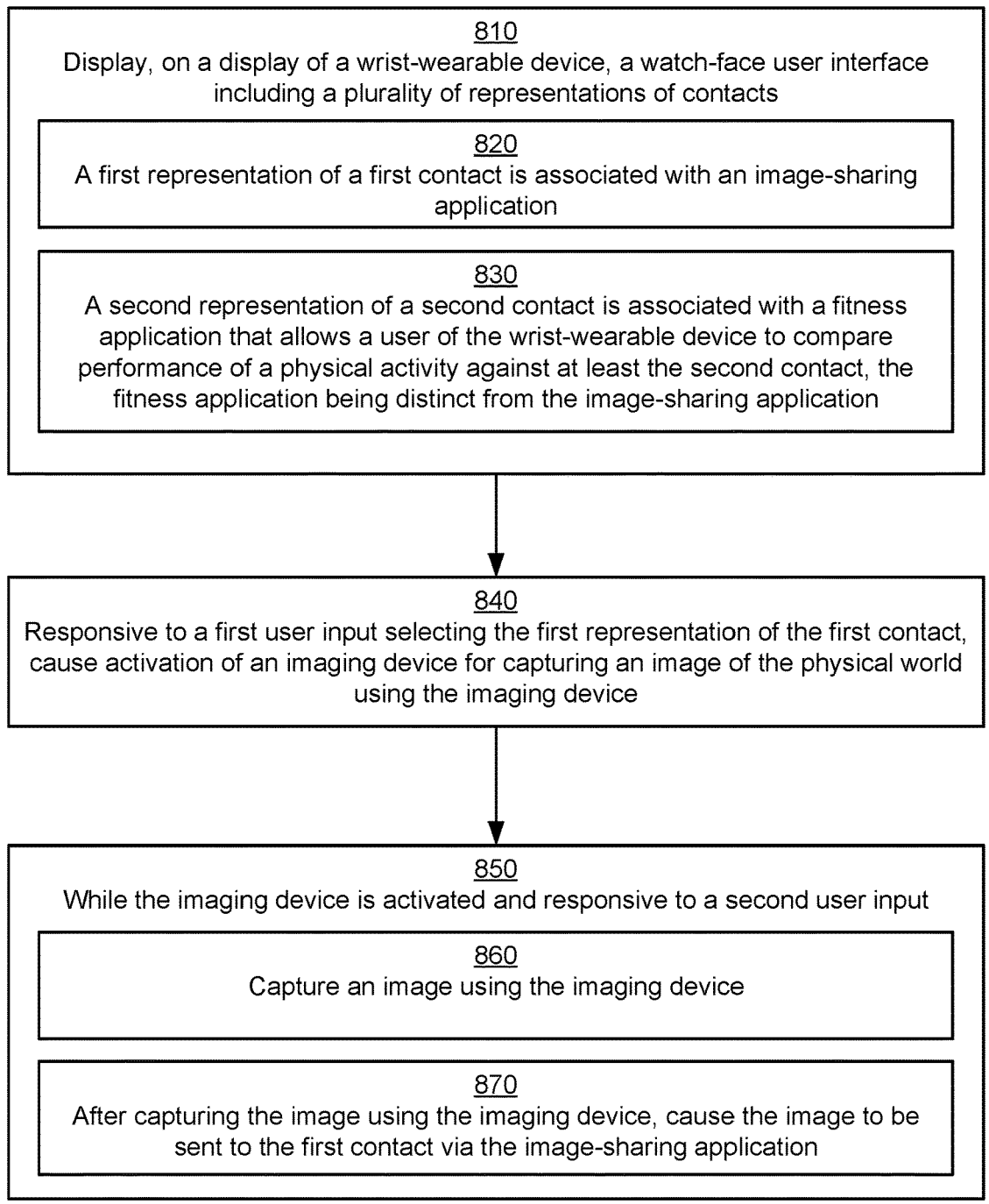
FIG. 8 illustrates a detailed flow diagram of a method for enabling quick interactions with a user's frequent contacts from within a watch-face user interface of a wrist-wearable device, in accordance with some embodiments.

FIG. 8 illustrates a detailed flow diagram of a method for enabling quick interactions with a user's frequent contacts from within a watch-face user interface of a wrist-wearable device, according to some embodiments. Similar to method 700 of FIG. 7, operations of the method 800 can be performed by one or more processors of a wrist-wearable device 110. At least some of the operations shown in FIG. 8 correspond to instructions stored in a computer memory or computer-readable storage medium. Operations of the method 800 can be performed by the wrist-wearable device 110 alone or in conjunction with one or more processors and/or hardware components of another device communicatively coupled to the wrist-wearable device 110 and/or instructions stored in memory or computer-readable medium of the other device communicatively coupled to the wrist-wearable device 110.

Method 800 includes displaying (810), on a display of a wrist-wearable device, a watch-face user interface including a plurality of representations of contacts. A first representation of a first contact is associated (820) with an image-sharing application. A second representation of a second contact is associated (830) with a fitness application that allows a user of the wrist-wearable device to compare performance of a physical activity against at least the second contact. The fitness application is distinct from the image-sharing application. In some embodiments, the plurality of representations of contacts includes a predetermined number of representations (e.g., at least two, at least 5, etc.).

In some embodiments, each representation of a contact is a distinct contact and/or a distinct grouping of contacts (e.g., a grouping of two or more contacts as described above in reference to FIGS. 3I-3K). In some embodiments, two or more representations of a contact are associated to the same contact but associated with distinct applications. Each representation of a contact is associated with an application that allows the user to quickly and efficiently share information with a contact via the application. As described above in reference to FIGS. 1A-1G, the applications can include Non-limiting examples of the applications that can be associated with a representation of a contact include video and/or audio calling applications, fitness applications, image-sharing applications, video-sharing applications, live streaming applications, game applications, file-sharing applications, social media-sharing applications, media sharing or streaming applications, location sharing applications, etc. Actions that can be performed by respective applications include initiating a call, showing a message thread, sending one or more emojis, generating an avatar and sending the avatar to communicate with the contact, launching an application, displaying activity information, etc. The wrist-wearable device (or device communicatively coupled to the wrist-wearable device, such as a head-worn wearable device) performs specific actions, responsive to the user input, on the respective applications (e.g., completing the action such as capturing the photo, calling a contact, etc.)

In some embodiments, each representation of a contact is displayed as a movable and selectable user interface element as shown above in reference to FIGS. 1A-3L. In some embodiments, each representation of a contact moves around to different respective positions within the watch-face user interface based on movement of the user that is wearing the wrist-wearable device. For example, the representations of the contacts can follow momentum of the user's hand or arm movement. In another example, if the user moves to the left, the representations can move to the right before bouncing off of a wall of the watch-face user interface. Alternatively, the representations can move in the same direction as the user's movement. In some embodiments, a respective representation of the plurality of representations of contacts moves around to different positions within the watch-face user interface based on activity of a respective contact associated with the respective representation. For examples, contacts with the most recent activity have representations that moves faster. In another example, a contact that just interacted with the user (e.g., sent an image, sent a message, etc.) has a representation that moves faster than a representation of another contact that has not had any recent activity. Alternatively, in some embodiments, the representations of contacts can change color or be displayed in different sizes based on recent activity. For example, a representation of a contact with more recent interactions with the user can be larger than representation of another contact that has not had any recent interaction with the user.

Method 800 includes responsive to a first user input selecting the first representation of the first contact, causing (840) activation of an imaging device for capturing an image of the physical world using the imaging device. As described above in reference to FIGS. 1A-5F, the use input can be a touch command on the display (e.g., a single tap, a long press, etc.), touch gestures performed on the display, actuation of a button, voice commands, recognized finger and/or thumb motions (e.g., via neuromuscular sensors of the wrist-wearable device), recognized hand gestures, etc.

In some embodiments, the first user input selecting the first representation of the first contact is a long press that remains in contact with a portion of the display of the wrist-wearable device used to display the first representation of the first contact for at least a predefined period of time (e.g., at least two seconds), and the method further includes, responsive to the long press and before imaging device is activated, displaying, on the display of a wrist-wearable device, a plurality of user interface elements, each interface element including one or more image capture modes available for the imaging device. The one or more capture modes include an HDR mode, a low light mode, a portrait mode, a multi-image capture mode, a video capture mode, use of a front camera, use of a rear camera, etc. Although the above examples are provided in reference to an image-sharing application, different application or representation of a contact include specific actions. For example, a representation of a contact associated with a messaging application can include user interface elements for capturing and sending a voice message, sending an image from a gallery, sending an image from camera, and initiating a voice or video call. A representation of a contact associated with a calling application can include user interface elements for sending images from gallery, toggling a messaging interface, and sending an image from camera. A representation of a contact associated with status updates (e.g., an application that posts a user's current activities or status) can include user interface elements for sending a haptic buzz pattern (e.g., to alert the contact or personalize the alert), sending an image from gallery, sending an image from camera, and initiating a voice or video call. A representation of a contact associated with a fitness application can include user interface elements for sending images from gallery, toggling a messaging application, sending encouraging messages, emoticons, or avatars. The above examples are provided for descriptive purposes and are non-limiting.

In some embodiments, the method 800 includes responsive to the first user input and in conjunction with activating the imaging device, displaying a user interface that allows for capturing the image using the imaging device. In some embodiments, the imaging device is part of the wrist-wearable device. In some embodiments, the user interface for capturing the image includes a user interface element (e.g., displaying a toggle) that when selected causes the wrist-wearable device to display a conversation thread of the image-sharing application, the conversation thread including images shared between a user of the wrist-wearable device and at least the first contact. In some embodiments, the first user input selecting the first representation of the first contact causes the wrist-wearable device to present one or more images received from and/or sent to the first contact associated via the image-sharing application within a predetermined period of time (e.g., within the last 30 minutes, the last hour, last day, last week, etc.). Alternatively, the one or more images are presented in the order that they are received and sent. Examples of the different user interface elements are provided above in reference to FIGS. 1A-2I.

In some embodiments, the imaging device is communicatively coupled to the wrist-wearable device such as an imaging device of a head-worn wearable device, a smartphone, a laptop, a tablet, etc. and the method 800 further includes, in accordance with a determination that the wrist-wearable device is communicatively coupled with a head-worn wearable device that includes the imaging device, causing activation of the imaging device by sending an instruction to the head-worn wearable device that is communicatively coupled to the wrist-wearable device. In some embodiments, while the imaging device of the head-worn wearable device is activated, the method 800 includes displaying on the display of the wrist-wearable device a user interface that includes a live image from the imaging device of the head-worn wearable device. Under circumstances in which an imaging device of a head-worn wearable device (or other device communicatively coupled to the wrist-wearable device) is unavailable, not connected, and/or the user has indicated a preference not to use the imaging device of the head-worn wearable device (or other device communicatively coupled to the wrist-wearable device), the method 800 can also include ceasing to display the watch-face user interface, initiating an imaging device of the wrist-wearable device, and displaying of a user interface that allows for capturing an image using the imaging device of the wrist-wearable device. In some embodiments, a representation of the captured image is shown in the user interface that allows for capturing the image. Examples of a user interface that allows for capturing an image using the imaging device of the wrist-wearable device are provide above in reference to FIGS. 2A-2C.

Method 800 further includes while the imaging device is activated and responsive to a second user input (850) capturing (860) an image using the imaging device and, after capturing the image using the imaging device, causing (870) the image to be sent to the first contact via the image-sharing application. In some embodiments, causing the image to be sent to the first contact includes sending the image in a conversation thread of the image-sharing application, the conversation thread including images shared between a user of the wrist-wearable device and at least the first contact. In some embodiments, the image is sent without receiving any further instructions from the user to cause sending of the image. In other words, the causing of the image to be sent occurs without any further intervention just by having selected the first representation of the first contact and then taking a picture, but no specific instruction to send the image to that user are actually provided in some embodiments. Examples of the capture and transmission of captured images is shown and described above in reference to FIGS. 1E-1G and 2A-2C.

In some embodiments, capturing the image using the imaging device includes capturing a plurality of images. In some embodiments, the method 800 further includes, before causing the image to be sent to the first contact, displaying user interface elements associated with each image of the plurality of images and, responsive to another user input that selects a respective user interface element associated with the image, causing the image to be sent to the first contact. In some embodiments, an editing user interface is displayed that allows the user to add one or more filters, adjust the image, crop portions of the image, change the coloring, add overlays, etc. Examples of the image selection user interface are provided above in reference to FIGS. 1E-1G and 2A-2C.

In some embodiments, the method 800 further includes, responsive to an additional user input selecting the second representation of the second contact, causing activation of the fitness application, displaying a user interface that allows for monitoring performance of a physical activity. The method 800 further includes notifying the second contact that the user is currently performing the physical activity. Examples of the activation of the fitness application are provided above in reference to FIGS. 2F-2G.

In some embodiments, the method 800 further includes before displaying, on the display of the wrist-wearable device, the watch-face user interface including the plurality of representations of contacts, determining based on previous user actions with a respective contact, a respective application, selected from among multiple available applications, to associate with each representation of the plurality of representations of contacts. The respective applications are determined such that the first contact is associated with the image-sharing application based on the previous user actions indicating that a user of the wrist-wearable device frequently interacts with the first contact via the image-sharing application, and the second contact is associated with the fitness application based on the previous user actions indicating that the user of the wrist-wearable device frequently interacts with the second contact via the fitness application. In other words, the user's historic actions with a respective contact are used to define a representation for the respective contact. More specifically, based on the user's previous interaction with a contact, the representation will be associated or quickly linked to that action. For example, if a user frequently sends images to a first contact, a representation for the first contact will automatically initiate a camera such that the user can capture and send an image. In some embodiments, at least one respective contact associated with one of the plurality of representations of contacts is selected by the user for inclusion on the watch-face user interface (i.e., as a representations of a contact), and an association between the at least one respective contact and a respective application is also user selected. More specifically, in some embodiments, the user defines the plurality of representations of contacts and the application associated with each representation. The association of an application to a particular representation of a contact is described above in reference to FIGS. 3G and 3H.

In some embodiments, the plurality of representations of contacts displayed on the watch-face user interface include a third representation of a third contact that is associated with a messaging application that allows the user of the wrist-wearable device to view messages between the user and the third contact and a fourth representation of a fourth contact that is associated with a calling application that allows the user of the wrist-wearable device to initiate or participate in audio and/or video calls between the user and the sixth contact. The messaging application messaging is distinct from the image-sharing and fitness applications, and the calling application is distinct from the image-sharing application, the fitness application, and the messaging application. Examples of the different representations of contacts are described above in reference to FIGS. 1A-3L.

FIG. 9 illustrates a detailed flow diagram of a method for present animated avatars corresponding to users based on respective users' statuses, in accordance with some embodiments. Operations (e.g., steps) of the method 1500 can be performed by one or more processors (e.g., the central processing unit 16004 shown in FIG. 14C) of a wrist-wearable device (e.g., the wrist-wearable device 110). In some embodiments, the wrist-wearable device is coupled with one or more sensors (e.g., various sensors shown in FIG. 14C, such as the heart rate sensor 16112, the EMG sensor 16108, the SpO2 sensor 16106, an altimeter, a thermal sensor or thermal couple, ambient light sensor, ambient noise sensor), a display 115, a speaker, an image sensor 16104 (e.g., the imaging device 117 shown in FIGS. 2A-2I), and a microphone to perform the one or more operations. At least some of the operations shown in FIG. 9 correspond to instructions stored in computer memory or computer-readable storage medium (e.g., memory 16400; FIG. 14C).

Operations of the method 1500 can be performed by the wrist-wearable device 110 alone or in conjunction with one or more processors and/or hardware components of another device communicatively coupled to the wrist-wearable device 110 (e.g., a head-worn wearable device, a smartphone, a laptop, a tablet, etc.) and/or instructions stored in memory or computer-readable medium of the other device communicatively coupled to the wrist-wearable device 110.

The method 1500 includes presenting (1510), via a display of a wrist-wearable device, an interactive user interface that includes an animated avatar corresponding to a user of a different electronic device, the animated avatar based on a first status of the user. In some embodiments, the interactive user interface is (1520) is a watch-face user interface. In some embodiments, the animated avatar is a humanoid configured to have at least one visual quality that corresponds to the user (e.g., the same-colored eyes), and can be associated with one of the user's primary contacts (e.g., a husband), and the first three-dimensional visual representation can be shown performing an activity.

The method 1500 further includes, in response to receiving a status indication, related to a second status of the user from the different electronic device, modifying (1530), by the wrist-wearable device, the animated avatar to create a modified animated avatar, the modified animated avatar being representative of the second status of the user. In some embodiments, the modified animated avatar is (1540) presented without any interaction by the wearer with the wrist-wearable device. In some embodiments, the status indication is received at predetermined intervals without user input.

In some embodiments, the user is associated with a plurality of linked applications, and the status indication is received from one of the plurality of linked application.

In some embodiments, the status indication is a first status indication, and the method further includes, in accordance with receiving a second status indication related to a third status of the user received from the different electronic device, generating another modified animated avatar based on the third status of the user such that the other modified animated avatar is representative of the third status of the user, and the method further includes causing the wrist-wearable device to present, via the display, the interactive user interface including the other modified animated avatar, where the third status of the user includes a content item shared by the user from a sharing application (e.g., a textual status update).

The method 1500 further includes presenting (1550), via the display, the interactive user interface including the modified animated avatar. In some embodiments, causing the wrist-wearable device to present the modified animated avatar includes animating the second status of the user received via the status indication of the user. That is, an animated transition can be presented between the animated avatar and the modified animated avatar. In some embodiments, causing the wrist-wearable device to present the modified animated avatar includes presenting a transitional animated avatar that illustrates a continuous change between the animated avatar and the modified animated avatar.

In some embodiments, the interactive user interface is caused to display the animated avatar and the modified animated avatar at the display of the wrist-wearable device concurrently or sequentially. In some embodiments, while the animated avatar and the modified animated avatar are being displayed at the interactive user interface, responsive to a wearer gesture, adjusting a visual element of the animated avatar and the modified animated avatar. In some embodiments, the wearer gesture is an in-air hand gesture, and the in-air hand gesture is detected, at least in part, by one or more sensors of the wrist-wearable device. In some embodiments, the animated avatar and the modified animated avatar include humanoid-shaped three-dimensional objects, and the humanoid-shaped three-dimensional objects include at least one characterization element corresponding to the user of the different electronic device. In some embodiments, the adjusting of the visual element of the modified animated avatar is based on a selection of an accessory item, and based on the selection of the accessory item, the accessory item is presented as being worn by the humanoid-shaped three-dimensional object corresponding to the modified animated avatar.

In some embodiments, the method further includes, in accordance with receiving an input from the wearer of the wrist-wearable device directed to the modified animated avatar, causing the wrist-wearable device to present, via the display, the second status of the user in conjunction with a portion of the modified animated avatar. In some embodiments, the second status of the user includes a content item shared by the user via a sharing application. In some embodiments, causing the wrist-wearable device to present the second status of the user in conjunction with the portion of the modified animated avatar includes presenting the content item and the modified animated as being related to the content item.

In some embodiments, the animated avatar based on the first status is presented at a first time, the display of the wrist-wearable device is caused to dim at a second time after the animated avatar has been presented, and the presenting of the modified animated avatar based on the second status is caused in response to detecting an in-air hand gesture. For example, the user may perform an in-air thumbs-up gesture that causes a wake operation to cause the wake screen user interface to be displayed, and the wake screen user interface can includes the modified animated avatar based on the second status. In some embodiments, the animated avatar is displayed at a wake screen user interface of the wrist-wearable device, the wake screen user interface is presented to the user when the display of the wrist-wearable device is caused to transition from a first mode to a second mode, and automatically, without further user input, the animated avatar and the modified animated avatar are continuously animated at the wake screen user interface.

In some embodiments, the status indication includes one or more of (i) a content item shared by the user, (ii) a state of mind of the user, (iii) a message shared by the user, (iv) a location of the user, (v) an activity performed by the user, and (vi) an environmental condition associated with the location of the user.

In some embodiments, the interactive user interface includes a contextual-information visual representation associated with one of the animated avatar and the modified animated avatar, and the contextual-information visual representation is based on a respective status of the user. In some embodiments, the contextual-information visual representation includes a background element depicting an aspect of a current environment of the user. In some embodiments, (i) a first contextual-information visual representation associated with the first status is presented in conjunction with the animated avatar, and (ii) in accordance with receiving the status indication, presenting a second contextual-information visual representation associated with the modified animated avatar in conjunction with presenting the modified animated avatar.

In some embodiments, the contextual-information visual representation is different from but related to the respective status of the user. In some embodiments, the contextual-information visual representation is a first contextual-information visual representation, and (i) before the status indication causing the modified animated avatar to be presented, the first contextual-information visual representation is presented in conjunction with the animated avatar, (ii) irrespective of a set of content associated with the status indication, causing a second contextual-information visual representation to be presented in conjunction with the first contextual-information visual representation. That is, some contextual-information visual representations can be persistently presented with the animated avatar regardless of status indications (e.g., the bestie beanie accessory item in FIGS. 13A-13B).

In some embodiments, the interactive user interface is configured to receive wearer input for responding to a respective status of the user. In some embodiments, the interactive user interface is a first interactive user interface, and the method further includes, responsive to a wearer input directed to the first interactive user interface, displaying a second interactive user interface, where (i) the second interactive user interface includes a plurality of animated avatars corresponding to a plurality of users, (ii) each respective user of the plurality of users is different from the user of the different electronic device, and (iii) each respective animated avatar of the plurality of animated avatars in the second interactive user interface is based on a collective status of the plurality of users.

In some embodiments, the method further includes, in accordance with receiving a respective status indication for a first subset of the plurality of users, the respective status indication related to a status of the first subset of the plurality of users received from distinct electronic devices: (i) modifying animated avatars of the first subset of the plurality of users based on the status of the first subset of the plurality of users such that the respective animated avatars of the first subset of the plurality of users is representative of the status of the first subset of the plurality of users, and (ii) presenting, via the display of the wrist-wearable device, the second interactive user interface including respective modified animated avatars of the first subset of the plurality of users and the collective status for a second subset of the plurality of users, the second subset of the plurality of users excluding the first subset of the plurality of users.

In some embodiments, the first subset of the plurality of users is one user. In some embodiments, the first subset of the plurality of users is at least two users, and the respective animated avatars of the first subset of the plurality of users each include at least one shared visual element of the status of the first subset of the plurality of users. In some embodiments, the at least two users of the first subset of the plurality of users are not in physical proximity to each other, and the at least one shared visual element of the status of the first subset of the plurality of users includes an indication that the at least two users of the first subset of the plurality of users are virtually co-located within a portion of a VR environment.

In some embodiments, the user is a user contact of a wearer of the wrist-wearable device and the method further includes, while displaying one of (i) the animated avatar, and (ii) the modified animated avatar, causing display, within the interactive user interface, of a wearer animated avatar associated with the wearer, the wearer animated avatar presented in conjunction with the one of the animated and modified animated avatar of the user.

In some embodiments, the user is a first contact of the wearer, the status indication is a first status indication, and the interactive user interface is a first interactive user interface, and the method further includes (i) in accordance with receiving a second status indication, related to a respective status of a second contact of the wearer, received from another different device, modifying, based on the respective status of the second contact, a respective animated avatar of the second contact of the wearer such that the respective animated avatar is representative of the respective status of the second contact, and (ii) causing the wrist-wearable device to present, via the display, a second interactive user interface including a respective modified animated avatar of the second contact.

In some embodiments, the status indication includes a device identifier, and the modified animated avatar includes a representation of a device used by the user based on the device identifier (e.g., an accessory item). In some embodiments, the device identifier is associated with a device from a group that includes: (i) a smartphone, (ii) a computer, (iii) a wrist-wearable device, and (iv) a detachable structural component of the wrist-wearable device.

In some embodiments, the status indication is received responsive to a determination that the user and the wearer of the wrist-wearable device are within a predetermined proximity. In some embodiments, the determination that the user and the wearer of the wrist-wearable device are within the predetermined proximity is based on a determination that the user and the wearer are co-located.

In some embodiments, the method further includes, in accordance with receiving a user input at the interactive user interface, causing an adjustment to a view of the interactive user interface displayed by the display of the wrist-wearable device, where the adjustment to the view of the interactive user interface causes a change in perspective in the view of the interactive user interface. In some embodiments, the interactive user interface is a first interactive user interface, and the method further includes, while displaying a second interactive user interface including a plurality of animated avatars corresponding to a respective plurality of users, in accordance with receiving a user input at the interactive user interface, causing an adjustment to a view of the second interactive user interface displayed by the display of the wrist-wearable device, wherein the adjustment to the view of the second interactive user interface causes a change in perspective in the view of the second interactive user interface such that a second subset of the respective plurality of users is displayed instead of a first subset of the respective plurality of users.

In some embodiments, a wearer of the wrist-wearable device is associated with a wearer animated avatar, and the method further includes: (i) presenting the wearer animated avatar including a selectable user interface element for causing the wearer animated avatar to be shared with the user of the different electronic device via the display of the wrist-wearable device, and (ii) responsive to wearer selection of the selectable user interface element, providing the wearer animated avatar to be shared with the user of the different electronic device.

Figure 10B:
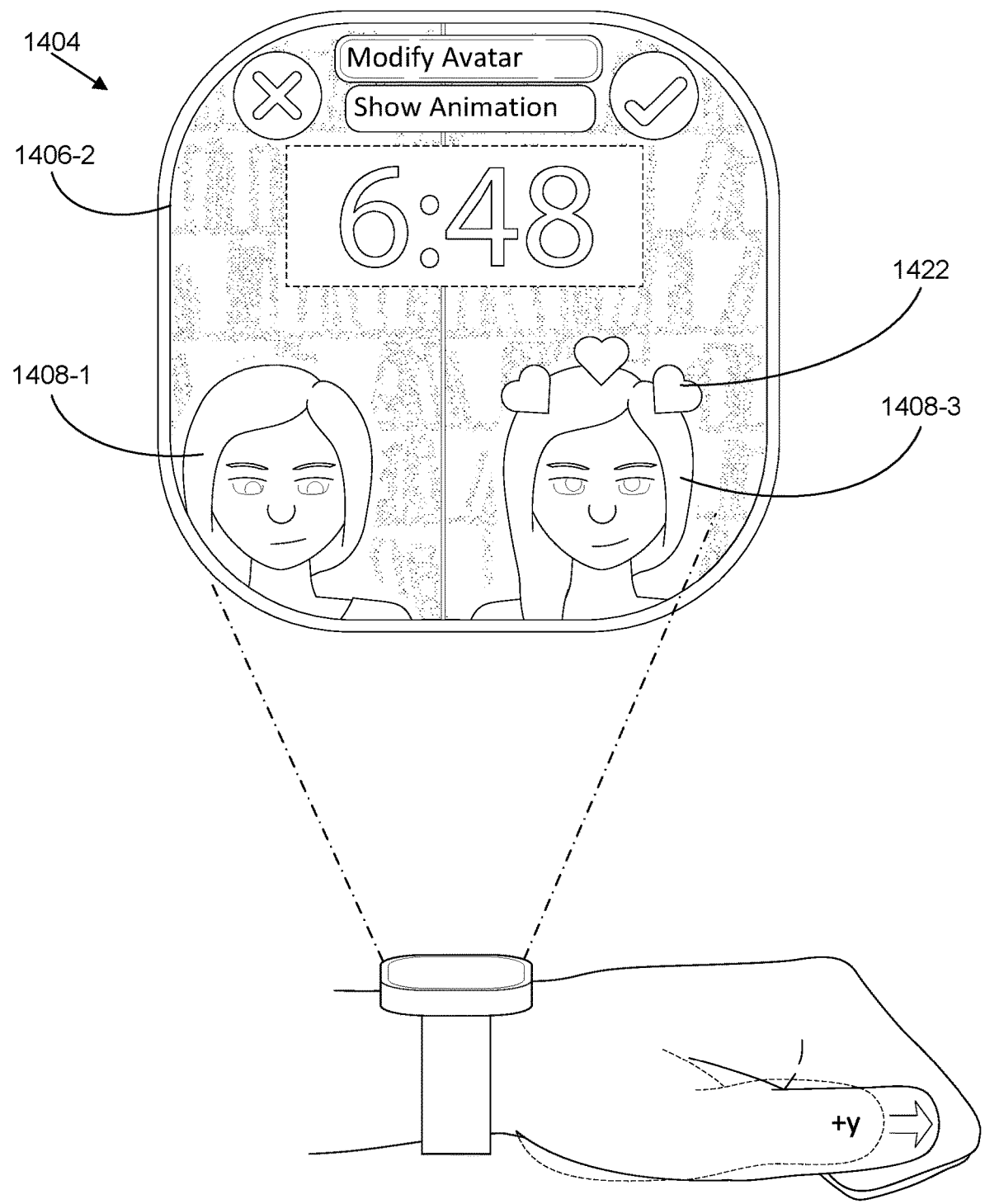

FIGS. 10A-10B illustrate customization of an animated avatar at a wrist-wearable device, in accordance with some embodiments. Specifically, FIGS. 10A-10B illustrate an example in which a single user (e.g., a wearer 1401) modifies an animated avatar that corresponds to themselves. The personal animated avatar can be modified via selectable user interface elements presented at a display 1404 of a wrist-wearable device 1402. As shown in FIG. 10A, the wearer 1401 is associated with the animated avatar 1408, which is presented as an "animated avatar selfie." The wearer 1401 can view and/or modify an animated avatar associated with themselves that is used to interact with one or more of their contacts as described below in reference to FIGS. 11A-13B. In some embodiments, the wearer 1401 can be associated with a plurality of animated avatars, each of which can be uniquely customized and shared with different contacts based on user selection (predefined user selection) and/or a determined relationship between the user and the contact. For example, the wearer 1401 can be associated with an animated avatar that is used in professional settings that is shared with the wearer 1401's colleagues, business contacts, clients, etc. (e.g., the animated avatar corresponding to the professional setting can show the animated avatar wearing business professional attire and/or other accessories appropriate for work and/or limit the actions performed by the animated avatar to be professional). Alternatively, the wearer 1401 can be associated with an animated avatar that is used in casual settings that is shared with the wearer 1401's friends, family, or other close contacts (e.g., the casual setting animated avatar can show the animated avatar wearing casual clothing and/or other accessories and enabling the animated avatar to perform a wide range of actions (e.g., making a goofy face, sticking out one's tongue, etc.).

In some embodiments, a modified animated avatar is presented in conjunction with the animated avatar (e.g., the animated avatar 1408-1 is presented in conjunction with a modified animated avatar 1408-2). The modified animated avatar 1408-2 is presented with one or more selectable user interface elements that allow the user to customize the modified animated avatar, reject changes to the animated avatar, and/or approve of the modified animated avatar (e.g., selectable confirmation user interface element 1411). In some embodiments, visual and/or audio prompts are provided to the user to assist in the customization process. The wrist-wearable device 1402 can detect selection of one or more user interface elements via voice commands, touch commands, and/or hand gestures as described herein. The wrist-wearable device 1402 is configured to share animated avatars that have been approved by the wearer 1401.

As shown in FIG. 10A, an interactive user interface (e.g., the watch-face user interface 1406-1) is caused to display the animated avatar 1408-1 and the modified animated avatar 1408-2 concurrently or sequentially (e.g., simultaneously in separate elements of the interactive user interface, or as one sequential animation that begins with the animated avatar 1408-1 and ends with the modified animated avatar 1408-2). In some embodiments, the interactive user interface is responsive to a gesture performed by the wearer 1401 to select one of (i) the animated avatar 1408-1 or (ii) the modified animated avatar 1408-2 to be shared with another user of a different electronic device (when a status indication is shared by the wearer 1401). In some embodiments, the gesture can be an in-air hand gesture, which can be detected by one or more sensors (e.g., neuromuscular-signal sensors (e.g., EMG sensors), time-of-flight sensors, IMU sensors, etc.) of the wrist-wearable device 1402. For example, the wearer 1401 is performing an in-air hand gesture 1414 that includes a thumb movement in the +y direction, which can cause a focus selector 1412 to select a selectable user input 1410 to further modify the modified animated avatar 1408-2 (that is, causing an additional modification to be made to the modified animated avatar 1408-2).

In some embodiments, the wearer 1401 can modify the animated avatar 1408-1 (to generate the modified animated avatar 1408-2) by adding and/or removing one or more accessory items (e.g., a virtual hat, a virtual jersey, etc.), which may be from a predefined set of accessory items associated with a particular aspect of a status indication of the user, application specify accessory item (e.g., in-game accessory), and/or other accessory items described below in reference to FIGS. 11A-11H. In some embodiments, based on the selection of the accessory item (e.g., a virtual shirt 1416), the accessory item is presented as being worn by the modified animated avatar.

FIG. 10B shows a watch-face user interface 1406-2 that includes the animated avatar 1408-1 and another modified avatar 1408-3. The other modified animated avatar 1408-3 is caused to be displayed in conjunction with a plurality of contextual-information visual representations (e.g., a plurality of heart-shaped virtual objects, including the heart-shaped virtual object 1422). In some embodiments, a particular status indication can be associated with two or more distinct visual representations, which can be displayed in addition or alternatively to one another. For example, the modified animated avatars 1408-2 and 1408-3 can be alternative modifications to the animated avatar 1408-1 based on the same respective status indication being provided by the wearer 1401 corresponding to the animated avatar 1408 (e.g., the modified animated avatar 1408-2 being shared with friends and the other modified animated avatar 1408-3 being shared with her significant other).

FIGS. 11A-11H illustrate examples of animated avatars presented at wrist-wearable devices, in accordance with some embodiments. Specifically, FIGS. 11A-11H show animated avatars of contacts (e.g., a first contact 1111) associated with a wearer of wrist-wearable device 1102 (e.g., a user 1101) and presented at a worn wrist-wearable device 1102, as well as a respective animated avatars of the user 1101 presented at a wrist-wearable device 1132 worn by the first contact 1111. The wrist-wearable devices 1102 and 1132 may include all or some of the components of any of the wrist-wearable devices 110, 1650, and 1888 described with respect to FIGS. 1A-1G, 14A-14E, and 16A, respectively.

In some embodiments, the animated avatars associated with the first contact 1111 are presented at the wrist-wearable device 1102. The animated avatars can be presented based one two users having a predetermined relationship. The predetermined relationships can be close relationships (e.g., friends, significant others, family, etc.), work relationships (e.g., colleagues, clients, vendors, etc.), user defined relationships (e.g., user selected contacts), learned relationships (e.g., recent contacts (e.g., five contacts with the most recent interaction), top contacts (e.g., contacts with frequently interactions or favorited by the user), etc.). For example, the animated avatar of the first contact 1111 can be presented to the user 1101 based on a close relationship between the user 1101 and the first contact 1111 (e.g., a significant other, a favorite, a top contact, etc.). In some embodiments, the user 1101 can scroll between animated avatars corresponding to a predefined number of their contacts by performing respective user inputs at the wrist-wearable device 1102. Alternatively, in some embodiments, animated avatars are presented when a status change of a corresponding contact is detected. In some embodiments, the wrist-wearable devices 1102 and 1132 cycle through different animated avatars of respective contacts at a predetermined interval (e.g., every minute, every 5 minutes, every 30 minutes, etc.). That is, the user 1101 may have a predetermined number of contacts (e.g., five contacts), and the wrist-wearable device 1102 may be configured to cycle through each of the predetermined number of contacts at the predetermined interval, in accordance with some embodiments.

FIG. 11A shows the user 1101 (e.g., a wearer) wearing the wrist-wearable device 1102. The wrist-wearable device 1102 presents, at a display 1104, a watch-face user interface 1106-1, which is configured to be an interactive user interface, at a first point in time. The watch-face user interface can be a home-screen user interface or a wake-screen user interface, or one of a plurality of watch-face user interfaces that the user 1101 can navigate through (e.g., as shown and described above in reference to FIG. 5A-5F). In some embodiments, the watch-face user interface 1106-1 is a wake-screen user interface, which is presented to the user 1101 when the display 1104 of the wrist-wearable device 1102 transitions from a first mode (e.g., sleep or dimmed display) to a second mode (e.g., full brightness or awake mode). In some embodiments, the wrist-wearable device 1102 presents, in conjunction with the watch-face user interface 1106, one or more audial events from a speaker of the wrist-wearable device, and/or one or more haptic events (e.g., caused at the wrist-wearable device), and/or one or more visual events (e.g., transitional animations, notifications, lights, display changes, etc.).

The watch-face user interface 1106-1 includes a first animated avatar 1108-1, which corresponds to the first contact 1111 (shown in FIG. 11C) at a first point in time. The first contact 1111 is associated with the wrist-wearable device 1132, which is different than the wrist-wearable device 1102. The watch-face user interface 1106-1 is configured to present the first animated avatar 1108-1 without any interaction by the user 1101, in accordance with some embodiments. In some embodiments, the first animated avatar 1108-1 is continuously animated while the wrist-wearable device 1102 is not in use (e.g., at a lock screen that is password-protected and configured to disable particular interactivity, always on display, or partially-dimmed display).

The first animated avatar 1108-1 is a humanoid-shaped three-dimensional object that includes characterization elements corresponding to the first contact 1111 (e.g., a hair color, an eye color, a shape profile of a head), in accordance with some embodiments. For example, the first contact 1111 can select one or more characterization elements related to the visual appearance of the first animated avatar 1108-1 via manual feature customization (e.g., at a user interface and/or at an application), and/or by providing images (and/or other identifying information) that include biometric indicators (e.g., eye color, hair color, etc.) to an artificial-reality model that customizes the first animated avatar 1108-1. In some embodiments, after a respective wearer manually completes and/or an artificial-reality model completes a respective animated avatar (e.g., the first animated avatar 1108-1), a prompt is provided, via a respective wrist-wearable device, to a user for the user's approval. In some embodiments, the characterization elements of an animated avatar include aspects of the user's use of the wrist-wearable device (e.g., indicating the user is wearing the device, indicating that the user is interacting with an application at the wrist-wearable device) and/or achievements or other unlockable items obtained in associated applications. For example, a characterization element of the first animated avatar 1108-1 can include a gold medal to show that the first contact 1111 completed a marathon, a unique pet achieved through a completion of an in-game event, etc.

In some embodiments, the first animated avatar 1108-1 (e.g., an aspect of the visual appearance, and/or animation transition features) is based on a first status of the first contact 1111 (e.g., an aspect of an electronic message, an aspect of a social-media post). The first status can be a current status and/or information shared by the first contact 1111 that reflects or is related to a state of mind an action performed or being performed (e.g., studying, watching a moving, exercising, etc.); a content item (e.g., an image, video, music, time-limited story, etc.); a message; a location; and/or an environmental condition (e.g., rain, snow, heatwave, etc.) associated with the location, and the like. For example, the first contact 1111 can express that she does not want to be disturbed in a message to the user 1101 and/or in a status update posted on a social-media platform (in which the user 1101 and the first contact 1111 are friends), and the first animated avatar 1108-1 can appear to have noise-cancelling headphones worn or another indicator that they do not want to be disturbed (e.g., a do not disturb sign nearby).

In some embodiments, the first animated avatar 1108-1 includes several contextual-information visual representations (e.g., two-dimensional or three-dimensional virtual objects, such as a background element, an animated emotional expression, an accessory of the animated avatar, and the like) related to content items shared by the first contact 1111. For example, the first contact 1111 may have previously shared on a social-media application that they are studying at a library (e.g., via a separate user interface of a linked sharing application that is not shown in the Figures described herein). Based on the shared status, a background element 1112, displaying a tall shelf with books, is presented in conjunction with the first animated avatar 1108-1. In some embodiments, the first contact 1111 is associated with a plurality of linked applications (e.g., social-media applications and/or other applications for sharing content with other users of different electronic devices).

In some embodiments, the wrist-wearable device 1102 worn by the user 1101 is configured to receive status indications that are configured to update the respective sender's status. For example, a status indication provided by the first contact 1111 (e.g., via the first contact 1111's wrist-wearable device 1132) to the user 1101 (e.g., via the user 1101's wrist-wearable device 1102) causes the first contact 1111's status to update. The status indication includes updates to a sender's state of mindperformed by the sender; new content items shared by the user, and/or other updates to the sender's status described above. The wrist-wearable device 1102, in response to receiving the status indications, modifies the first contact 1111's animated avatar 1108 based on the content in the status indication as described in detail below.

In some embodiments, status indications are shared by one or more contacts of the user 1101 via one or more sharing applications. As described herein, a sharing application can be any application that allows a user to share or otherwise connect with other users of the sharing application. For example, the sharing application can be a messaging application (e.g., Messenger, WhatsApp) and/or a social-media application (e.g., Facebook, Instagram). In some embodiments, the status indication can be related to status updates to one or more applications of the plurality of linked applications (e.g., interconnected accounts in applications, such as an interconnected Facebook and WhatsApp account). That is, a user can have an account with a social-media application that is linked with their respective animated avatar, and the same user can have an account with a messaging application, different than the social-media application, that is also linked with their respective animated avatar.

In some embodiments, the wrist-wearable device 1102 of the user 1101 can receive a first status indication based on a first content item shared via the linked social-media application, as well as a second status indication based on a message shared via the linked messaging application. In response to receiving the first status indication, the wrist-wearable device 1102 modifies a respective contact's (e.g., the first contact 1111's) animated avatar to include an aspect of the content shared within linked social-media application, and in response to receiving the second status indication, the wrist-wearable device 1102 modifies the respective contact's animated avatar to include another aspect of the message shared via the linked messaging application. In some embodiments, only users with appropriate permission from a contact within the respective application are able to view an animated avatar as modified by a shared status indication. That is, if a user causes two status indications to occur based on updates to two different sharing applications, a contact of the user that is only connected to them through one of the sharing applications will not see the modification caused to the animated avatar via the status indication at the other sharing application.

Turning to FIG. 11A, a respective status of the first contact 1111 may be "Studying at the Pond Lake Library." The wrist-wearable device 1102 of the user 1101 can modify the first contact 1111's first animated avatar 1108-1 to be shown at a library and/or holding a book. Alternatively, in some embodiments, the first contact 1111's status can be "Studying, which causes the wrist-wearable device 1102 of the user 1101 to modify the first contact's 1111 first animated avatar 1108-1 to be shown as studying. In some embodiments, if the first contact 1111 has enabled permission to share her location with the user 1101 (or, all users of a particular sharing application), the status "Studying" can include the first contact 1111's location (e.g., via GPS, and/or identifying a landmark associated with the user's location) such that the wrist-wearable device 1102 of the user 1101 modifies the first contact's 1111 first animated avatar 1108-1 to be shown at a library. Alternatively, in some embodiments, the wrist-wearable device 1102 of the user 1101 can make subtle modifications to the first contact's 1111 first animated avatar 1108-1. For example, based on the wrist-wearable device 1102 determining a location of the first contact 1111 to be at the library (e.g., based on a shared status on the social-media application), the wrist-wearable device 1102 can modify the first animated avatar 1108-1 to be shown wearing an accessory item 1110 related to their location (e.g., a sweatshirt that includes a Pond Lake Library logo).

Examples of status indications that convey a contact or the user 1101's state of mind can include reactions to messages or shared content (e.g., thumbs up, likes, etc.), emojis (laughing emojis, angry emojis, blushing emojis, etc.), reaction gifs, semantic and/or contextual meaning in a shared message, etc. For example, in response to a message from the user 1101 asking: "is studying going well?" the first contact 1111 can react to the user 1101's message with a thumbs-up emoji. The user 1101's wrist-wearable device 1102, in response to receiving the thumbs-up emoji, can modify the first animated avatar 1108-1 (e.g., to act out the thumb-up motion, or to be shown with a smile or other positive visual characteristics). That is, an aspect of the first animated avatar 1108-1, and/or a contextual-information visual representation presented in conjunction with the first animated avatar 1108-1, can be different but related to the actual content of a respective status (e.g., a thumbs-up reaction corresponding to a calm state of mind).

Examples of status indications that convey an activity or action being performed by a contact or the user 1101 include generalized or specific activities, such as walking, exercising, studying, watching a movie, taking museum tour, running a marathon, backpacking, etc. For example, the first contact 1111 can share (e.g., via a social-media application, via a group chat, via a direct message, etc.) "Studying at the library." As shown in FIG. 11A, the wrist-wearable device 1102 generates the first animated avatar 1108-1 for the first contact 1111 such that it appears as if she is studying.

In some embodiments, the wrist-wearable device 1102 generates additional accessories or virtual objects to represent a status or status indication shared by a contact. For example, as shown in FIG. 11A. the first animated avatar 1108-1 is wearing an accessory item 1114 (e.g., a virtual object configured to appear as a set of headphones) that corresponds to the first contact 1111 listening to music or accessing a playlist via a media-providing application. In some embodiments, the accessory item 1114 is based on electronic devices used and/or worn by the contact or user. For example, the wrist-wearable device 1102 can generate the headphones as the accessory item 1114 based on real-world headphones that are communicatively coupled to an electronic device used by the first contact 1111 (e.g., headphones communicative coupled with the wrist-wearable device 1132 worn by the first contact 1111 and/or a smartphone used by the first contact 1111).

Examples of status indications that convey environment conditions include weather conditions (e.g., determined based on a contact's location; shared by a contact via a message; social-medial platform, etc.), time of day (e.g., morning, afternoon, evening, etc.), noise conditions (e.g., loud environments (e.g., a concert) or quiet environments (e.g., a library) determined based on data shared by the contact (e.g., via a message, an indication shared via a social-media application, a microphone, etc.). For example, a level of lighting shown in conjunction with the watch-face user interface 1106-1 may be based on the respective time of day of the location where the first contact 1111 is located. Alternatively, or additionally, the wrist-wearable device 1102 can modify the first animated avatar 1108-1, and/or a contextual visual representation that is displayed in conjunction with the animated avatar, to include a representation of the time of day (e.g., a sun or a moon that moves from one side of the screen to an opposite side (e.g., similar to a sundial)). In some embodiments, the lighting level may be relatively dim in the watch-face user interface 1106-1 shown in FIG. 11A (which is not explicitly indicated in FIG. 11A), based on a current time of the location of the other user (e.g., 6:48 PM) being after an estimated sunset time for that location on that day. The user 1101 can adjust the screen brightness or override the light levels based on their own preferences.

In addition to the wrist-wearable device 1102, the user 1101 may also be wearing a head-wearable device 1150, such as an artificial-reality headset. In some embodiments, in accordance with a determination that the user 1101 is wearing a head-wearable device 1150 and the wrist-wearable device 1102, at least a portion of the watch-face user interface 1106-1, including the first animated avatar 1108-1 can be presented via the head-wearable device 1150. For example, a three-dimensional virtual object corresponding to the first animated avatar 1108-1 can be displayed directly above the display 1104 of the wrist-wearable device 1102 (i.e., the first animated avatar 1108-1 can be projected as a hologram). Alternatively, or additionally, in some embodiments, the first animated avatar 1108-1 is presented via a display of the head-wearable device 1150. In some embodiments, a determination that the user 1101 is wearing the head-wearable device 1150 and the wrist-wearable device 1102 can be based on communicative connection between the head-wearable device 1150 and the wrist-wearable device 1102, and/or a communicative connection between an intermediary device (e.g., a smartphone or portable computing device) and the head-wearable device 1150 and/or the wrist-wearable device 1102.

Figure 11B:
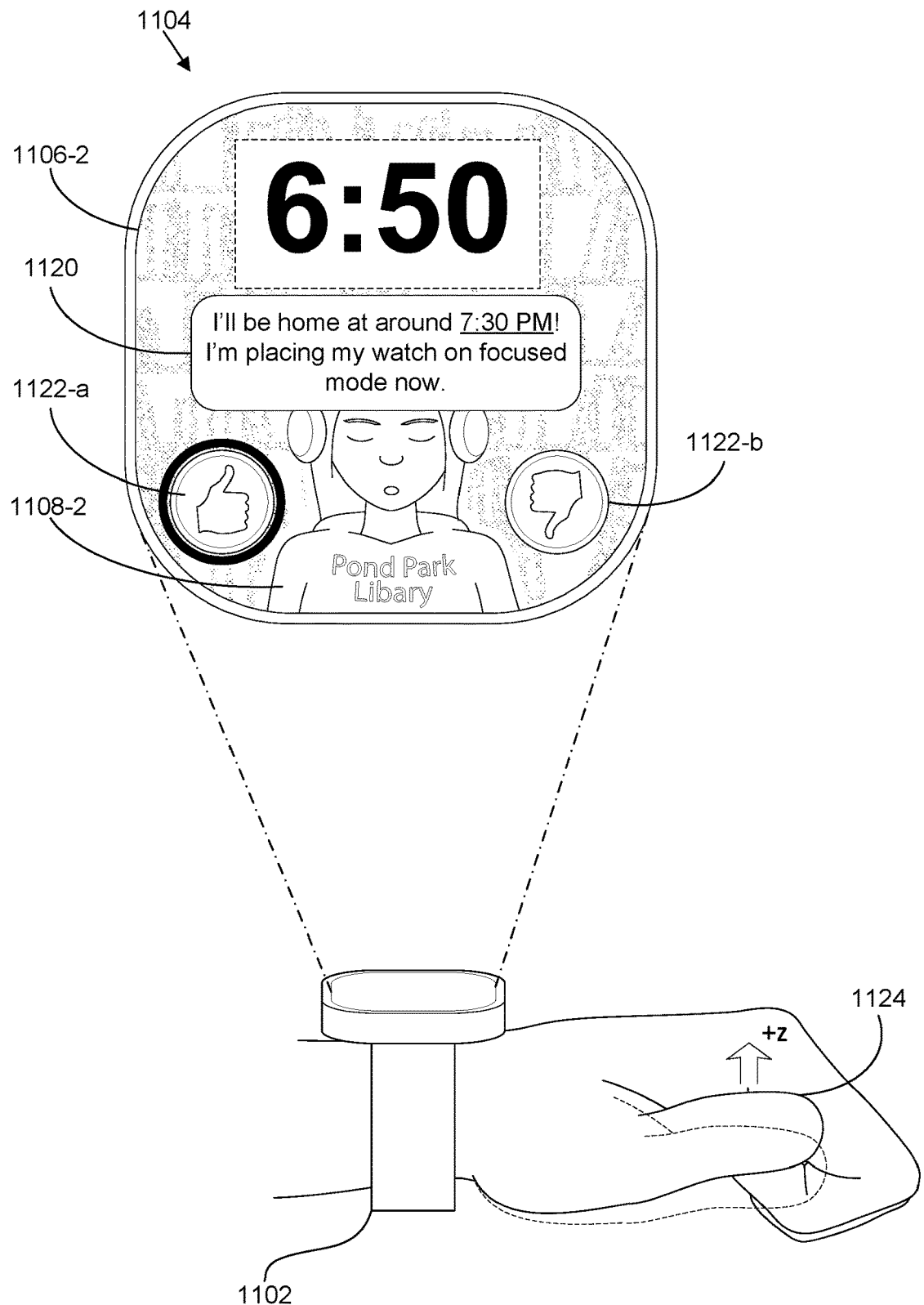

FIG. 11B shows the display 1104 of the wrist-wearable device 1102 presenting a second animated avatar 1108-2, in accordance with some embodiments. The second animated avatar 1108-2 (e.g., a modified animated avatar) includes at least one modification to the first animated avatar 1108-1 based on a status indication of the first contact 1111. That is, the second animated avatar 1108-2 is based on a second status of the first contact 1111 (e.g., an updated status based on a status indication provided by the first contact 1111). For example, in FIG. 11B, the status indication shared by the first contact 1111 is a message provided to the user 1101 (e.g., via a messaging application, a social-media application, etc.). Similar to the first animated avatar 1108-1, the second animated avatar 1108-2 includes a humanoid-shaped three-dimensional object that includes characterization elements corresponding the first contact 1111 as described above in reference to FIG. 11A.

The first animated avatar 1108-1 and second animated avatar 1108-2. For example, the second animated avatar 1108-2 can show mouth movements based on the content of the provided status indication (e.g., message). In some embodiments presenting the second animated avatar 1108-2 includes presenting a transitional animation that, for example, can illustrate a continuous change between the first animated avatar 1108-1 and the second animated avatar 1108-2. In some embodiments, the transitional animation is presented when the wrist-wearable device 1102 presents a home-screen user interface (e.g., a watch-face user interface presented when the wrist-wearable device 1102 is first unlocked or opened). Alternatively, the transitional animation can be presented while the wrist-wearable device 1102 presents a wake-screen user interface (e.g., a watch-face user interface presented when the wrist-wearable device 1102 transitions (whether the wrist-wearable device 1102 is unlocked or not) from the first mode to the second mode as described above).

In some embodiments, the status indication is presented to the user 1101 via a watch-face user interface 1106-2 (e.g., textual-prompt user interface 1120 including content from the received message ("I'll be home at around 7:30 PM! I'm placing my watch off of focused mode now."). The watch-face user interface 1106-2 is presented at a second point in time and can include selectable user interface elements 1122-*a* and 1122-*b* based on the status indication. For example, because the first contact 1111 indicated in her messages that she is placing their wrist-wearable device 1132 in a focused mode, the selectable user interface elements 1122-*a* and 1122-*b* are thumbs-up and thumbs-down replies instead of automatically generated textual replies. Alternatively, in some embodiments, each selectable user interface element includes pre-generated text that is presented in conjunction with an animated avatar for quickly responding to a contact.

In some embodiments, the first contact 1111 does not receive status indications or replies from the user 1101 while their wrist-wearable device 1132 is in focus mode. In some embodiments, the user 1101's wrist-wearable device 1102 is configured to quietly deliver replies and/or user updated animated avatars while the first contact 1111's wrist-wearable device 1132 is in focus mode (e.g., deliver replies and/or user updated animated avatars with a notification queue such that a notification is provided after the receiving device is not in focus mode). In some embodiments, when the wrist-wearable device 1132 is placed off of focused mode, the wrist-wearable device 1132 receives a combined status that includes status indications received while focus mode was placed on at the wrist-wearable device 1132.

In some embodiments, the user 1101 can interact with animated avatars (e.g., the second animated avatar 1108-2) and/or other user interface elements presented in conjunction with the animated avatars. In some embodiments, an interactive user interface such as the watch-face user interface 1106-2 is configured to receive wearer input (e.g., a single gesture performed by the wearer) from a wearer (e.g., the user 1101) for responding to a respective status of the first contact 1111 (e.g., with a picture, a status update, an emoji, a thumbs up, etc.). For example, the watch-face user interface 1106-2 can present the user 1101 with a predefined set of response options (e.g., selectable user interface elements 1122-*a* and 1122-*b*), which can be sent to the first contact 1111 with a single user input. In some embodiments, the user 1101 can perform a gesture to select one of the selectable user interface elements 1122-*a* and 1122-*b*. In some embodiments, the wrist-wearable device 1102 can detect the performance of an in-air hand gesture based on sensors (e.g., neuromuscular-signal sensors, such as electromyography (EMG sensors), time-of-flight sensors, IMU sensors, etc.) located at the wrist-wearable device 1102. For example, the user 1101 is performing a gesture 1124 that includes an upward thumb movement, corresponding to a selection of the selectable user interface element 1122-*a*.

The wrist-wearable device 1102 presents the second animated avatar 1108-2 in place of the first animated avatar 1108-1 in response to the user 1101 receiving, via the wrist-wearable device 1102 (or other intermediary device communicatively coupled with the wrist-wearable device 1102), the respective status indication (e.g., the first contact 1111's message). In some embodiments, the wrist-wearable device 1102 is configured to receive one or more status indications when they are shared. Alternatively, in some embodiments, the wrist-wearable device 1102 is configured to obtain (e.g., receive and/or poll) one or more status indications at predetermined intervals (e.g., every minute, every 5 minutes, every half-hour, etc.) without user input. In some embodiments, if the user 1101 has enabled a do not disturb mode or a focus mode at an electronic device while the animated avatar of the user 1101 is being presented, the wrist-wearable device 1102 queues receiving one or more status indications until the user 1101 disabled quiet mode or a focus mode. In some embodiments, after the user 1101 disables the quiet mode or the focus mode, the queued status indications can be presented sequentially via a sequence of animated transitions. In some embodiments, a respective time corresponding to one or more status indications is presented in conjunction with the respective animated transition corresponding to the one or more status indications (e.g., a time lapse).

In some embodiments, the wrist-wearable device 1102 presents, via the display 1104, the first animated avatar 1108-1 (based on a first status of the first contact 1111) at a first time and, while the first animated avatar 1108-1 is presented, gradually dims the display 1104 until fully dimmed (e.g., no longer displayed or off) at a second time. That is, after the first animated avatar 1108-1 has been presented, the display 1104 is illuminated and dimmed at a predetermined rate until completely off (e.g., the screen remains illuminated for 30 seconds, 45 seconds, 1 minute, etc.). When the wrist-wearable device 1102 modifies the first animated avatar 1108-1 to present the second animated avatar 1108-2, the wrist-wearable device 1102 also illuminates the display 1104 (which is gradually dimmed as discussed above) to allow the user 1101 to view the first contact 1111's updated status. In some embodiments, the wrist-wearable device 1102, in response to detecting an in-air hand gesture performed by the user 1101 (e.g., a wrist movement, such as a rolling wrist gesture), is configured to present the first animated avatar 1108-1 or the second animated avatar 1108-2.

FIG. 11C shows the wrist-wearable device 1132 worn by the first contact 1111. In some embodiments, a wrist-wearable device can be customized with different band styles, and different band portions having the different band styles may correspond to different device identifiers (e.g., RFID tags embedded within or otherwise disposed upon the respective band portions of the wrist-wearable devices). For example, as shown in FIG. 11C, the wrist-wearable device 1132 worn by the first contact 1111 has a distinct band 1133 than the wrist-wearable device 1102 worn by the user 1101. In some embodiments, the band 1133 is a detachable structural component of the wrist-wearable device. In other words, the band 1133 is a customizable portion of the wrist-wearable device that can be coupled to a capsule portion of the wrist-wearable device. A customized band 1133 can be a stylized band or a designer band that can be selected and worn by the user. In some embodiments, the band 1133 (e.g., a detachable structural component of the wrist-wearable device) includes a device identifier that allows for the wrist-wearable device to detect the band and/or type of band coupled with the wrist-wearable device. In some embodiments, an animated avatar includes a representation of a customized band 1133 of a wrist-wearable device 1132. In particular, the wrist-wearable device 1102 can modify, based on the device identifier of the customized band 1133 of the wrist-wearable device 1132, the animated avatar 1108 to include the customized band as an accessory item worn by animated avatar 1108 (as described above in reference to FIG. 11A).

Similar to the wrist-wearable device 1102 worn by the user 1101, the wrist-wearable device 1132 worn by the first contact 1111 is configured to present, via its display 1134, a watch-face user interface 1136-1 at a first point in time, which includes a respective first animated avatar 1138-1 corresponding to the user 1101. For example, as shown in FIG. 11C, the watch-face user interface 1136-1 displays the first animated avatar 1138-1 of the user 1101 in conjunction with a contextual-information visual representation, specifically a textual indication 1135, based on a status indication provided by the user 1101 via the wrist-wearable device 1102. As described above, the user 1101 can provide a status indication by performing the gesture 1124 that selects the selectable user interface element 1122-a in FIG. 11B.

Figures 2, 11D:
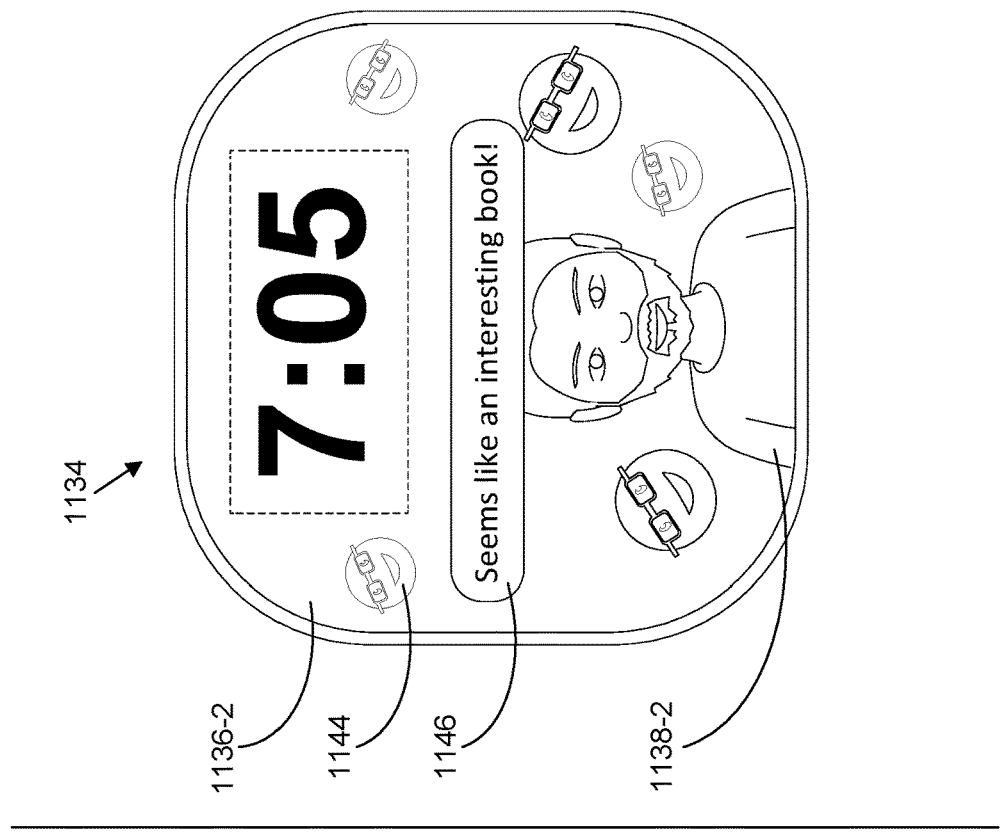
Figures 1, 11D:
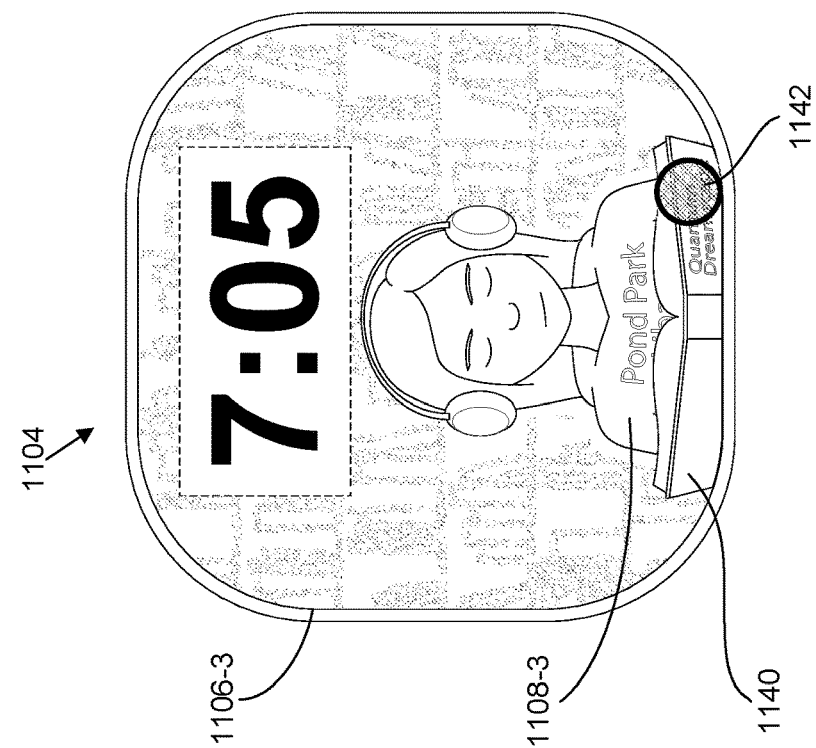

FIGS. 11D-1 and 11D-2 show side-by-side interactions at respective wrist-wearable devices of the user 1101 and the first contact 1111. In particular, FIG. 11D-1 shows the display 1104 of the wrist-wearable device 1102 and FIG. 11D-2 shows the display 1134 of the wrist-wearable device 1132. Each wrist-wearable device 1102 and 1132 displays a respective watch-face user interface 1106-3 and 1136-2, which are continuations of watch-face user interfaces 1106-2 and 1136-1, respectively. The watch-face user interface 1106-3 is presented at a third point in time and includes a third animated avatar 1108-3, which is a subsequently modified animated avatar following the modification causing the presentation of the second animated avatar 1108-2. The third animated avatar 1108-3 includes a contextual-information visual representation to passively communicate information from the first contact 1111 (if shared) to the user 1101. In some embodiments, the contextual-information visual representation is based on media content or other information accessed and shared by the respective wearer of the wrist-wearable device. For example, in FIG. 11D-1, the contextual-information visual representation is virtual object 1140, specifically a virtual book, with which the third animated avatar 1108-3 interacts. Further, the virtual object 1140 can include information that correspond to media content (e.g., a publication) that the first contact 1111 is accessing via the wrist-wearable device 1132 and/or an electronic device communicatively coupled with the wrist-wearable device 1132.

In some embodiments, the user 1101 can interact with the virtual object 1140 in the third animated avatar 1108-3. For example, as shown in FIG. 11D-1, the user 1101 performs a tap gesture 1142 on the display of the wrist-wearable device 1102, or an in-air hand gesture directed to the virtual object 1140. The wrist-wearable device 1102, in response to detecting selection of the virtual object 1140, can present additional information on the virtual object 1140, such as the title of the virtual object 1140, a summary of the virtual object 1140, related topics on the virtual object 1140, etc. Alternatively, or additionally, in some embodiments, the wrist-wearable device 1102, in response to detecting selection of the virtual object 1140, can present prompts or suggestions for discussing the virtual object 1140 with the first contact 1111 (e.g., "Seems like an interesting book!"). In some embodiments, an indication or visual emphasis can be provided in conjunction with presentation of a contextual-information visual representation to indicate interactivity (e.g., a colored outline on the virtual object 1140, different artistic effects, animated effects, audio, etc.).

The watch-face user interface 1136-2 is presented at a second point in time includes a second animated avatar 1138-2 of the user 1101, which is a modified animated avatar of the first animated avatar 1138-1 shown in FIG. 11C. The second animated avatar 1138-2 is displayed in conjunction with a plurality of reaction emojis (e.g., an animated reaction emoji 1144), which can be based on a status indication provided by the user 1101 (e.g., emojis sent via the wrist-wearable device 1102, determined based on shared textual messages, and/or other status indication provide above in reference to FIG. 11A). For example, the user 1101 interacting with a portion of the third animated avatar 1108-3 (e.g., via a tap gesture 1142 selecting virtual object 1140) allows the user to share a reaction or otherwise interact with the first contact 1111 based on the status indications shared by the first contract. In some embodiments, the type of reaction emojis that are displayed in conjunction with the animated avatar 1138-2 can be based on analysis (via a machine-learning model) of a textual message sent from the user 1101 to the first contact 1111. Alternatively, or additionally, in some embodiments, the second animated avatar 1138-2 of the user 1101 performs an animated imitation of the emoji.

Figure 11F:
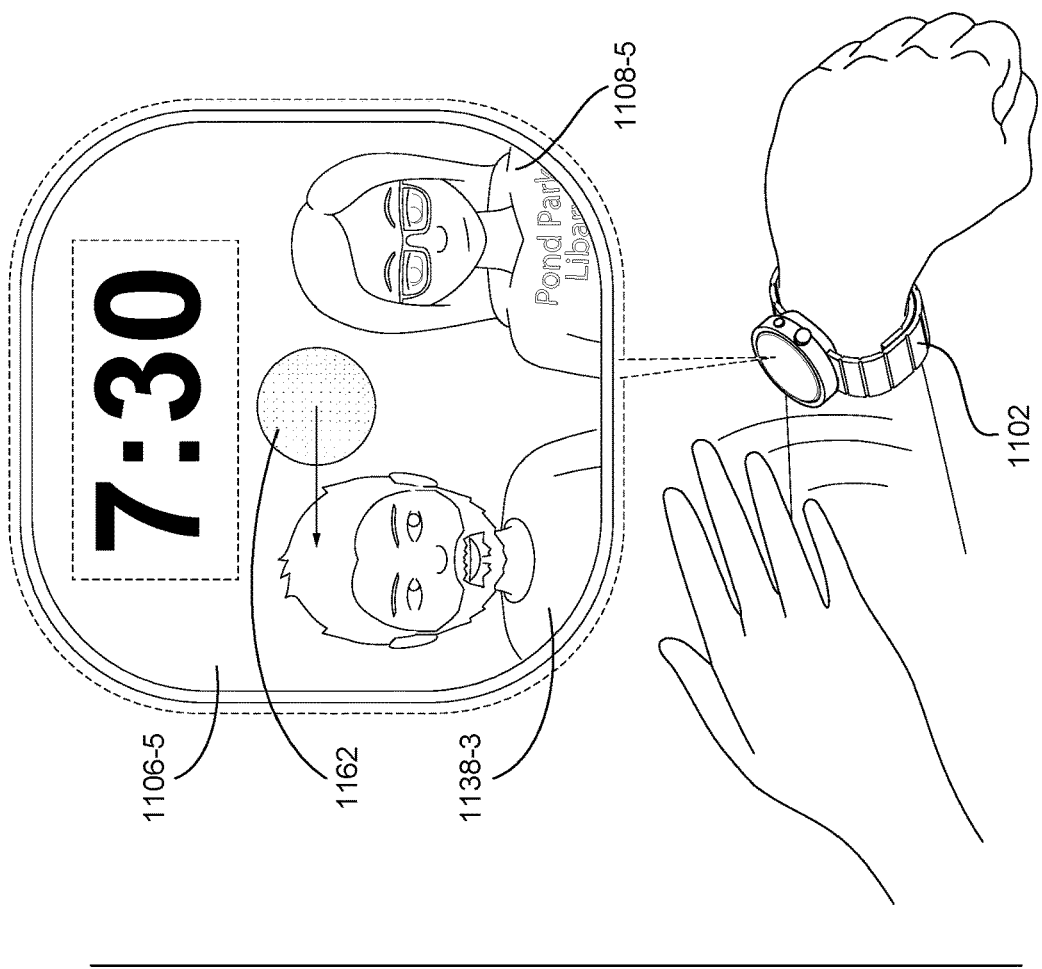
Figure 11E:
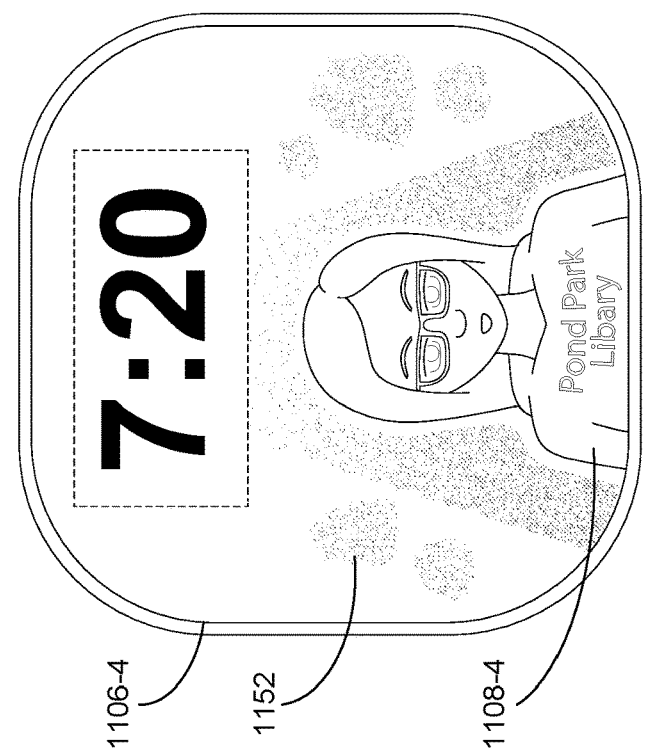

FIG. 11E shows the wrist-wearable device 1102 presenting, via display 1104, a watch-face user interface 1106-4 at a fourth point in time that includes a fourth animated avatar 1108-4, which is a subsequently modified animated avatar from the third animated avatar 1108-3 shown in FIG. 11D-1. The fourth animated avatar 1108-4 is displayed in conjunction with a background scene element 1152, which shows a road and several trees lining the road. The background scene element 1152 is presented to communicate to the user 1101 that the first contact 1111 is traveling. For example, the first contact 1111 has left the library as shown in FIGS. 11A-11D-2 and is on her way home as described above in reference to FIG. 11B. In some embodiments, the wrist-wearable device 1102 generates the background scene element 1152 in response to receiving a status indication (e.g., a change in a location) from the first contact 1111. That is, a context-information visual representation, such as a background scene element, can be changed to a different background scene element based on a status indication. In some embodiments, the location change of the first contact 1111 is automatically shared with the user 1101 (if the first contact 1111's privacy settings have been set to share that information with the user 1101). Alternatively, in some embodiments, the first contact 1111 manually shares her location with the user 1101.

FIG. 11F shows the wrist-wearable device 1102 presenting, via the display 1104, a watch-face user interface 1106-5 at a fifth point in time. The watch-face user interface 1106-5 includes a third animated avatar 1138-3 corresponding to the user 1101, and a fifth animated avatar 1108-5 corresponding to the first contact 1111. In some embodiments, based on a status indication that the user 1101 is within a predetermined proximity to a respective contact (e.g., the first contact 1111), the wrist-wearable device causes animated avatars of the user 1101 (e.g., the third animated avatar 1138-3) and the first contact 1111 (e.g., the fifth animated avatar 1108-5) to be displayed within the same user interface (e.g., a wake-screen user interface, a clock-face user interface, and/or other watch-face user interface). That is, the status indication can indicate a spatial relationship between the user 1101 (e.g., the wearer) and another user (e.g., the first contact 1111). For example, as shown in FIG. 11F, the first contact 1111 has left the library and arrived home, where the user 1101 agreed to meet her. In some embodiments, the status indication is received based on the user 1101 and the first contact 1111 being within a predetermined proximity (e.g., 5 feet, 10 feet, the same room, the same house, etc.). In some embodiments, the determination that the user 1101 and the first contact 1111 are within the predetermined proximity is based on a determination that the user 1101 and the first contact 1111 are co-located (e.g., in the same room, at the same amusement park, at the same venue and/or world of an artificial-reality application).

In some embodiments, the watch-face user interface 1106 is a first watch-face user interface 1106 of a plurality of watch-face user interfaces. The wrist-wearable device 1102, in response to a user input (e.g., an in-air hand gesture, a tap gesture, etc.), can display distinct watch-face user interfaces. For example, as shown in FIG. 11F, the user 1101 performs a swipe gesture 1162, which, when detected by the wrist-wearable device 1102, causes the wrist-wearable device 1102 to present a distinct watch-face user interface 1166 as discussed below in reference to FIG. 11G.

Figure 11H:
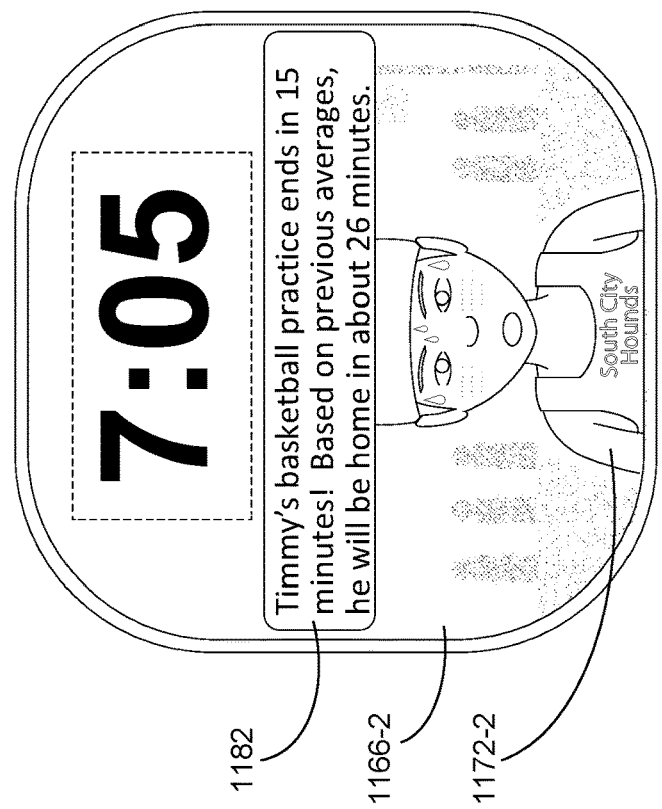
Figure 11G:
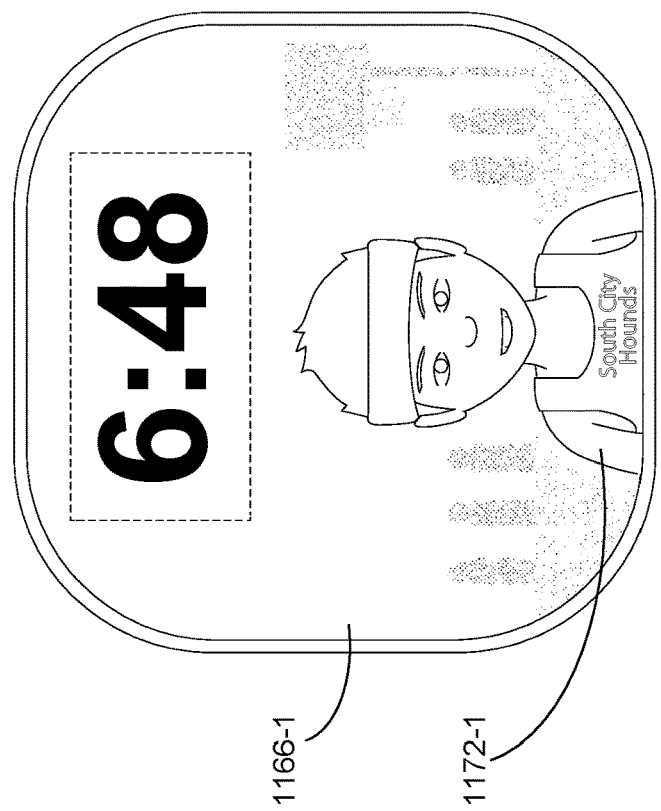

FIG. 11G shows the wrist-wearable device 1102 presenting a distinct watch-face user interface 1166, in accordance with some embodiments. In some embodiments, the distinct watch-face user interface 1166 includes another animated avatar 1172-1 corresponding to a second contact. In some embodiments, the second contact has a predefined relationship with the user 1101 (e.g., based on settings of a first application (e.g., a contact configuration user interface, a first sharing application, a social media platform, a game, etc.).

The wrist-wearable device 1102 generates the other animated avatar 1172-1 based on a status of the second contact (as described above in reference to FIG. 11A). For example, the user 1101 and the second contact may share aspects of a calendar (e.g., calendar events to which both the user 1101 and another contact are associated) and the shared calendar can include the second contact's basketball practice, and the wrist-wearable device can generate the other animated avatar 1172-1 to represent the second contact at basketball practice. The wrist-wearable device 1102 can modify that other animated avatar 1172-1 in response to a received status indication as described above in reference to FIGS. 11A-11F. For example, the wrist-wearable device 1102 in response to receiving a status indication, can update a respective status of the second contact along with the other animated avatar 1172-1 as shown and described below.

In FIG. 11H, the other animated avatar 1172-1 is modified based on a status indication (e.g., a calendar notification) received at the wrist-wearable device 1102. In some embodiments, the wrist-wearable device 1102 provides one or more notifications to the user 1101 that are related to one or more of his or her contacts and updates a respective animated avatar accordingly. For example, as shown in FIG. 11H, the wrist-wearable device 1102 presents a contextual-information visual representation 1182 (e.g., a status indicator with a textual prompt) that notifies the user 1101 that a calendar event is ending or upcoming and presents modified animated avatar 1172-2. For example, the contextual-information visual representation 1182 can state: "Timmy's basketball practice ends in 15 minutes!Based on previous averages, he will be home in about 26 minutes." As the second contact is completing his basketball practice, the modified animated avatar 1172-2 appears visually exhausted (e.g., having virtual sweat beads on their face).

In some embodiments, if the appropriate sharing permissions are set or if the second contact shares the information, the wrist-wearable device 102 can receive signals detected by one or more sensors of an electronic device worn by the second contact while they are performing a physical activity, and the modified animated avatar 1172-2 can be based on the signals detected by the one or more sensors (e.g., more or less sweat based on the second contacts hear rate). In other words, aspects of a respective user's exertion can be reflected via the respective user's animated avatar once they are detected by sensors or other inputs (e.g., shared content, performance data collected by a fitness device, etc.). In some embodiments, data from a scheduling application can be synchronized with an animated avatar such that a status indication corresponding to the avatar can include aspects related to the scheduling data (e.g., scheduling data related to the basketball practice of the second contact).

In some embodiments, the wrist-wearable device 1102 is configured to display the other animated avatar 1172-1, optionally at the same watch-face user interface. That is, in some embodiments, the contact and/or other user being presented can be configured to change based on receiving a status indication based on a contact associated with a most recent status indication.

Figure 12B:
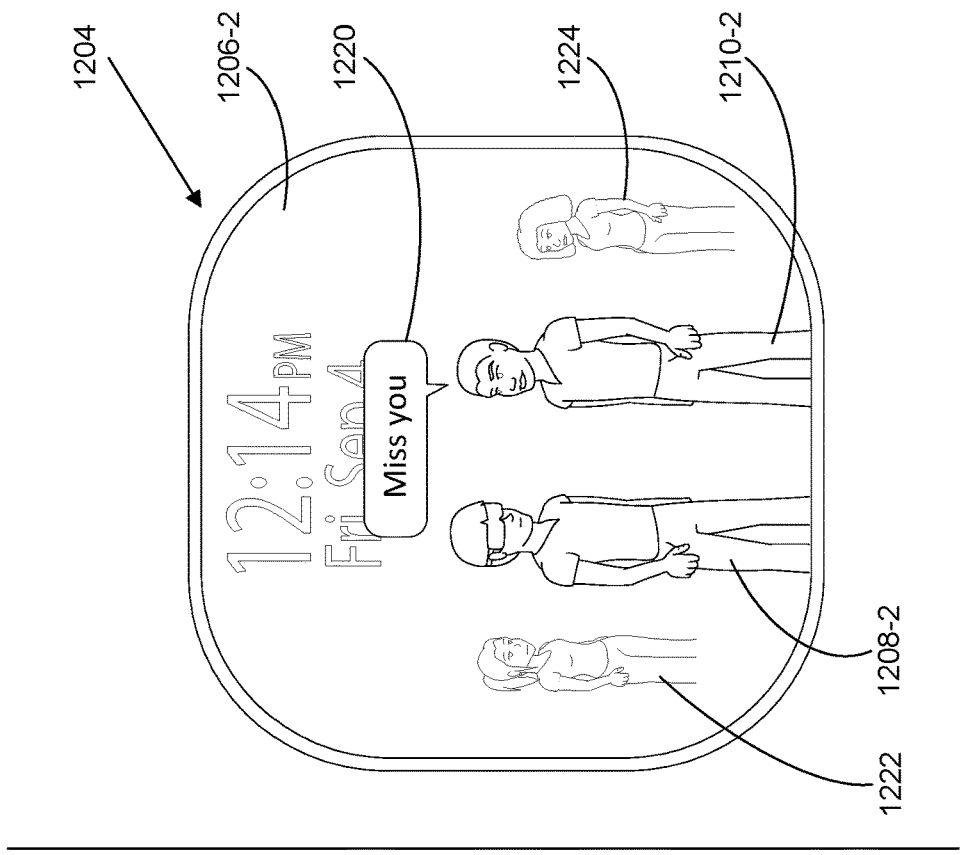
FIGS. 12A-12D illustrate a plurality of animated avatars being presented at a watch-face user interface in accordance with some embodiments.
Figure 12A:
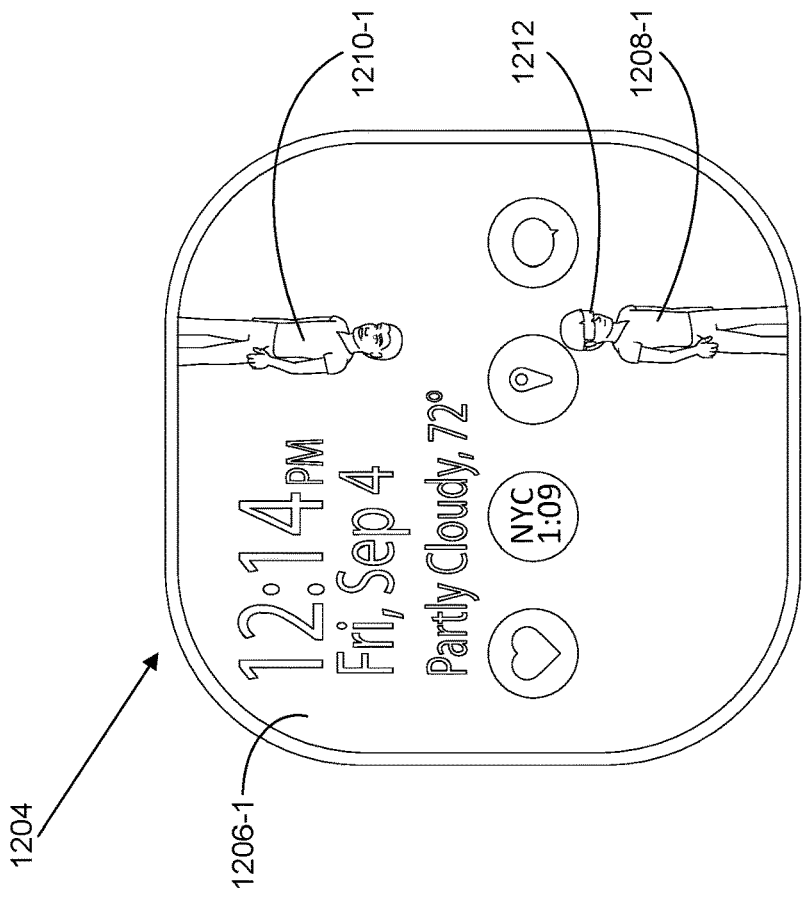

FIGS. 12A-12D illustrate a plurality of animated avatars being presented at a watch-face user interface, in accordance with some embodiments. In FIG. 12A, a display 1204 of a wrist-wearable device (analogous to the wrist-wearable device 1102 shown in FIG. 11A) is presenting a watch-face user interface 1206-1 at a first point in time. The watch-face user interface 1206-1 includes a plurality of animated avatars, including a first animated avatar 1208-1 and a second animated avatar 1210-1. Each of the first and second animated avatars 1208-1 and 1210-1 correspond to different respective users. In some embodiments, the plurality of animated avatars is associated with a watch-face user interface 1206 (e.g., a plurality of contacts can be associated with a watch-face user interface as described above in reference to FIGS. 5A-5F, or a different user interface that the user can access from the watch-face user interface). For example, a user interface can be configured to present animated avatars corresponding to friends, co-workers, family members, etc., and each respective user interface can be configured to include animated avatars from those specific groups. In some embodiments, the wrist-wearable device can update the animated avatars that are presented at the display 1204 based on status indications that are received from users in the respective groups. In some embodiments, the wrist-wearable device is configured to modify each animated avatars of the plurality of animated avatars independently when a status indication of a respective contact is received. In some embodiments, one or more animated avatars of the plurality of animated avatars (presented within a user interface) are configured to react to one or more modified animated avatar. For example, the first animated avatar 1208-1 can be modified responsive to a receive the status indication and the second animated avatar 1210-1 can also be modified to react to the first animated avatar 1208-1's modification. Alternatively, in some embodiments, the wrist-wearable device 1102 is configured to modify the animated avatars of the plurality of animated avatars when a collective status indication is received (e.g., a group-wide status update of the plurality of contacts is received).

In some embodiments, each animated avatar of the plurality of animated avatars is presented with an accessory item, where the accessory item corresponds to the electronic device that the respective user is wearing and/or using. For example, the animated avatar 1208-1 is presented with a virtual VR headset 1212 that corresponds to a head-wearable device (e.g., a three-dimensional virtual object having a visual appearance indicative a VR headset that the corresponding user is wearing) being worn by the respective contact. In some embodiments, an animated avatar is modified to include an accessory item when it is worn by a respective contact. As described above, a status indication (of a respective contact) can include a device identifier (e.g., a device name, wireless protocols, an RFID tag, a Hall effect sensor signature, an authentication key, application identifier (e.g., an identifier provided by an associated application), etc.), which is used by the wrist-wearable device 1102 to modify an animated avatar. For example, when a contact associated with the animated avatar 1208-1 dons a head-wearable device, the head-wearable device and/or an electronic device communicatively coupled with the head-wearable device may provide (e.g., via an electronic communication) a device identifier (e.g., via a status indication) to the wrist-wearable device 1102, and the wrist-wearable device 1102 modifies the animated avatar 1208-1 to include the virtual VR headset 1210.

In some embodiments, the user 1101 can manually position different animated avatars at different portions within the watch-face user interface 1206. For example, as shown in FIG. 12A, the first animated avatar 1208-1 is at a bottom portion of the watch-face user interface 1206 and the second animated avatar 1210-1 is at a top portion of the watch-face user interface 1206. This allows the user to easily identify contacts by allowing the user 1101 organize the animated avatars. Alternatively, the animated avatars can be organized based on their current interaction with the user 1101. For example, while the user 1101 and the contact associated with the first animated avatar 1208-1 are interacting in a virtual-reality world, the first animated avatar 1208-1 will appear at a bottom portion of the watch-face user interface 1206 and the second animated avatar 1210-1 will appear at a top portion of the watch-face user interface 1206 (e.g., to represent that the contact associated the second animated avatar 1210-1 in not within the virtual-reality world). If the user 1101 exits the virtual-reality world (while the contact associated with the first animated avatar 1208-1 remains in the virtual-reality world), the first animated avatar 1208-1 will appear at a top portion of the watch-face user interface 1206 and the second animated avatar 1210-1 will appear at a bottom portion of the watch-face user interface 1206.

FIG. 12B illustrates the watch-face user interface 1206-2 at a second point in time. In some embodiments, the wrist-wearable device 1102 updates the watch-face user interface 1206-2 based on contacts associated with the respective watch-face user interface becoming available or provide status indications. For example, the watch-face user interface 1206-2 includes at least four animated avatars of the plurality of animated avatars associated with the watch-face user interface 1206-2. The animated avatars can interact with one another (e.g., representative of contacts communicating with one another) and/or direct an action toward the user 1101 (e.g., representative of contacts communicating with the user 1101). For example, as shown in FIG. 12B, the first animated avatar 1208-2 is interacting with the second animated avatar 1210-2 (e.g., a first contact is communicating with the second contact, which is represented by textual prompt 1220 presented by the wrist-wearable device 1102). In some embodiments, recently active contacts (e.g., contacts that recently shared a status indication that is provided to the wearer's wrist-wearable devices) are presented at a foreground layer of the watch-face user interface, while less active contacts (e.g., contacts that have not recently provided a status indication) are presented in a background layer of the watch-face user interface 1206-2. For example, as shown in FIG. 12B, the first and second animated avatars 1208-2 and 1210-2 (which correspond to contacts that are actively interacting with one another) are at a foreground layer of the watch-face user interface 1206-2, and third and fourth animated avatars 1222 and 1224 (which correspond to contacts that have not provided a status indication) are at a background layer of the watch-face user interface 1206-2.

Figure 12D:
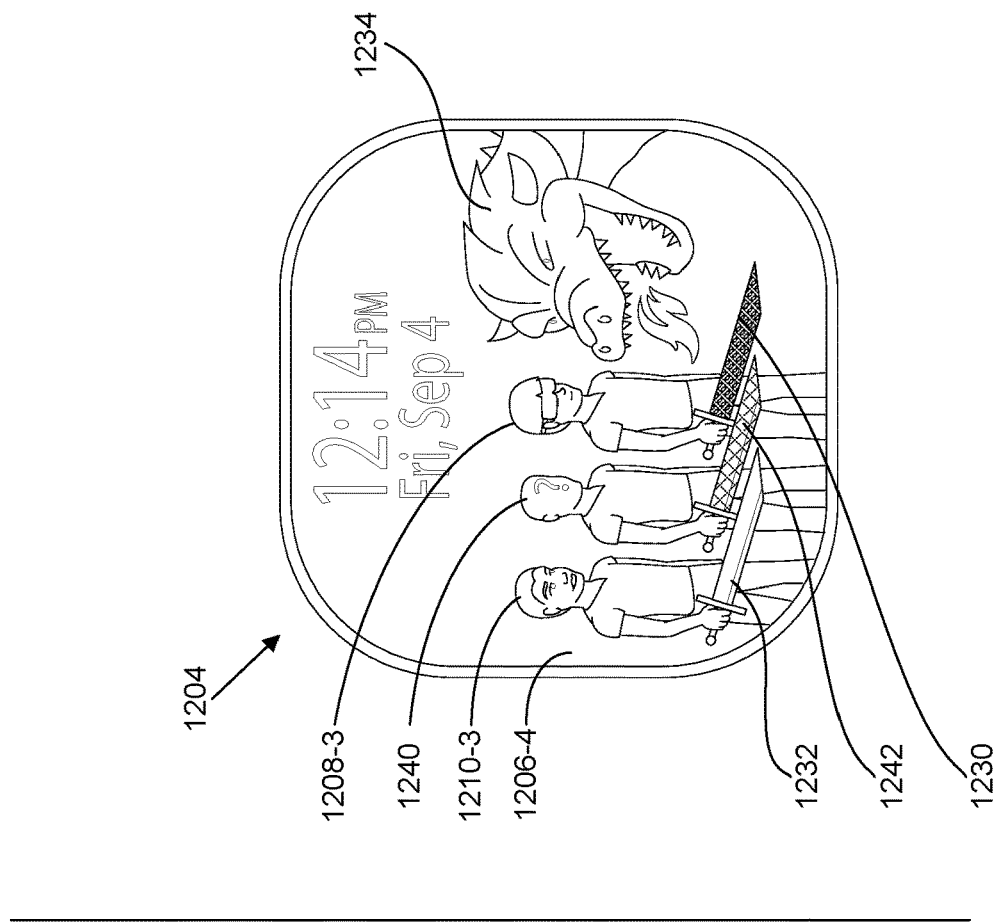
Figure 12C:
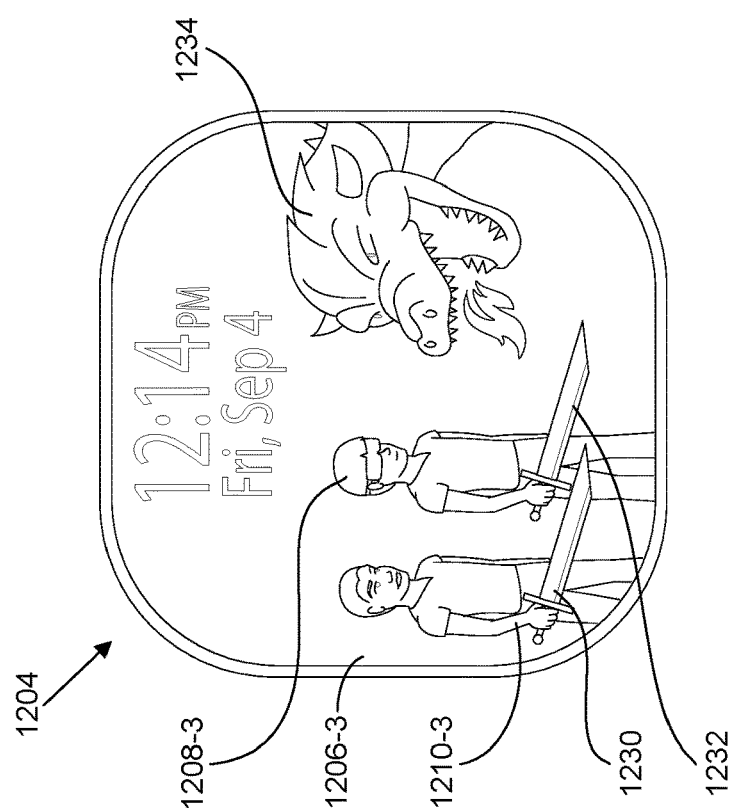

Turning to FIGS. 12C and 12D, the display 1204 is displaying respective watch-face user interfaces 1206-3 and 1206-4, which correspond to a third point in time and a fourth point in time, respectively.

FIG. 12C shows the watch-face user interface 1206-3 at the third point in time. The watch-face user interface 1206-3 includes the first and second animated avatars 1208-3 and 1210-3, and a dragon virtual object 1234. Each of the first and second animated avatars 1208-3 and 1210-3 are presented in conjunction with sword accessory objects 1230 and 1232. The first and second animated avatars are arranged in a coordinated representation (e.g., faced in the same direction, directed towards the dragon virtual object 1234) to indicate that both respective users corresponding to the first and second animated avatars 1208-3 and 1210-3 are engaging in related activities (e.g., both respective users are using the same artificial-reality application at the same time). For example, the coordinated representation of the first and second animated avatars 1208-3 and 1210-3 may indicate that both respective users corresponding to the first and second animated avatars 1208-3 and 1210-3 are using a same artificial-reality application at a same time (e.g., concurrently). In some embodiments, the presentation of both of the first and second animated avatars 1208-3 and 1210-3 may indicate that the respective corresponding users are participating in a particular activity (e.g., a cooperative mode) within the artificial-reality application.

FIG. 12D shows the first and second animated avatars 1208-3 and 1210-3 configured and arranged in the coordinated fashion, facing toward the dragon virtual object 1234, and a third animated avatar 1240, configured and arranged in a coordinated fashion with the first and second animated avatars 1208-3 and 1210-3. The third animated avatar 1240 includes an anonymous facial representation (presented as a question mark), which indicates that the contact associated with the third animated avatar 1240 is unknown to the user 1101. In some embodiments, the user 1101 can view an animated avatar of an unknown user (e.g., a non-preexisting contact of the user 1101), where the unknown user uses a distinct electronic device and is not a direct contact of the user 1101. In some embodiments, the watch-face user interface 1206 presents an animated avatar 1240 of an unknown user when the user 1101 engages in an activity with the unknown user and/or the unknown user (or any other user) requests to keep their information private). For example, the user 1101 can engage in the artificial-reality application with the two contacts corresponding to the animated avatars 1208-3 and 1210-3 and an unknown user can (if allowed by the user 1101) join his or her group or party. When the unknown user joins the user 1101's party, the wrist-wearable device 1101 presents, via its display 1204, the third animated avatar 1240. This allows the user 1101 to easily determine who is engaged in an activity with him or her and/or adjust who they are engaging in an activity with (e.g., removing the unknown user from him or her group, befriending the unknown user, leaving the group, etc.). Similarly, if the user 1101 wishes to engage in an activity with one or more of his or her contacts, the user 1101 can view who his or her contacts are engaged with (e.g., mutual contacts or unknown users) to determine whether he or she should join the contacts' group.

By presenting unknown users (e.g., a distinct user that is not a contact of the user 1101) as a generic avatar (e.g., the third animated avatar 1240), the user can identify that one or more of his or her respective contacts is engaging in a particular activity with another user that is not a contact, while respecting the privacy protections of the unknown user. For example, the third animated avatar 1240 being shown alongside the first and second animated avatars 1208-3 and 1210-3 indicates that the unknown user corresponding to the third animated avatar 1240 is also engaging in the activity (e.g., a cooperative activity within a same artificial-reality application) at a same time as the respective users corresponding to the first and second animated avatars 1208-3 and 1210-3. Each of the animated avatars 1208-3, 1210-3, and 1240 is configured to appear holding accessory objects 1230, 1232, and 1242, respectively, which each have distinct visual appearances. In some embodiments, accessory objects may correspond to user interface elements of an application instead of physical objects (e.g., in game accessories, such as armor, weapons, clothing, or other in-application accessories that can be equipped). For example, the accessory objects 1230, 1232, and 1242 can correspond to different tools that players can use within an artificial-reality application. A user of the wrist-wearable device can select one of the accessory objects 1230, 1232, and 1242 (e.g., via a hand gesture, and/or selection of selectable user interface elements, etc.), to cause additional information about the selected accessory object to be displayed.

Figure 13A:
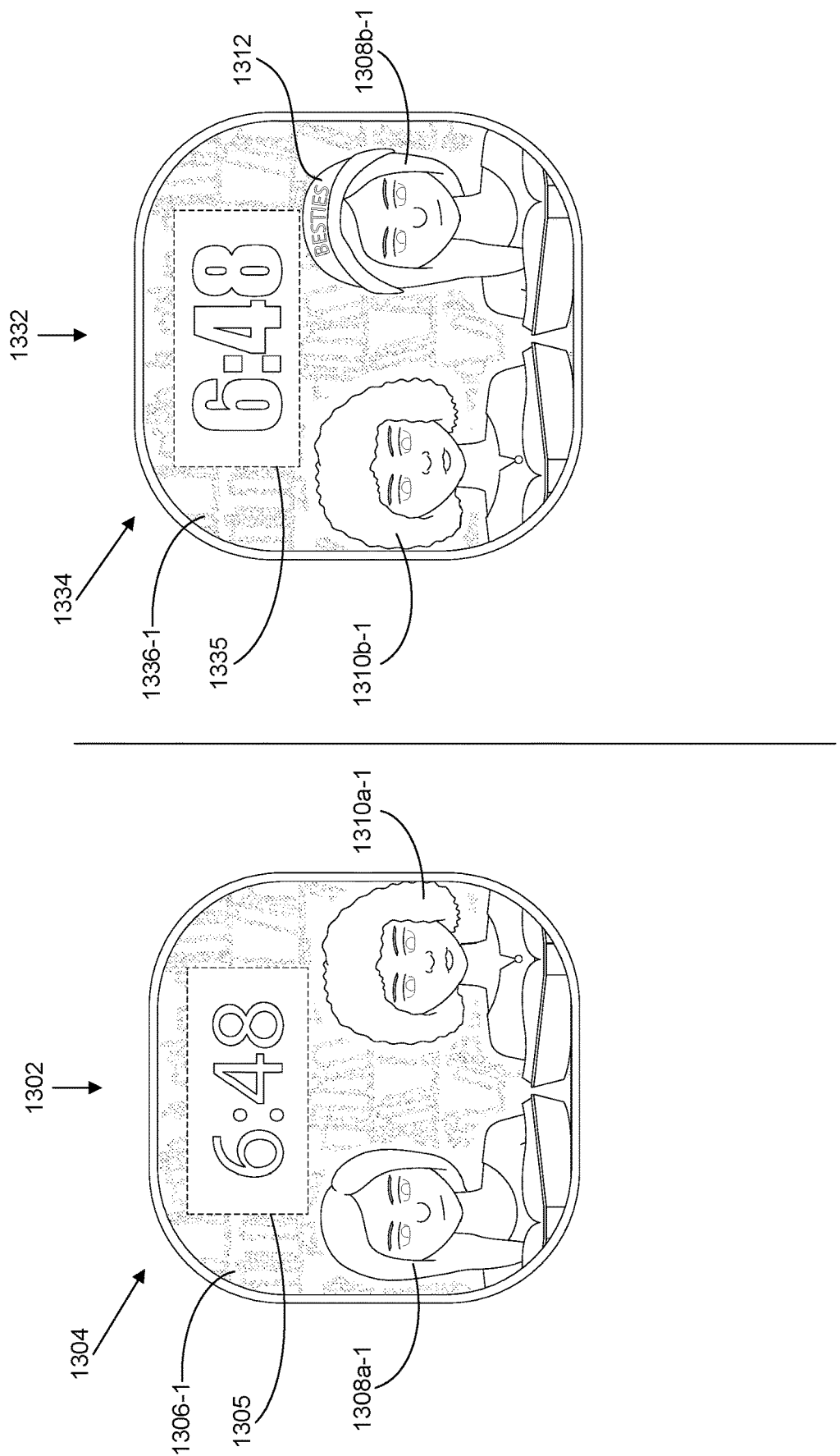
FIGS. 13A-13B illustrate animated avatars presented at different wrist-wearable devices, in accordance with some embodiments.
Figure 13B:
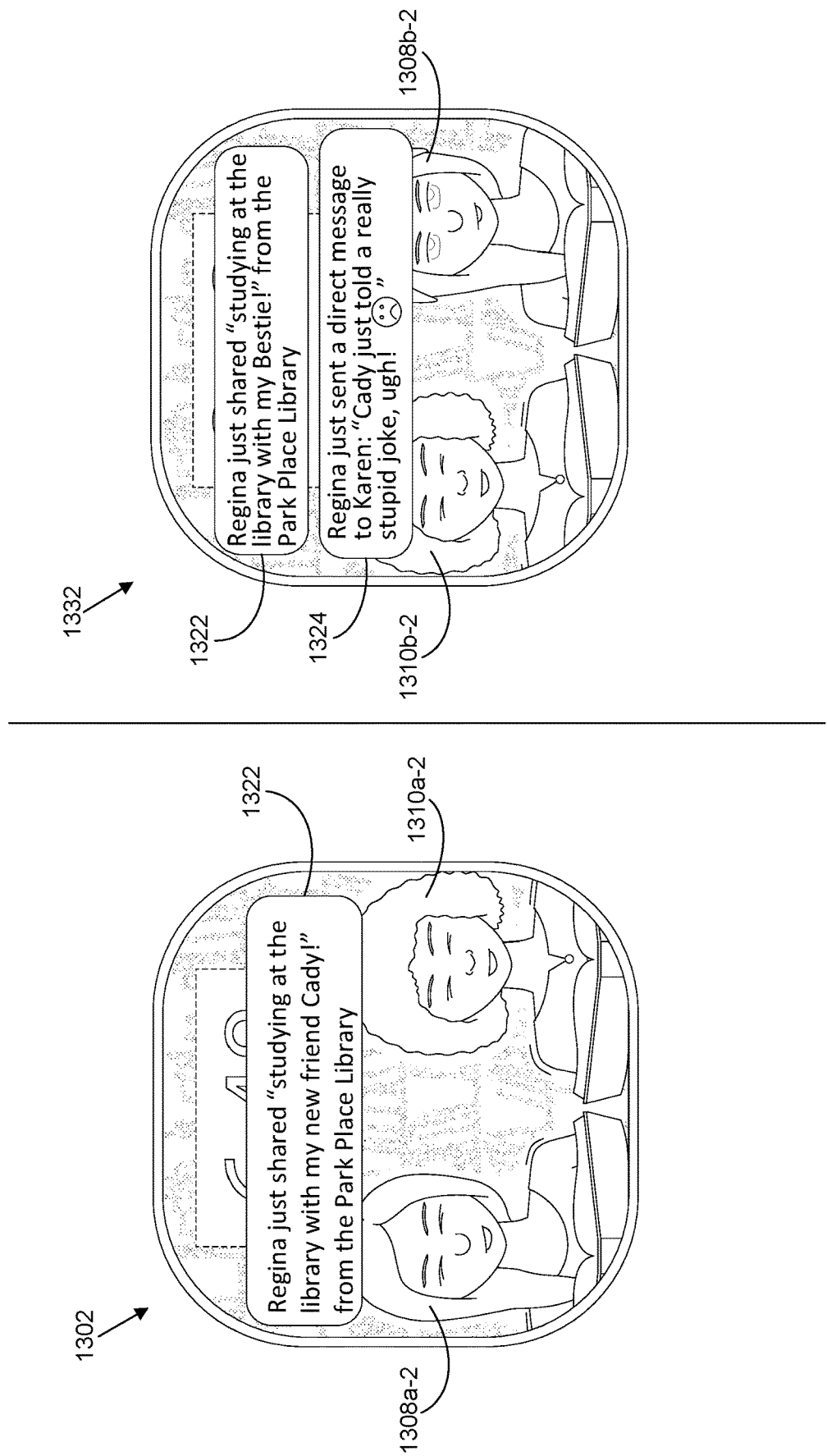

FIGS. 13A-13B illustrate animated avatars presented at different wrist-wearable devices, in accordance with some embodiments. In FIGS. 13A and 13B, a first wrist-wearable device 1302 is worn by a first user and a second wrist-wearable device 1332 is worn by a second user. The first and second wrist-wearable devices 1302 and 1332 display animated avatars corresponding to a first contact and a second contact 1308 and 1310. The animated avatars displayed by the first and second wrist-wearable devices 1302 and 1332 show different relationships between first and second contacts and the respective users of the wrist-wearable devices. In some embodiments, animated avatars of the first and second contacts 1308 and 1310 are based on respective relationships between the contacts and the users of the wrist-wearable device. For example, the first user of the first wrist-wearable device 1302 can have a first respective relationship with the first and second contacts and the second user of the second wrist-wearable device 1302 can have a second respective relationship with the first and second contacts and the second user, and the first wrist-wearable device 1302 can present, at its display 1304, first variations (e.g., modifications) of the animated avatars corresponding to the first and second contacts 1308a and 1310a based on the first respective relationship and the second wrist-wearable device 1332 can present, at the display 1334, second variations of the animated avatars corresponding to the first and second contacts 1308b and 1310b based on the second respective relationship.

In some embodiments, the respective relationship between users and the contacts is based on user defined relationships (e.g., best friend, coworker, animosity, etc.). In some embodiments, the respective relationship between users and the contacts is based on the number of interactions and/or connections between the users and the contacts.

In some embodiments, the relationship between users and the contacts can be based on respective users and contacts having a defined relationship (e.g., being connected, being friends) via one or more sharing applications (e.g., messaging applications, social-media applications). For example, the first and second users of the wrist-wearable devices 1302 and 1332 can be connected with the first and second contacts corresponding to the animated avatars 1308 and 1310 via a first sharing application (e.g., Instagram), while the wearer of the wrist-wearable device 1332 may have an additional connection with the user corresponding to the animated avatar 1308 at a different application (e.g., WhatsApp) in this example, users that connect via an image sharing application can be closer than users that connect only via a messaging application.

FIGS. 13A-13B show the respective variations of first and second animated avatars 1308 and 1310 at distinct point in time. The first variations of the animated avatars corresponding to the first and second contacts (animated avatars 1308a and 1310a, respectively) are based on the relationship between the contacts and the first user and, as such, presented by the display 1304 of the first wrist-wearable device 1302. Similarly, the second variations of the animated avatars corresponding to the first and second contacts (animated avatars 1308b and 1310b, respectively) are based on the relationship between the contacts and the second user and, as such, presented by the display 1334 of the second wrist-wearable device 1332. Further, the animated avatars corresponding to the first and second contacts 1308 are displayed at two distinct points in time reference numerals 1308-1 and 1310-1 denoting animated avatars corresponding to the first and second contacts, respectively, presented at a first point in time and reference numerals 1308-2 and 1310-2 denoting animated avatars corresponding to the first and second contacts, respectively, presented at a second point in time.

In FIG. 13A, the first and second wrist-wearable devices 1302 and 1332 show the respective variations of the animated avatars corresponding to the first and second contacts at a first point in time.

In some embodiments, the different relationships between the contacts and the users can result in the variations to the animated avatars. In particular, one or more aspects of a presented animated avatar can be based on a particular relationship between a user of the wrist-wearable device and a contact. For example, the animated avatar corresponding to the first contact 1308b-1 displayed at the second wrist-wearable device 1332 is shown wearing an accessory item 1312 (a virtual beanie that says "besties") to represent the type of relationship between the second user and the first contact, whereas the animated avatar 1308a-1 shown by the first wrist-wearable device 1302 does not wear the accessory item 1312 (which indicates that the first user and the first contact are not as close (e.g., acquaintances or friends, but not best friends)). In some embodiments, the accessory item 1312 is based on an interaction between the respective users of the wrist-wearable devices and the contacts. For example, the accessory item 1312 can be based on locations visited by the respective user and contacts (e.g., mall, zoo, amusement park, theater, etc.), an activity performed by the respective user and contacts (e.g., exercising together, studying together, eating together, playing games together, etc.), messages and/or communication between the respective user and contacts, and the like. In some embodiments, wearers of wrist-wearable devices can customize the visual representations of their contacts manually (e.g., via device and/or application settings). For example, the second user of the wrist-wearable device 1332 could have manually selected the animated avatar corresponding to the first contact 1308 and customized the animated avatar to include the accessory item 1312. While some aspects of an animated avatar corresponding to a contact can be modified by a user of a wrist-wearable device (e.g., accessory items worn by the different versions of the animated avatar), some characteristics or aspects of the animated avatars cannot be changed (e.g., facial features, eye color). In this way, the wrist-wearable device respects the contact's individual animated avatar customization and/or prevents disparagement of the contact's animated avatar.

The animated avatars 1308 and 1310 are also displayed in different relative locations (e.g., on the left and right of each other) of the first and second wrist-wearable devices 1302 and 1332. In some embodiments, a position of an animated avatar within a user interface can be based on respective user rankings of each contact for the user of the respective wrist-wearable device, frequency in which the respective users and the contacts interact, length of time that the respective users and contacts have known each other (e.g., based on the date that the contact was first generated), and/or user preference. In some embodiments, a user's closer contacts are displayed on a particular side (e.g., from left to right, from right to left, closer contacts near the foreground, etc.) of a respective user interface presenting the plurality of animated avatars. For example, the first wrist-wearable device 1302 can present on its display 1304 the animated avatar corresponding to the first contact 1308 on the left, whereas the second wrist-wearable device 1322 (whose user is closer to the first contact) can present on its display 1334 the animated avatar corresponding to the first contact 1308 on the right.

FIG. 13B illustrates modifications to the animated avatars corresponding to the first and second contacts displayed by the first and second wrist-wearable devices 1302 and 1332, in accordance with some embodiments. As described above in reference to FIG. 11A-11H, the respective wrist-wearable devices can modify one or more animated avatars responsive to received status indications. For example, as shown in FIG. 13B, the animated avatars corresponding to the first and second contacts 1308 and 1310 are modified responsive to electronic messages received by the first and second wrist-wearable devices 1302 and 1332 from respective electronic devices of the first and/or second contacts. In some embodiments, the modified animated avatars corresponding to the first and second contacts 1308 and 1310 are distinct for the respective users of wrist-wearable devices (or other electronic devices) depending on the relationship between the users and the contacts and/or distinct status indications shared.

For example, the first wrist-wearable device 1302 modifies and presents the animated avatar corresponding to the first contact 1308 responsive to a status indication received (e.g., via a social-media application) from the first contact. In particular, the first wrist-wearable device 1302 generates modified animated avatar corresponding to the first contact (the animated avatar 1308a-2) and presents the modified animated avatar 1308a-2 which includes and/or animates a textual-prompt user interface element 1322 (e.g., "Regina just shared 'studying at the library with my new friend Cady!' from the Park Place Library"). Further, based on the first user's relationship with the first and second contacts, first wrist-wearable device 1302 presents both the animated avatars 1308a-2 and 1310a-2 smiling, which can indicate an explicit and/or implicit sentiment of content of a status indication. For example, the second contact corresponding to the animated avatar 1310 could have reacted (e.g., provided a like status indication) to the electronic message provided by the first contact corresponding to the animated avatar 1308, the second contact could have commented on the electronic message, stating: "so happy to be hanging out with you, Regina!" each of which can be interpreted to have a positive sentiment and therefore cause the animated avatars corresponding to the first and second contact (the animated avatars 1308*a*-2 and 1310-2, respectively) to have positive facial expressions (e.g., smiles or laughs).

Alternatively, the second wrist-wearable devices 1302 modifies and presents the animated avatar corresponding to the first contact 1308 responsive to the status indication received (e.g., via the social-media application) from the first contact, and also modifies and presents the animated avatar corresponding to the second contact 1310 responsive to a status indication received (e.g., via the social-media application or other application) from the second contact. In particular, the second wrist-wearable device 1332 generates and presents the modified animated avatar corresponding to the first contact 1308*b*-2 as described above, and also generates and presents a modified animated avatar corresponding to the second contact 1308*b*-2 based on a status indication provided by the second contact (e.g., "Cady just told a really stupid, joke, ugh!").

The status indication provided by the second contact can be responsive to the first contact's status indication and can be either privately or publicly shared (either from the same or distinct applications or platforms). For example, as shown in FIG. 13B, "Cady just told a really stupid, joke, ugh!" is a direct message sent to Karen from Regina. The distinct tone in the electronic message shared by the second contact (e.g., annoyance or frustration) can indicate an explicit and/or implicit sentiment of content of a status indication. In FIG. 13B, the tone of the second contact's electronic message results in the wrist-wearable device modifying the animated avatar of the second contact 1310*b*-2 to show negative facial expression (e.g., a frown or a slightly annoyed or offput reaction). Because the second contact's reaction is directly provided to the second user of the second wrist-wearable device 1332, only the animated avatar corresponding to the second contact 1310*b*-2 is modified and presented at the second wrist-wearable device 1332 (e.g., the first user of the first wrist-wearable device 1302 and the first contact are not made aware of the private interaction between the second user of second wrist-wearable device 1332 and the second contact).

In this way, interactions between each user of a wrist-wearable device and their respective contacts are unique and distinct. This allows users to have personalized reactions with their friends, family, coworkers, acquaintances, or any other people with which they interact.

Example Wrist-Wearable Devices

Figure 14B:
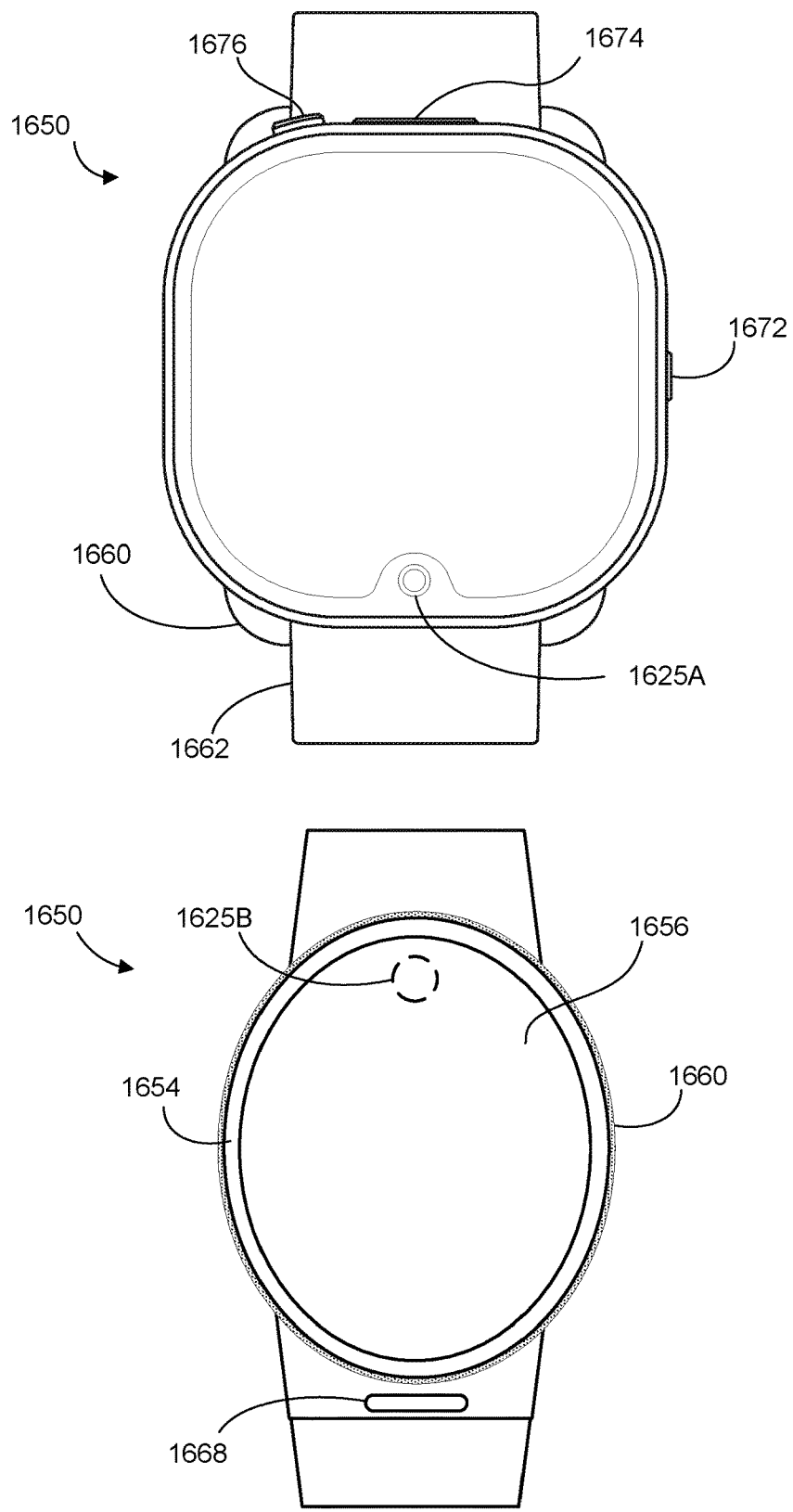
Figure 14C:
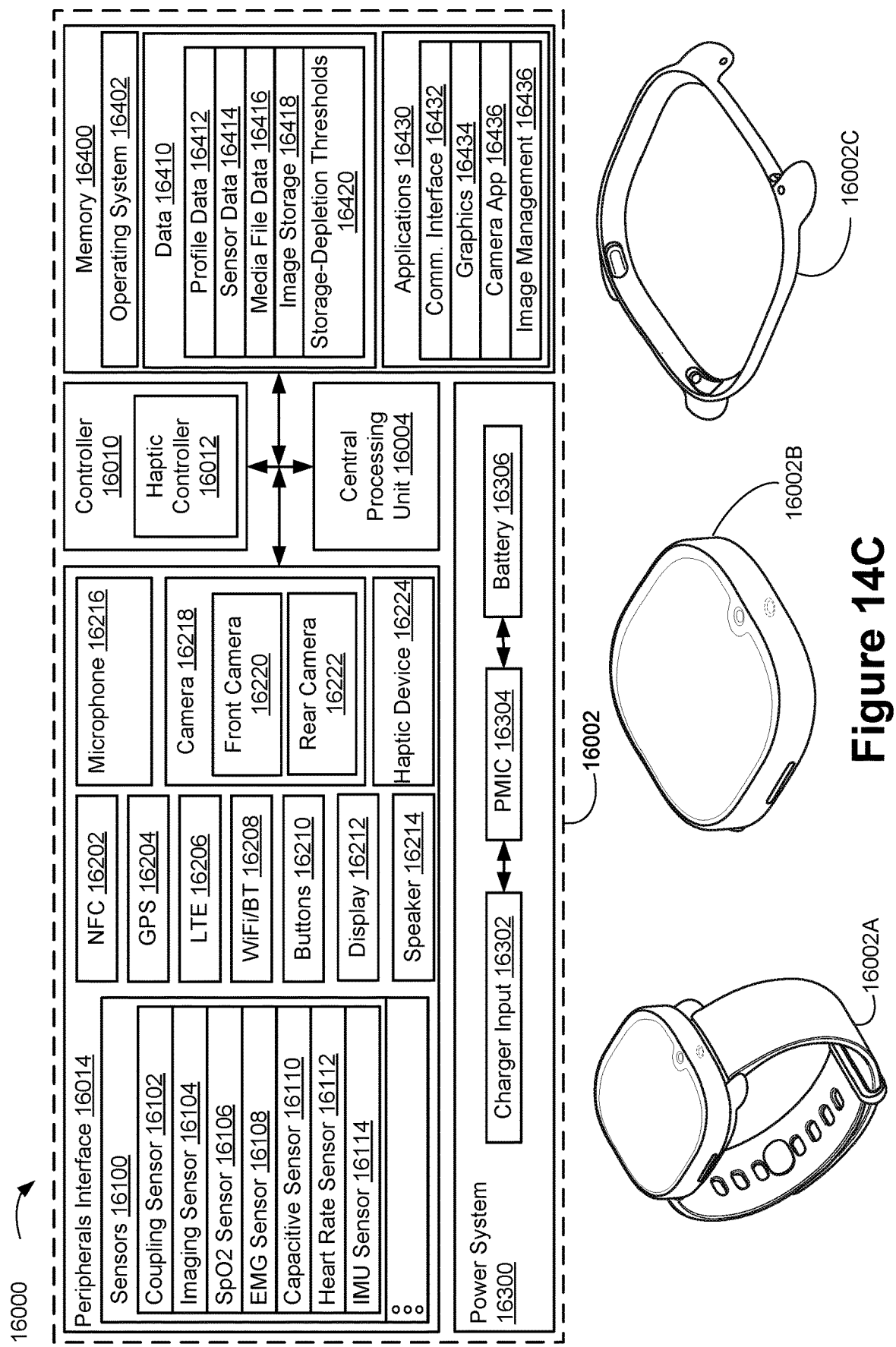

FIGS. 14A and 14B illustrate an example wrist-wearable device 1650, in accordance with some embodiments. The wrist-wearable device 1650 is an instance of the wearable device described herein, such that the wearable device should be understood to have the features of the wrist-wearable device 1650 and vice versa. FIG. 14A illustrates a perspective view of the wrist-wearable device 1650 that includes a watch body 1654 coupled with a watch band 1662. The watch body 1654 and the watch band 1662 can have a substantially rectangular or circular shape and can be configured to allow a user to wear the wrist-wearable device 1650 on a body part (e.g., a wrist). The wrist-wearable device 1650 can include a retaining mechanism 1667 (e.g., a buckle, a hook and loop fastener, etc.) for securing the watch band 1662 to the user's wrist. The wrist-wearable device 1650 can also include a coupling mechanism 1660 (e.g., a cradle) for detachably coupling the capsule or watch body 1654 (via a coupling surface of the watch body 1654) to the watch band 1662.

The wrist-wearable device 1650 can perform various functions associated with navigating through user interfaces and selectively opening applications, as described above with reference to FIGS. 1A-6B and 11A-14B. As will be described in more detail below, operations executed by the wrist-wearable device 1650 can include, without limitation, display of visual content to the user (e.g., visual content displayed on display 1656); sensing user input (e.g., sensing a touch on peripheral button 1668, sensing biometric data on sensor 1664, sensing neuromuscular signals on neuromuscular sensor 1665, etc.); messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions can be executed independently in the watch body 1654, independently in the watch band 1662, and/or in communication between the watch body 1654 and the watch band 1662. In some embodiments, functions can be executed on the wrist-wearable device 1650 in conjunction with an artificial-reality environment that includes, but is not limited to, virtual-reality (VR) environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein can be used with any of these types of artificial-reality environments.

The watch band 1662 can be configured to be worn by a user such that an inner surface of the watch band 1662 is in contact with the user's skin. When worn by a user, sensor 1664 is in contact with the user's skin. The sensor 1664 can be a biosensor that senses a user's heart rate, saturated oxygen level, temperature, sweat level, muscle intentions, or a combination thereof. The watch band 1662 can include multiple sensors 1664 that can be distributed on an inside and/or an outside surface of the watch band 1662. Additionally, or alternatively, the watch body 1654 can include sensors that are the same or different than those of the watch band 1662 (or the watch band 1662 can include no sensors at all in some embodiments). For example, multiple sensors can be distributed on an inside and/or an outside surface of the watch body 1654. As described below with reference to FIGS. 16B and/or 16C, the watch body 1654 can include, without limitation, a front-facing image sensor 1625A and/or a rear-facing image sensor 1625B, a biometric sensor, an IMU, a heart rate sensor, a saturated oxygen sensor, a neuromuscular sensor(s), an altimeter sensor, a temperature sensor, a bioimpedance sensor, a pedometer sensor, an optical sensor (e.g., imaging sensor 16104), a touch sensor, a sweat sensor, etc. The sensor 1664 can also include a sensor that provides data about a user's environment including a user's motion (e.g., an IMU), altitude, location, orientation, gait, or a combination thereof. The sensor 1664 can also include a light sensor (e.g., an infrared light sensor, a visible light sensor) that is configured to track a position and/or motion of the watch body 1654 and/or the watch band 1662. The watch band 1662 can transmit the data acquired by sensor 1664 to the watch body 1654 using a wired communication method (e.g., a Universal Asynchronous Receiver/Transmitter (UART), a USB transceiver, etc.) and/or a wireless communication method (e.g., near field communication, Bluetooth, etc.). The watch band 1662 can be configured to operate (e.g., to collect data using sensor 1664)

independent of whether the watch body 1654 is coupled to or decoupled from watch band 1662.

In some examples, the watch band 1662 can include a neuromuscular sensor 1665 (e.g., an EMG sensor, a mechanomyogram (MMG) sensor, a sonomyography (SMG) sensor, etc.). Neuromuscular sensor 1665 can sense a user's intention to perform certain motor actions. The sensed muscle intention can be used to control certain user interfaces displayed on the display 1656 of the wrist-wearable device 1650 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 1665 can be used to provide a user with an enhanced interaction with a physical object and/or a virtual object in an artificial-reality application generated by an artificial-reality system (e.g., user interface objects presented on the display 1656, or another computing device (e.g., a smartphone)). Signals from neuromuscular sensor 1665 can be obtained (e.g., sensed and recorded) by one or more neuromuscular sensors 1665 of the watch band 1662. Although FIG. 14A shows one neuromuscular sensor 1665, the watch band 1662 can include a plurality of neuromuscular sensors 1665 arranged circumferentially on an inside surface of the watch band 1662 such that the plurality of neuromuscular sensors 1665 contact the skin of the user. The watch band 1662 can include a plurality of neuromuscular sensors 1665 arranged circumferentially on an inside surface of the watch band 1662. Neuromuscular sensor 1665 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 1662 and/or watch body 1654 can include a haptic device 1663 (e.g., a vibratory haptic actuator) that is configured to provide haptic feedback (e.g., a cutaneous and/or kinesthetic sensation, etc.) to the user's skin. The sensors 1664 and 1665, and/or the haptic device 1663 can be configured to operate in conjunction with multiple applications including, without limitation, health monitoring, social media, game playing, and artificial reality (e.g., the applications associated with artificial reality).

The wrist-wearable device 1650 can include a coupling mechanism (also referred to as a cradle) for detachably coupling the watch body 1654 to the watch band 1662. A user can detach the watch body 1654 from the watch band 1662 in order to reduce the encumbrance of the wrist-wearable device 1650 to the user. The wrist-wearable device 1650 can include a coupling surface on the watch body 1654 and/or coupling mechanism(s) 1660 (e.g., a cradle, a tracker band, a support base, a clasp). A user can perform any type of motion to couple the watch body 1654 to the watch band 1662 and to decouple the watch body 1654 from the watch band 1662. For example, a user can twist, slide, turn, push, pull, or rotate the watch body 1654 relative to the watch band 1662, or a combination thereof, to attach the watch body 1654 to the watch band 1662 and to detach the watch body 1654 from the watch band 1662.

As shown in the example of FIG. 14A, the watch band coupling mechanism 1660 can include a type of frame or shell that allows the watch body 1654 coupling surface to be retained within the watch band coupling mechanism 1660. The watch body 1654 can be detachably coupled to the watch band 1662 through a friction fit, magnetic coupling, a rotation-based connector, a shear-pin coupler, a retention spring, one or more magnets, a clip, a pin shaft, a hook and loop fastener, or a combination thereof. In some examples, the watch body 1654 can be decoupled from the watch band 1662 by actuation of the release mechanism 1670. The release mechanism 1670 can include, without limitation, a button, a knob, a plunger, a handle, a lever, a fastener, a clasp, a dial, a latch, or a combination thereof.

As shown in FIGS. 14A-14B, the coupling mechanism 1660 can be configured to receive a coupling surface proximate to the bottom side of the watch body 1654 (e.g., a side opposite to a front side of the watch body 1654 where the display 1656 is located), such that a user can push the watch body 1654 downward into the coupling mechanism 1660 to attach the watch body 1654 to the coupling mechanism 1660. In some embodiments, the coupling mechanism 1660 can be configured to receive a top side of the watch body 1654 (e.g., a side proximate to the front side of the watch body 1654 where the display 1656 is located) that is pushed upward into the cradle, as opposed to being pushed downward into the coupling mechanism 1660. In some embodiments, the coupling mechanism 1660 is an integrated component of the watch band 1662 such that the watch band 1662 and the coupling mechanism 1660 are a single unitary structure.

The wrist-wearable device 1650 can include a single release mechanism 1670 or multiple release mechanisms 1670 (e.g., two release mechanisms 1670 positioned on opposing sides of the wrist-wearable device 1650 such as spring-loaded buttons). As shown in FIG. 14A, the release mechanism 1670 can be positioned on the watch body 1654 and/or the watch band coupling mechanism 1660. Although FIG. 14A shows release mechanism 1670 positioned at a corner of watch body 1654 and at a corner of watch band coupling mechanism 1660, the release mechanism 1670 can be positioned anywhere on watch body 1654 and/or watch band coupling mechanism 1660 that is convenient for a user of wrist-wearable device 1650 to actuate. A user of the wrist-wearable device 1650 can actuate the release mechanism 1670 by pushing, turning, lifting, depressing, shifting, or performing other actions on the release mechanism 1670. Actuation of the release mechanism 1670 can release (e.g., decouple) the watch body 1654 from the watch band coupling mechanism 1660 and the watch band 1662 allowing the user to use the watch body 1654 independently from watch band 1662. For example, decoupling the watch body 1654 from the watch band 1662 can allow the user to capture images using rear-facing image sensor 1625B.

FIG. 14B includes top views of examples of the wrist-wearable device 1650. The examples of the wrist-wearable device 1650 shown in FIGS. 14A-14B can include a coupling mechanism 1660 (as shown in FIG. 14B, the shape of the coupling mechanism can correspond to the shape of the watch body 1654 of the wrist-wearable device 1650). The watch body 1654 can be detachably coupled to the coupling mechanism 1660 through a friction fit, magnetic coupling, a rotation-based connector, a shear-pin coupler, a retention spring, one or more magnets, a clip, a pin shaft, a hook and loop fastener, or any combination thereof.

In some examples, the watch body 1654 can be decoupled from the coupling mechanism 1660 by actuation of a release mechanism 1670. The release mechanism 1670 can include, without limitation, a button, a knob, a plunger, a handle, a lever, a fastener, a clasp, a dial, a latch, or a combination thereof. In some examples, the wristband system functions can be executed independently in the watch body 1654, independently in the coupling mechanism 1660, and/or in communication between the watch body 1654 and the coupling mechanism 1660. The coupling mechanism 1660 can be configured to operate independently (e.g., execute functions independently) from watch body 1654. Additionally, or alternatively, the watch body 1654 can be configured to operate independently (e.g., execute functions independently) from the coupling mechanism 1660. As described below with reference to the block diagram of FIG. 14A, the coupling mechanism 1660 and/or the watch body 1654 can each include the independent resources required to independently execute functions. For example, the coupling mechanism 1660 and/or the watch body 1654 can each include a power source (e.g., a battery), a memory, data storage, a processor (e.g., a central processing unit (CPU)), communications, a light source, and/or input/output devices.

The wrist-wearable device 1650 can have various peripheral buttons 1672, 1674, and 1676, for performing various operations at the wrist-wearable device 1650. Also, various sensors, including one or both of the sensors 1664 and 1665, can be located on the bottom of the watch body 1654, and can optionally be used even when the watch body 1654 is detached from the watch band 1662.

FIG. 14C is a block diagram of a computing system 16000, according to at least one embodiment of the present disclosure. The computing system 16000 includes an electronic device 16002, which can be, for example, a wrist-wearable device. The wrist-wearable device 1650 described in detail above with respect to FIGS. 14A-14B is an example of the electronic device 16002, so the electronic device 16002 will be understood to include the components shown and described below for the computing system 16000. In some embodiments, all, or a substantial portion of the components of the computing system 16000 are included in a single integrated circuit. In some embodiments, the computing system 16000 can have a split architecture (e.g., a split mechanical architecture, a split electrical architecture) between a watch body (e.g., a watch body 1654 in FIGS. 14A-14B) and a watch band (e.g., a watch band 1662 in FIGS. 14A-14B). The electronic device 16002 can include a processor (e.g., a central processing unit 16004), a controller 16010, a peripherals interface 16014 that includes one or more sensors 16100 and various peripheral devices, a power source (e.g., a power system 16300), and memory (e.g., a memory 16400) that includes an operating system (e.g., an operating system 16402), data (e.g., data 16410), and one or more applications (e.g., applications 16430).

In some embodiments, the computing system 16000 includes the power system 16300 which includes a charger input 16302, a power-management integrated circuit (PMIC) 16304, and a battery 16306.

In some embodiments, a watch body and a watch band can each be electronic devices 16002 that each have respective batteries (e.g., battery 16306), and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 16300 to enable each to operate independently. The watch body and watch band can also share power (e.g., one can charge the other) via respective PMICs 16304 that can share power over power and ground conductors and/or over wireless charging antennas.

In some embodiments, the peripherals interface 16014 can include one or more sensors 16100. The sensors 16100 can include a coupling sensor 16102 for detecting when the electronic device 16002 is coupled with another electronic device 16002 (e.g., a watch body can detect when it is coupled to a watch band, and vice versa). The sensors 16100 can include imaging sensors 16104 for collecting imaging data, which can optionally be the same device as one or more of the cameras 16218. In some embodiments, the imaging sensors 16104 can be separate from the cameras 16218. In some embodiments the sensors include an SpO2 sensor 16106. In some embodiments, the sensors 16100 include an EMG sensor 16108 for detecting, for example muscular movements by a user of the electronic device 16002. In some embodiments, the sensors 16100 include a capacitive sensor 16110 for detecting changes in potential of a portion of a user's body. In some embodiments, the sensors 16100 include a heart rate sensor 16112. In some embodiments, the sensors 5100 include an inertial measurement unit (IMU) sensor 16114 for detecting, for example, changes in acceleration of the user's hand.

In some embodiments, the peripherals interface 16014 includes a near-field communication (NFC) component 16202, a global-position system (GPS) component 16204, a long-term evolution (LTE) component 16206, and or a Wi-Fi or Bluetooth communication component 16208.

In some embodiments, the peripherals interface includes one or more buttons (e.g., the peripheral buttons 1657, 1658, and 1659 in FIG. 14B), which, when selected by a user, cause operation to be performed at the electronic device 16002.

The electronic device 16002 can include at least one display 16212, for displaying visual affordances to the user, including user-interface elements and/or three-dimensional virtual objects. The display can also include a touch screen for inputting user inputs, such as touch gestures, swipe gestures, and the like.

The electronic device 16002 can include at least one speaker 16214 and at least one microphone 16216 for providing audio signals to the user and receiving audio input from the user. The user can provide user inputs through the microphone 16216 and can also receive audio output from the speaker 16214 as part of a haptic event provided by the haptic controller 16012.

The electronic device 16002 can include at least one camera 16218, including a front camera 16220 and a rear camera 16222. In some embodiments, the electronic device 16002 can be a head-wearable device, and one of the cameras 16218 can be integrated with a lens assembly of the head-wearable device.

One or more of the electronic devices 16002 can include one or more haptic controllers 16012 and associated componentry for providing haptic events at one or more of the electronic devices 16002 (e.g., a vibrating sensation or audio output in response to an event at the electronic device 16002). The haptic controllers 16012 can communicate with one or more electroacoustic devices, including a speaker of the one or more speakers 16214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 16012 can provide haptic events to that are capable of being sensed by a user of the electronic devices 16002. In some embodiments, the one or more haptic controllers 16012 can receive input signals from an application of the applications 16430.

Memory 16400 optionally includes high-speed random-access memory and optionally also includes non-volatile memory, such as one or more magnetic disk storage devices, flash memory devices, or other non-volatile solid-state memory devices. Access to the memory 16400 by other components of the electronic device 16002, such as the one or more processors of the central processing unit 16004, and the peripherals interface 16014 is optionally controlled by a memory controller of the controllers 16010.

In some embodiments, software components stored in the memory 16400 can include one or more operating systems 16402 (e.g., a Linux-based operating system, an Android operating system, etc.). The memory 16400 can also include data 16410, including structured data (e.g., SQL databases, MongoDB databases, GraphQL data, JSON data, etc.). The data 16410 can include profile data 16412, sensor data 16414, media file data 16414.

In some embodiments, software components stored in the memory 16400 include one or more applications 16430 configured to be perform operations at the electronic devices 16002. In some embodiments, the one or more applications 16430 include one or more communication interface modules 16432, one or more graphics modules 16434, one or more camera application modules 16436. In some embodiments, a plurality of applications 16430 can work in conjunction with one another to perform various tasks at one or more of the electronic devices 16002.

It should be appreciated that the electronic devices 16002 are only some examples of the electronic devices 16002 within the computing system 16000, and that other electronic devices 16002 that are part of the computing system 16000 can have more or fewer components than shown optionally combines two or more components, or optionally have a different configuration or arrangement of the components. The various components shown in FIG. 14C are implemented in hardware, software, firmware, or a combination thereof, including one or more signal processing and/or application-specific integrated circuits.

As illustrated by the lower portion of FIG. 14C, various individual components of a wrist-wearable device can be examples of the electronic device 16002. For example, some or all of the components shown in the electronic device 16002 can be housed or otherwise disposed in a combined watch device 16002A, or within individual components of the capsule device watch body 16002B, the cradle portion 16002C, and/or a watch band.

Figure 14D:
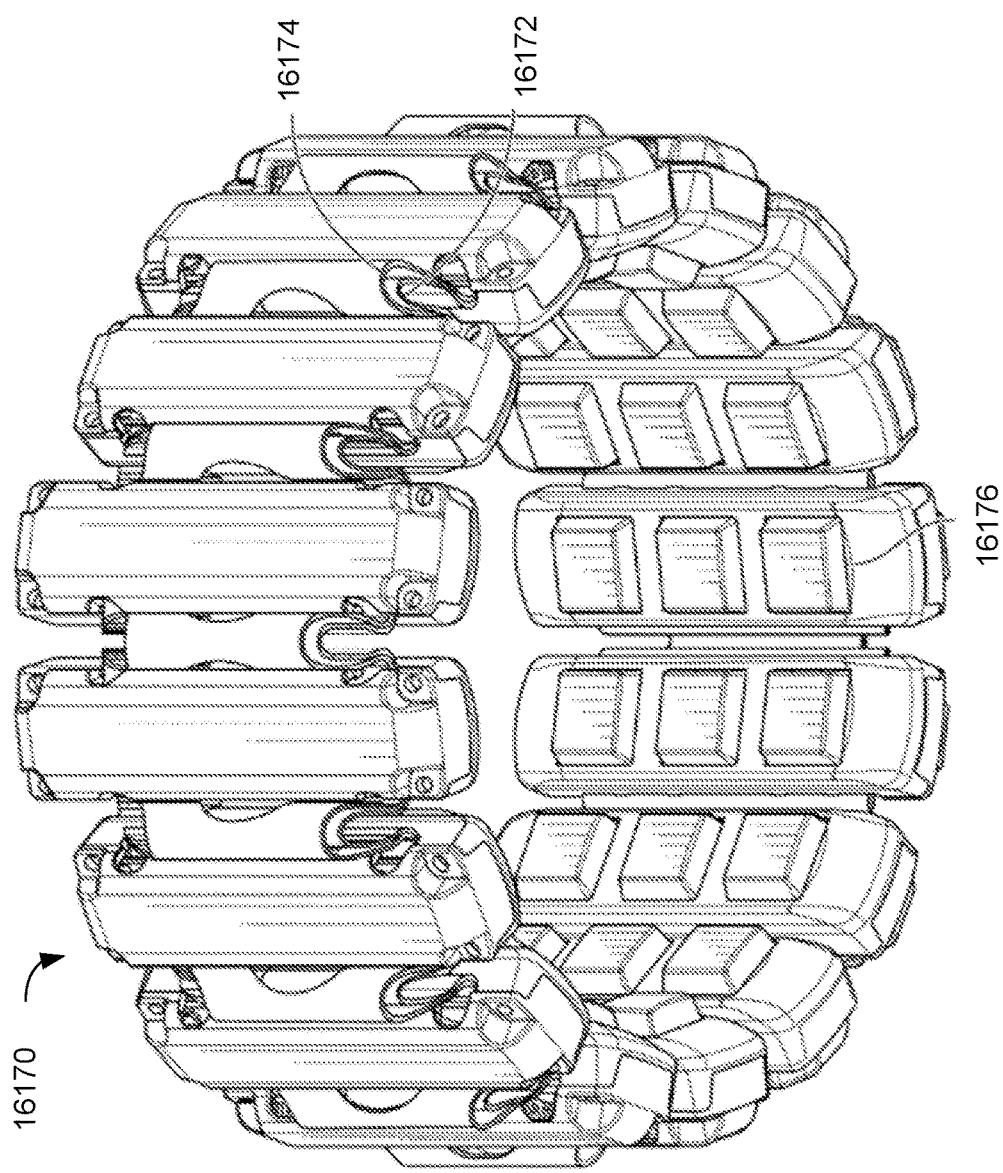

FIG. 14D illustrates a wearable device 16170, in accordance with some embodiments. In some embodiments, the wearable device 16170 is used to generate control information (e.g., sensed data about neuromuscular signals or instructions to perform certain commands after the data is sensed) for causing a computing device to perform one or more input commands. In some embodiments, the wearable device 16170 includes a plurality of neuromuscular sensors 16176. In some embodiments, the plurality of neuromuscular sensors 16176 includes a predetermined number of (e.g., sixteen) neuromuscular sensors (e.g., EMG sensors) arranged circumferentially around an elastic band 16174. The plurality of neuromuscular sensors 16176 may include any suitable number of neuromuscular sensors. In some embodiments, the number and arrangement of neuromuscular sensors 16176 depends on the particular application for which the wearable device 16170 is used. For instance, a wearable device 16170 configured as an armband, wristband, or chest-band may include a plurality of neuromuscular sensors 16176 with different number of neuromuscular sensors and different arrangement for each use case, such as medical use cases as compared to gaming or general day-to-day use cases. For example, at least 16 neuromuscular sensors 16176 may be arranged circumferentially around elastic band 16174.

In some embodiments, the elastic band 16174 is configured to be worn around a user's lower arm or wrist. The elastic band 16174 may include a flexible electronic connector 16172. In some embodiments, the flexible electronic connector 16172 interconnects separate sensors and electronic circuitry that are enclosed in one or more sensor housings. Alternatively, in some embodiments, the flexible electronic connector 16172 interconnects separate sensors and electronic circuitry that are outside of the one or more sensor housings. Each neuromuscular sensor of the plurality of neuromuscular sensors 16176 can include a skin-contacting surface that includes one or more electrodes. One or more sensors of the plurality of neuromuscular sensors 16176 can be coupled together using flexible electronics incorporated into the wearable device 16170. In some embodiments, one or more sensors of the plurality of neuromuscular sensors 16176 can be integrated into a woven fabric, wherein the fabric one or more sensors of the plurality of neuromuscular sensors 16176 are sewn into the fabric and mimic the pliability of fabric (e.g., the one or more sensors of the plurality of neuromuscular sensors 16176 can be constructed from a series woven strands of fabric). In some embodiments, the sensors are flush with the surface of the textile and are indistinguishable from the textile when worn by the user.

Figure 14E:
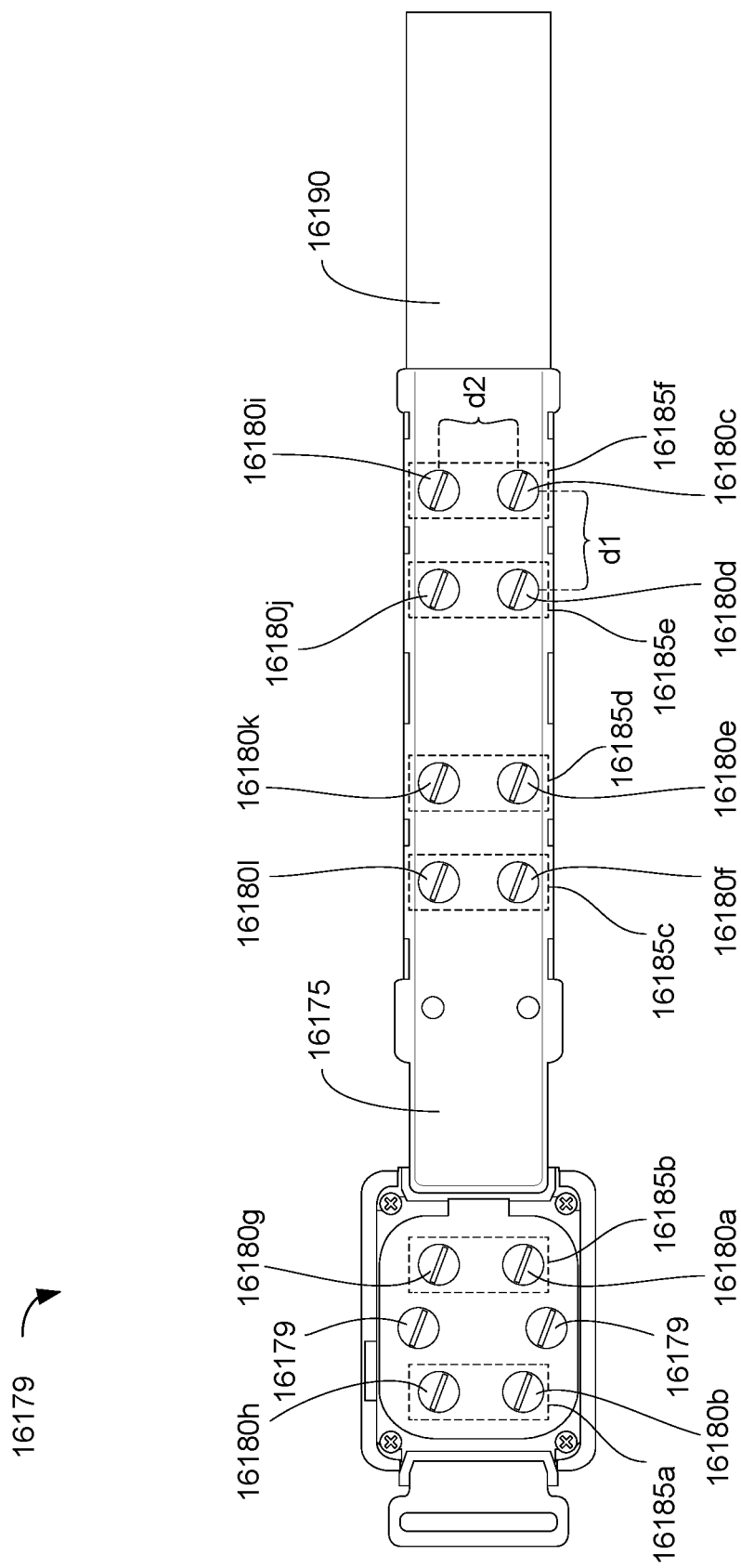

FIG. 14E illustrates a wearable device 16179 in accordance with some embodiments. The wearable device 16179 includes paired sensor channels 16185a-16185f along an interior surface of a wearable structure 16175 that are configured to detect neuromuscular signals. Different number of paired sensors channels can be used (e.g., one pair of sensors, three pairs of sensors, four pairs of sensors, or six pairs of sensors). The wearable structure 16175 can include a band portion 16190, a capsule portion 16195, and a cradle portion (not pictured) that is coupled with the band portion 16190 to allow for the capsule portion 16195 to be removably coupled with the band portion 16190. For embodiments in which the capsule portion 16195 is removable, the capsule portion 16195 can be referred to as a removable structure, such that in these embodiments the wearable device includes a wearable portion (e.g., band portion 16190 and the cradle portion) and a removable structure (the removable capsule portion which can be removed from the cradle). In some embodiments, the capsule portion 16195 includes the one or more processors and/or other components of the wearable device 1888 described above in reference to FIGS. 16A and 16B. The wearable structure 16175 is configured to be worn by a user 18015. More specifically, the wearable structure 16175 is configured to couple the wearable device 16179 to a wrist, arm, forearm, or other portion of the user's body. Each paired sensor channels 16185a-16185f includes two electrodes 16180 (e.g., electrodes 16180a-16180h) for sensing neuromuscular signals based on differential sensing within each respective sensor channel. In accordance with some embodiments, the wearable device 16170 further includes an electrical ground and a shielding electrode.

The techniques described above can be used with any device for sensing neuromuscular signals, including the arm-wearable devices of FIG. 14A-14C, but could also be used with other types of wearable devices for sensing neuromuscular signals (such as body-wearable or head-wearable devices that might have neuromuscular sensors closer to the brain or spinal column).

In some embodiments, a wrist-wearable device can be used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

Example Head-Wearable Devices

Figure 15A:
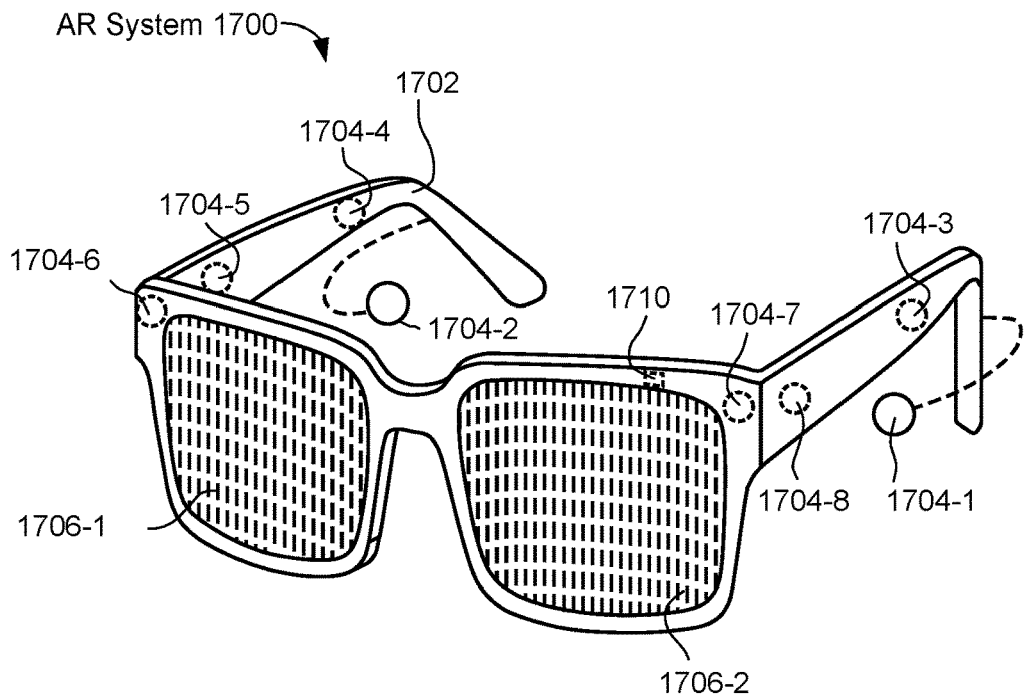
FIGS. 15A-15B illustrate an example AR system in accordance with some embodiments.

FIG. 15A shows an example AR system 1700 in accordance with some embodiments. In FIG. 15A, the AR system 1700 includes an eyewear device with a frame 1702 configured to hold a left display device 1706-1 and a right display device 1706-2 in front of a user's eyes. The display devices 1706-1 and 1706-2 may act together or independently to present an image or series of images to a user. While the AR system 1700 includes two displays, embodiments of this disclosure may be implemented in AR systems with a single near-eye display (NED) or more than two NEDs.

In some embodiments, the AR system 1700 includes one or more sensors, such as the acoustic sensors 1704. For example, the acoustic sensors 1704 can generate measurement signals in response to motion of the AR system 1700 and may be located on substantially any portion of the frame 1702. Any one of the sensors may be a position sensor, an IMU, a depth camera assembly, or any combination thereof. In some embodiments, the AR system 1700 includes more or fewer sensors than are shown in FIG. 15A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1700 includes a microphone array with a plurality of acoustic sensors 1704-1 through 1704-8, referred to collectively as the acoustic sensors 1704. The acoustic sensors 1704 may be transducers that detect air pressure variations induced by sound waves. In some embodiments, each acoustic sensor 1704 is configured to detect sound and convert the detected sound into an electronic format (e.g., an analog or digital format). In some embodiments, the microphone array includes ten acoustic sensors: 1704-1 and 1704-2 designed to be placed inside a corresponding ear of the user, acoustic sensors 1704-3, 1704-4, 1704-5, 1704-6, 1704-7, and 1704-8 positioned at various locations on the frame 1702, and acoustic sensors positioned on a corresponding neckband, where the neckband is an optional component of the system that is not present in certain embodiments of the artificial-reality systems discussed herein.

The configuration of the acoustic sensors 1704 of the microphone array may vary. While the AR system 1700 is shown in FIG. 15A having ten acoustic sensors 1704, the number of acoustic sensors 1704 may be more or fewer than ten. In some situations, using more acoustic sensors 1704 increases the amount of audio information collected and/or the sensitivity and accuracy of the audio information. In contrast, in some situations, using a lower number of acoustic sensors 1704 decreases the computing power required by a controller to process the collected audio information. In addition, the position of each acoustic sensor 1704 of the microphone array may vary. For example, the position of an acoustic sensor 1704 may include a defined position on the user, a defined coordinate on the frame 1702, an orientation associated with each acoustic sensor, or some combination thereof.

The acoustic sensors 1704-1 and 1704-2 may be positioned on different parts of the user's ear. In some embodiments, there are additional acoustic sensors on or surrounding the ear in addition to acoustic sensors 1704 inside the ear canal. In some situations, having an acoustic sensor positioned next to an ear canal of a user enables the microphone array to collect information on how sounds arrive at the ear canal. By positioning at least two of the acoustic sensors 1704 on either side of a user's head (e.g., as binaural microphones), the AR device 1700 is able to simulate binaural hearing and capture a 3D stereo sound field around a user's head. In some embodiments, the acoustic sensors 1704-1 and 1704-2 are connected to the AR system 1700 via a wired connection, and in other embodiments, the acoustic sensors 1704-1 and 1704-2 are connected to the AR system 1700 via a wireless connection (e.g., a Bluetooth connection). In some embodiments, the AR system 1700 does not include the acoustic sensors 1704-1 and 1704-2.

The acoustic sensors 1704 on the frame 1702 may be positioned along the length of the temples, across the bridge of the nose, above or below the display devices 1706, or in some combination thereof. The acoustic sensors 1704 may be oriented such that the microphone array is able to detect sounds in a wide range of directions surrounding the user that is wearing the AR system 1700. In some embodiments, a calibration process is performed during manufacturing of the AR system 1700 to determine relative positioning of each acoustic sensor 1704 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1700 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 1700. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1700. For example, the controller may process information from the acoustic sensors 1704. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1700 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 1750 in FIG. 15B, which mostly or completely covers a user's field of view.

Figure 15B:
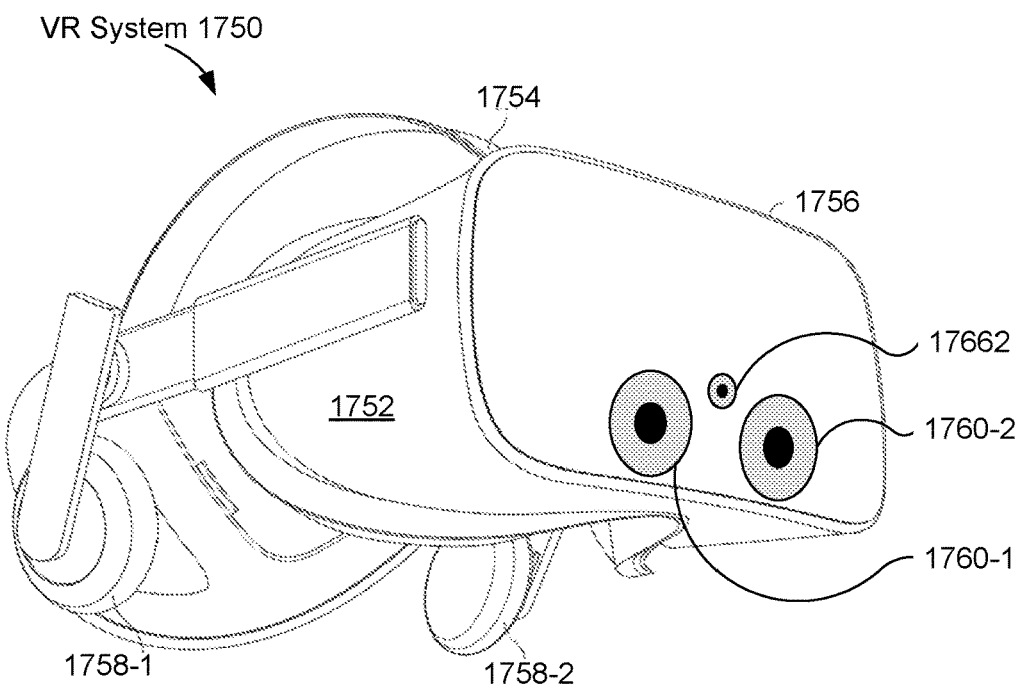

FIG. 15B shows a VR system 1750 (e.g., also referred to herein as VR headsets or VR headset) in accordance with some embodiments. The VR system 1750 includes a head-mounted display (HMD) 1752. The HMD 1752 includes a front body 1756 and a frame 1754 (e.g., a strap or band) shaped to fit around a user's head. In some embodiments, the HMD 1752 includes output audio transducers 1758-1 and 1758-2, as shown in FIG. 15B (e.g., transducers). In some embodiments, the front body 1756 and/or the frame 1754 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 1700 and/or the VR system 1750 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1700 and/or the VR system 1750 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 1700 and/or the VR system 1750 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 15B shows VR system 1750 having cameras 1760-1 and 1760-2 that can be used to provide depth information for creating a voxel field and a two-dimensional mesh to provide object information to the user to avoid collisions. FIG. 15B also shows that the VR system includes one or more additional cameras 1762 that are configured to augment the cameras 1760-1 and 1760-2 by providing more information. For example, the additional cameras 1762 can be used to supply color information that is not discerned by cameras 1760-1 and 1760-2. In some embodiments, cameras 1760-1 and 1760-2 and additional cameras 1762 can include an optional IR cut filter configured to remove IR light from being received at the respective camera sensors.

In some embodiments, the AR system 1700 and/or the VR system 1750 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 15A-15B, but could also be used with other types of wearable devices for sensing neuromuscular signals (such as body-wearable or head-wearable devices that might have neuromuscular sensors closer to the brain or spinal column). Having thus described example wrist-wearable device and head-wearable devices, attention will now be turned to example feedback systems that can be integrated into the devices described above or be a separate device.

Example Systems

Figure 16A:
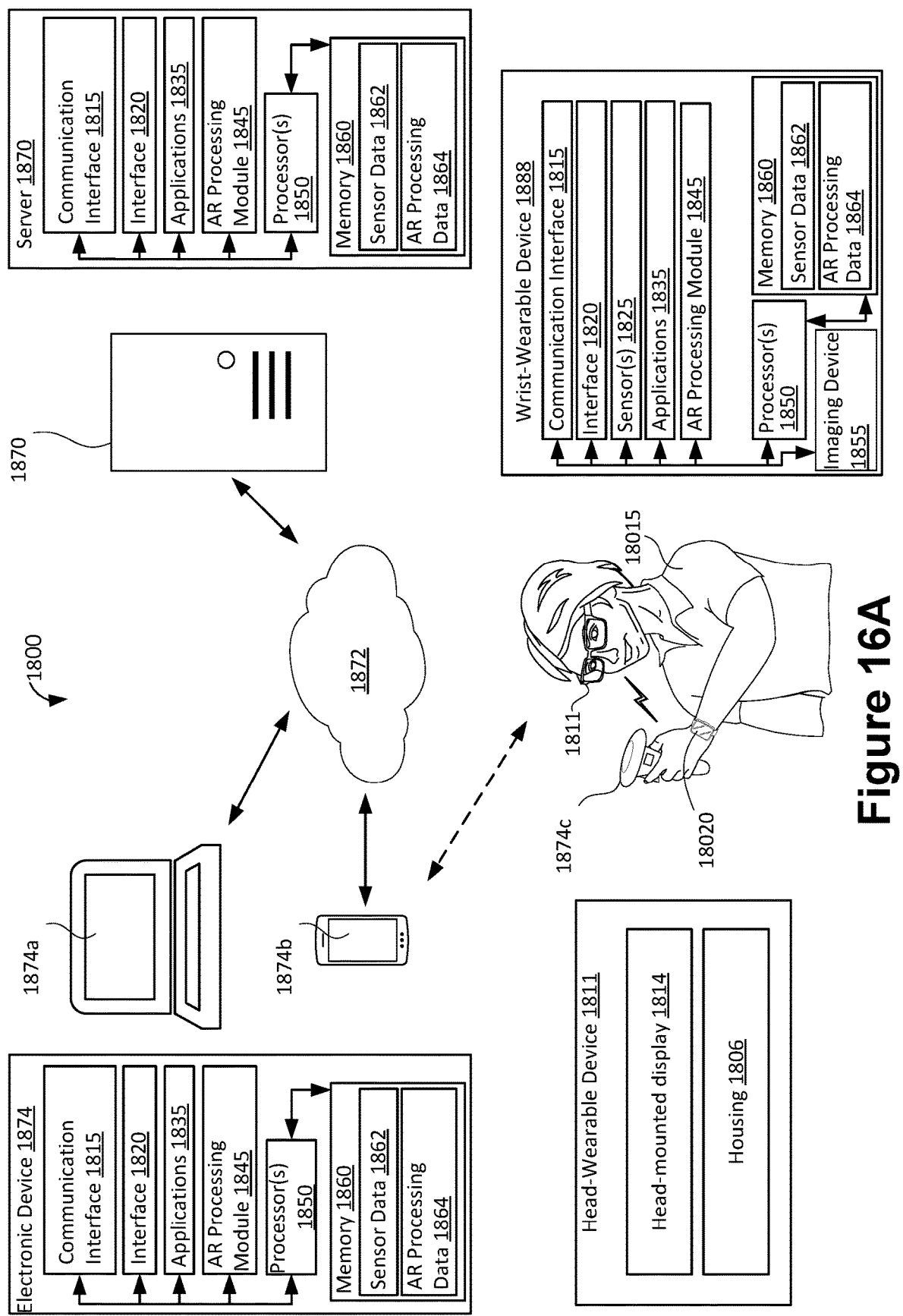
FIGS. 16A and 16B are block diagrams illustrating an example artificial-reality system in accordance with some embodiments.
Figure 16B:
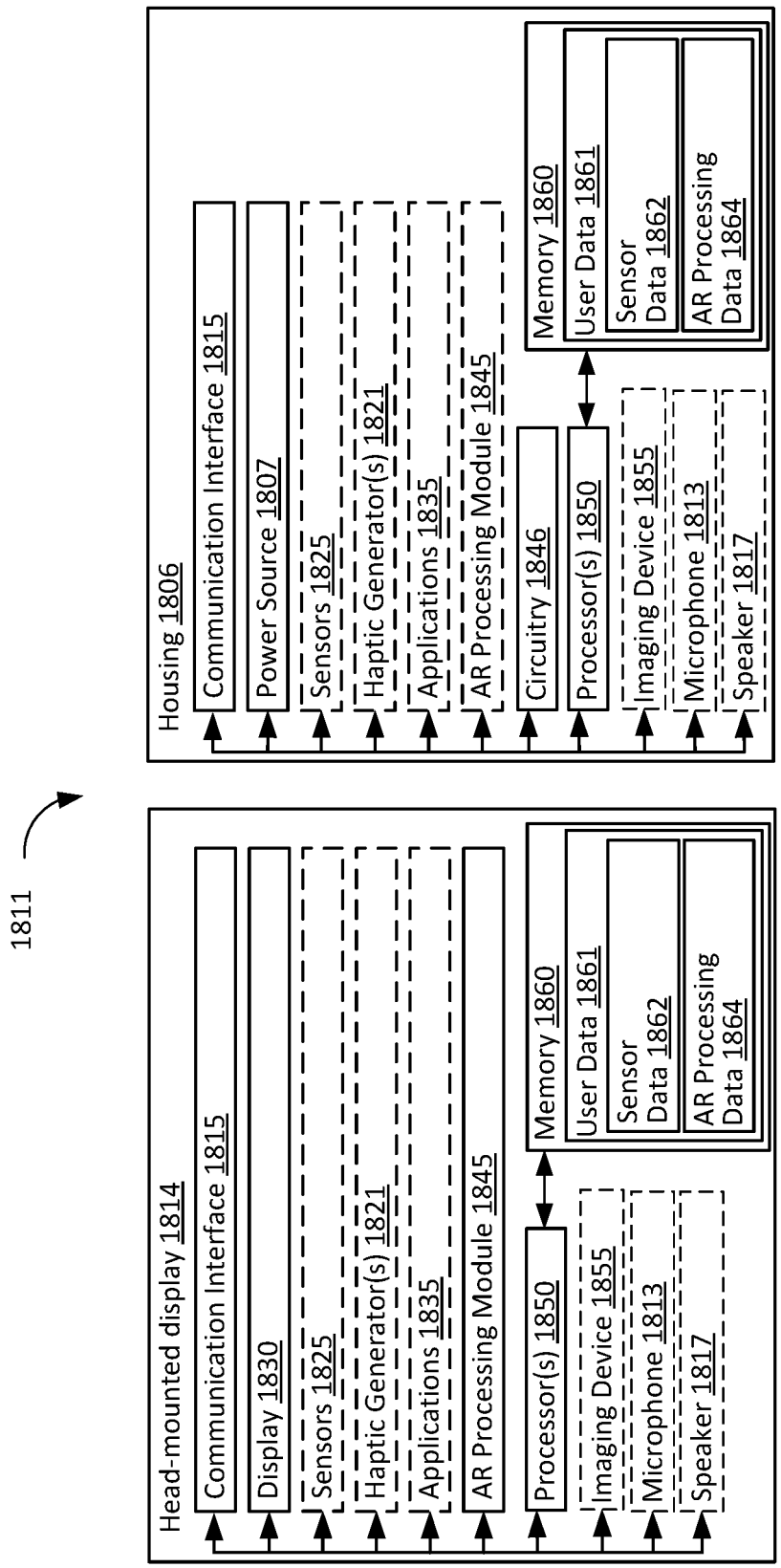

FIGS. 16A and 16B are block diagrams illustrating an example artificial-reality system in accordance with some embodiments. The system 1800 includes one or more devices for facilitating an interactivity with an artificial-reality environment in accordance with some embodiments. For example, the head-wearable device 1811 can present to the user 18015 with a user interface within the artificial-reality environment. As a non-limiting example, the system 1800 includes one or more wearable devices, which can be used in conjunction with one or more computing devices. In some embodiments, the system 1800 provides the functionality of a virtual-reality device, an augmented-reality device, a mixed-reality device, hybrid-reality device, or a combination thereof. In some embodiments, the system 1800 provides the functionality of a user interface and/or one or more user applications (e.g., games, word processors, messaging applications, calendars, clocks, etc.).

The system 1800 can include one or more of servers 1870, electronic devices 1874 (e.g., a computer, 1874*a*, a smartphone 1874*b*, a controller 1874*c*, and/or other devices), head-wearable devices 1811 (e.g., the AR system 1700 or the VR system 1750), and/or wrist-wearable devices 1888 (e.g., the wrist-wearable device 18020). In some embodiments, the one or more of servers 1870, electronic devices 1874, head-wearable devices 1811, and/or wrist-wearable devices 1888 are communicatively coupled via a network 1872. In some embodiments, the head-wearable device 1811 is configured to cause one or more operations to be performed by a communicatively coupled wrist-wearable device 1888, and/or the two devices can also both be connected to an intermediary device, such as a smartphone 1874*b*, a controller 1874*c*, or other device that provides instructions and data to and between the two devices. In some embodiments, the head-wearable device 1811 is configured to cause one or more operations to be performed by multiple devices in conjunction with the wrist-wearable device 1888. In some embodiments, instructions to cause the performance of one or more operations are controlled via an artificial-reality processing module 1845. The artificial-reality processing module 1845 can be implemented in one or more devices, such as the one or more of servers 1870, electronic devices 1874, head-wearable devices 1811, and/or wrist-wearable devices 1888. In some embodiments, the one or more devices perform operations of the artificial-reality processing module 1845, using one or more respective processors, individually or in conjunction with at least one other device as described herein. In some embodiments, the system 1800 includes other wearable devices not shown in FIG. 16A and FIG. 16B, such as rings, collars, anklets, gloves, and the like.

In some embodiments, the system 1800 provides the functionality to control or provide commands to the one or more computing devices 1874 based on a wearable device (e.g., head-wearable device 1811 or wrist-wearable device 1888) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1860. Similar to the motor actions, the one or more processors 1850 can use the detected neuromuscular signals by the one or more sensors 1825 to determine that a user-defined gesture was performed by the user.

The electronic devices 1874 can also include a communication interface 1815, an interface 1820 (e.g., including one or more displays, lights, speakers, and haptic generators), one or more sensors 1825, one or more applications 1835, an artificial-reality processing module 1845, one or more processors 1850, and memory 1860. The electronic devices 1874 are configured to communicatively couple with the wrist-wearable device 1888 and/or head-wearable device 1811 (or other devices) using the communication interface 1815. In some embodiments, the electronic devices 1874 are configured to communicatively couple with the wrist-wearable device 1888 and/or head-wearable device 1811 (or other devices) via an application programming interface (API). In some embodiments, the electronic devices 1874 operate in conjunction with the wrist-wearable device 1888 and/or the head-wearable device 1811 to determine a hand gesture and cause the performance of an operation or action at a communicatively coupled device.

The server 1870 includes a communication interface 1815, one or more applications 1835, an artificial-reality processing module 1845, one or more processors 1850, and memory 1860. In some embodiments, the server 1870 is configured to receive sensor data from one or more devices, such as the head-wearable device 1811, the wrist-wearable device 1888, and/or electronic device 1874, and use the received sensor data to identify a gesture or user input. The server 1870 can generate instructions that cause the performance of operations and actions associated with a determined gesture or user input at communicatively coupled devices, such as the head-wearable device 1811.

The head-wearable device 1811 includes smart glasses (e.g., the augmented-reality glasses), artificial reality headsets (e.g., VR/AR headsets), or other head worn device. In some embodiments, one or more components of the head-wearable device 1811 are housed within a body of the HM4D 1814 (e.g., frames of smart glasses, a body of an AR headset, etc.). In some embodiments, one or more components of the head-wearable device 1811 are stored within or coupled with lenses of the HM4D 1814. Alternatively, or additionally, in some embodiments, one or more components of the head-wearable device 1811 are housed within a modular housing 1806. The head-wearable device 1811 is configured to communicatively couple with other electronic device 1874 and/or a server 1870 using communication interface 1815 as discussed above.

FIG. 16B describes additional details of the HM4D 1814 and modular housing 1806 described above in reference to 16A, in accordance with some embodiments. The housing 1806 include(s) a communication interface 1815, circuitry 1846, a power source 1807 (e.g., a battery for powering one or more electronic components of the housing 1806 and/or providing usable power to the HMD 1814), one or more processors 1850, and memory 1860. In some embodiments, the housing 1806 can include one or more supplemental components that add to the functionality of the HM4D 1814. For example, in some embodiments, the housing 1806 can include one or more sensors 1825, an AR processing module 1845, one or more haptic generators 1821, one or more imaging devices 1855, one or more microphones 1813, one or more speakers 1817, etc. The housing 106 is configured to couple with the HMD 1814 via the one or more retractable side straps. More specifically, the housing 1806 is a modular portion of the head-wearable device 1811 that can be removed from head-wearable device 1811 and replaced with another housing (which includes more or less functionality). The modularity of the housing 1806 allows a user to adjust the functionality of the head-wearable device 1811 based on their needs.

In some embodiments, the communications interface 1815 is configured to communicatively couple the housing 1806 with the HMD 1814, the server 1870, and/or other electronic device 1874 (e.g., the controller 1874c, a tablet, a computer, etc.). The communication interface 1815 is used to establish wired or wireless connections between the housing 1806 and the other devices. In some embodiments, the communication interface 1815 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1806 is configured to communicatively couple with the HMD 1814 and/or other electronic device 1874 via an application programming interface (API).

In some embodiments, the power source 1807 is a battery. The power source 1807 can be a primary or secondary battery source for the HMD 1814. In some embodiments, the power source 1807 provides useable power to the one or more electrical components of the housing 1806 or the HMD 1814. For example, the power source 1807 can provide usable power to the sensors 1821, the speakers 1817, the HMD 1814, and the microphone 1813. In some embodiments, the power source 1807 is a rechargeable battery. In some embodiments, the power source 1807 is a modular battery that can be removed and replaced with a fully charged battery while it is charged separately.

The one or more sensors 1825 can include heart rate sensors, neuromuscular-signal sensors (e.g., EMG sensors)), SpO2 sensors, altimeters, thermal sensors or thermal couples, ambient light sensors, ambient noise sensors, and/or inertial measurement units (IMU)s. Additional non-limiting examples of the one or more sensors 1825 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1825 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 1825 can include location sensing devices (e.g., GPS) configured to provide location information. In some embodiment, the data measured or sensed by the one or more sensors 1825 is stored in memory 1860. In some embodiments, the housing 1806 receives sensor data from communicatively coupled devices, such as the HM4D 1814, the server 1870, and/or other electronic device 1874. Alternatively, the housing 1806 can provide sensors data to the HM4D 1814, the server 1870, and/or the other electronic device 1874.

The one or more haptic generators 1821 can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1821 are hydraulic, pneumatic, electric, and/or mechanical actuators. In some embodiments, the one or more haptic generators 1821 are part of a surface of the housing 1806 that can be used to generate a haptic response (e.g., a thermal change at the surface, a tightening or loosening of a band, increase or decrease in pressure, etc.). For example, the one or more haptic generators 1821 can apply vibration stimulations, pressure stimulations, squeeze simulations, shear stimulations, temperature changes, or some combination thereof to the user. In addition, in some embodiments, the one or more haptic generators 1821 include audio generating devices (e.g., speakers 1817 and other sound transducers) and illuminating devices (e.g., light-emitting diodes (LED)s, screen displays, etc.). The one or more haptic generators 1821 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1835 include social-media applications, banking applications, health applications, messaging applications, web browsers, gaming application, streaming applications, media applications, imaging applications, productivity applications, social applications, etc. In some embodiments, the one or more applications 1835 include artificial reality applications. The one or more applications 1835 are configured to provide data to the head-wearable device 1811 for performing one or more operations. In some embodiments, the one or more applications 1835 can be displayed via a display 1830 of the head-wearable device 1811 (e.g., via the HMD 1814).

In some embodiments, instructions to cause the performance of one or more operations are controlled via an artificial reality (AR) processing module 1845. The AR processing module 1845 can be implemented in one or more devices, such as the one or more of servers 1870, electronic devices 1874, head-wearable devices 1811, and/or wrist-wearable devices 1870. In some embodiments, the one or more devices perform operations of the AR processing module 1845, using one or more respective processors, individually or in conjunction with at least one other device as described herein. In some embodiments, the AR processing module 1845 is configured process signals based at least on sensor data. In some embodiments, the AR processing module 1845 is configured process signals based on image data received that captures at least a portion of the user hand, mouth, facial expression, surrounding, etc. For example, the housing 1806 can receive EMG data and/or IMU data from one or more sensors 1825 and provide the sensor data to the AR processing module 1845 for a particular operation (e.g., gesture recognition, facial recognition, etc.). The AR processing module 1845, causes a device communicatively coupled to the housing 1806 to perform an operation (or action). In some embodiments, the AR processing module 1845 performs different operations based on the sensor data and/or performs one or more actions based on the sensor data.

In some embodiments, the one or more imaging devices 1855 can include an ultra-wide camera, a wide camera, a telephoto camera, a depth-sensing cameras, or other types of cameras. In some embodiments, the one or more imaging devices 1855 are used to capture image data and/or video data. The imaging devices 1855 can be coupled to a portion of the housing 1806. The captured image data can be processed and stored in memory and then presented to a user for viewing. The one or more imaging devices 1855 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 1855 is stored in memory 1860 (which can include volatile and non-volatile memory such that the image data and/or video data can be temporarily or permanently stored, as needed depending on the circumstances).

The circuitry 1846 is configured to facilitate the interaction between the housing 1806 and the HMD 1814. In some embodiments, the circuitry 1846 is configured to regulate the distribution of power between the power source 1807 and the HMD 1814. In some embodiments, the circuitry 746 is configured to transfer audio and/or video data between the HMD 1814 and/or one or more components of the housing 1806.

The one or more processors 1850 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1860. The memory 1860 may be or include random access memory (RAM), read-only memory (ROM), dynamic random-access memory (DRAM), static random-access memory (SRAM) and magnetoresistive random access memory (MRAM), and may include firmware, such as static data or fixed instructions, basic input/output system (BIOS), system functions, configuration data, and other routines used during the operation of the housing and the processor 1850. The memory 1860 also provides a storage area for data and instructions associated with applications and data handled by the processor 1850.

In some embodiments, the memory 1860 stores at least user data 1861 including sensor data 1862 and AR processing data 1864. The sensor data 1862 includes sensor data monitored by one or more sensors 1825 of the housing 1806 and/or sensor data received from one or more devices communicative coupled with the housing 1806, such as the HMD 1814, the smartphone 1874b, the controller 1874c, etc. The sensor data 1862 can include sensor data collected over a predetermined period of time that can be used by the AR processing module 1845. The AR processing data 1864 can include one or more one or more predefined camera-control gestures, user defined camera-control gestures, predefined non-camera-control gestures, and/or user defined non-camera-control gestures. In some embodiments, the AR processing data 1864 further includes one or more predetermined threshold for different gestures.

The HMD 1814 includes a communication interface 1815, a display 1830, an AR processing module 1845, one or more processors, and memory. In some embodiments, the HNID 1814 includes one or more sensors 1825, one or more haptic generators 1821, one or more imaging devices 1855 (e.g., a camera), microphones 1813, speakers 1817, and/or one or more applications 1835. The HMD 1814 operates in conjunction with the housing 1806 to perform one or more operations of a head-wearable device 1811, such as capturing camera data, presenting a representation of the image data at a coupled display, operating one or more applications 1835, and/or allowing a user to participate in an AR environment.

Having thus described system-block diagrams and then example wearable devices, attention will now be directed to certain example embodiments.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
    displaying, on a display of a wrist-wearable device, a watch-face user interface including a plurality of representations of contacts, including:
        a first representation of a first contact associated with an image-sharing application, and
        a second representation of a second contact associated with a fitness application that allows a user of the wrist-wearable device to compare performance of a physical activity against at least the second contact, the fitness application being distinct from the image-sharing application;
    responsive to occurrence of a first user input selecting the first representation of the first contact from within the watch-face user interface and while data from an imaging device is not displayed to the user:
        ceasing to display the watch-face user interface and the plurality of representations of contacts, and
        causing activation of an imaging device for capturing an image of the physical world using the imaging device; and
    while the imaging device is activated and responsive to occurrence of a second user input:
        capturing an image using the imaging device, and
        after capturing the image using the imaging device, causing the image to be sent to the first contact via the image-sharing application.

2. The method of claim 1, further comprising, responsive to the occurrence of the first user input and in conjunction with activating the imaging device, displaying a user interface that allows for capturing the image using the imaging device.

3. The method of claim 2, wherein the user interface that allows for capturing the image using the imaging device includes a user interface element that when selected causes the wrist-wearable device to display a conversation thread of the image-sharing application, the conversation thread including images shared between a user of the wrist-wearable device and at least the first contact.

4. The method of claim 1, wherein causing the image to be sent to the first contact includes sending the image in a conversation thread of the image-sharing application, the conversation thread including images shared between a user of the wrist-wearable device and at least the first contact.

5. The method of claim 1, wherein capturing the image using the imaging device includes capturing a plurality of images, and the method further comprises:
    before causing the image to be sent to the first contact, displaying user interface elements associated with each image of the plurality of images; and
    responsive to occurrence of an additional user input that selects a respective user interface element associated with the image, causing the image to be sent to the first contact.

6. The method of claim 1, further comprising:
    responsive to occurrence of an additional user input selecting the second representation of the second contact from within the watch-face user interface:
        ceasing to display the watch-face user interface and the plurality of representations of contacts,
        causing activation of the fitness application, and
        displaying a user interface that allows for monitoring performance of a physical activity; and
    notifying the second contact that the user is currently performing the physical activity.

7. The method of claim 1, wherein displaying, on the display of the wrist-wearable device, the watch-face user interface includes displaying a third representation of a third contact that is associated with the image-sharing application, and the method further comprises:
    responsive to occurrence of an additional user input selecting the third representation of the third contact from within the watch-face user interface and while data from an imaging device is not displayed to the user:
        ceasing to display the watch-face user interface and the plurality of representations of contacts,
        causing activation of the imaging device for capturing another image of the physical world using the imaging device; and
    while the imaging device is activated and responsive to occurrence of one more user input:
        capturing the other image using the imaging device, and
        after capturing the other image using the imaging device, causing the other image to be sent to the third contact via the image-sharing application.

8. The method of claim 1, further comprising:
    before displaying, on the display of the wrist-wearable device, the watch-face user interface including the plurality of representations of contacts:
        determining based on previous user actions with a respective contact, a respective application, selected from among multiple available applications, to associate with each representation of the plurality of representations of contacts, such that:
            the first contact is associated with the image-sharing application based on the previous user actions indicating that a user of the wrist-wearable device frequently interacts with the first contact via the image-sharing application, and the second contact is associated with the fitness application based on the previous user actions indicating that the user of the wrist-wearable device frequently interacts with the second contact via the fitness application.

9. The method of claim 1, wherein the first user input selecting the first representation of the first contact is a long press that remains in contact with a portion of the display of the wrist-wearable device used to display the first representation of the first contact for at least a predefined period of time, the method comprising:
responsive to occurrence of the long press and before imaging device is activated, displaying, on the display of the wrist-wearable device, a plurality of user interface elements, each interface element including one or more image capture modes available for the imaging device.

10. The method of claim 1, wherein the plurality of representations of contacts move around to different respective positions within the watch-face user interface based on one or more of movement of a user that is wearing the wrist-wearable device and activity of a respective contact associated with the respective representation.

11. The method of claim 1, wherein the plurality of representations of contacts displayed on the watch-face user interface include:
a third representation of a third contact that is associated with a messaging application that allows the user of the wrist-wearable device to view messages between the user and the third contact, the messaging application being distinct from the image-sharing and fitness applications, and
a fourth representation of a fourth contact that is associated with a calling application that allows the user of the wrist-wearable device to initiate or participate in audio and/or video calls between the user and the fourth contact, the calling application being distinct from the image-sharing application, the fitness application, and the messaging application.

12. The method of claim 1, causing activation of the imaging device includes:
in accordance with a determination that the wrist-wearable device is communicatively coupled with a head-worn wearable device that includes the imaging device: causing activation of the imaging device by sending an instruction to the head-worn wearable device that is communicatively coupled to the wrist-wearable device.

13. The method of claim 12, further comprising one or more of:
while the imaging device of the head-worn wearable device is activated, displaying on the display of the wrist-wearable device a user interface that includes a live image from the imaging device of the head-worn wearable device; and
wherein one or more of:
the first user input is a single tap input over the first representation of the first contact,
the first user input selecting the first representation of the first contact causes the wrist-wearable device to present one or more images received from and/or sent to the first contact associated via the image-sharing application within a predetermined period of time,
at least one respective contact associated with one of the plurality of representations of contacts is user selected for inclusion on the watch-face user interface, and an association between the at least one respective contact and a respective application is also user selected, and
the first contact includes a first plurality of contacts.

14. A wrist-wearable device, comprising:
a display;
one or more processors; and
memory comprising instructions that, when executed by the wrist-wearable device, cause performance of operations for:
displaying, on the display of the wrist-wearable device, a watch-face user interface including a plurality of representations of contacts, including:
a first representation of a first contact associated with an image-sharing application, and
a second representation of a second contact associated with a fitness application that allows a user of the wrist-wearable device to compare performance of a physical activity against at least the second contact, the fitness application being distinct from the image-sharing application;
responsive to occurrence of a first user input selecting the first representation of the first contact from within the watch-face user interface and while data from an imaging device is not displayed to the user:
ceasing to display the watch-face user interface and the plurality of representations of contacts, and
causing activation of an imaging device for capturing an image of the physical world using the imaging device; and
while the imaging device is activated and responsive to occurrence of a second user input:
capturing an image using the imaging device, and
after capturing the image using the imaging device, causing the image to be sent to the first contact via the image-sharing application.

15. The wrist-wearable device of claim 14, wherein the instructions, when executed by the wrist-wearable device, further cause the wrist-wearable device to perform responsive to the occurrence of the first user input and in conjunction with activating the imaging device, displaying a user interface that allows for capturing the image using the imaging device.

16. The wrist-wearable device of claim 14, wherein causing the image to be sent to the first contact includes sending the image in a conversation thread of the image-sharing application, the conversation thread including images shared between a user of the wrist-wearable device and at least the first contact.

17. A non-transitory, computer-readable storage medium including instructions that, when executed by a wrist-wearable device including one or more processors for executing the instructions, cause the wrist-wearable device to perform or cause performance of operations for:
display, on a display of the wrist-wearable device, a watch-face user interface including a plurality of representations of contacts, including:
a first representation of a first contact associated with an image-sharing application, and
a second representation of a second contact associated with a fitness application that allows a user of the wrist-wearable device to compare performance of a physical activity against at least the second contact, the fitness application being distinct from the image-sharing application;
responsive to occurrence of a first user input selecting the first representation of the first contact from within the watch-face user interface and while data from an imaging device is not displayed to the user:
  cease to display the watch-face user interface and the plurality of representations of contacts, and
  cause activation of an imaging device for capturing an image of the physical world using the imaging device; and
while the imaging device is activated and responsive to occurrence of a second user input:
  capture an image using the imaging device, and
  after capturing the image using the imaging device, cause the image to be sent to the first contact via the image-sharing application.

18. The non-transitory, computer-readable storage medium of claim 17, wherein the instructions, when executed by the wrist-wearable device, further cause the wrist-wearable device to perform responsive to the occurrence of the first user input and in conjunction with activating the imaging device, displaying a user interface that allows for capturing the image using the imaging device.

19. The non-transitory, computer-readable storage medium of claim 17, wherein causing the image to be sent to the first contact includes sending the image in a conversation thread of the image-sharing application, the conversation thread including images shared between a user of the wrist-wearable device and at least the first contact.

20. The non-transitory, computer-readable storage medium of claim 17, wherein capturing the image using the imaging device includes capturing a plurality of images, and the instructions, when executed by the wrist-wearable device, further cause the wrist-wearable device to perform:
  before causing the image to be sent to the first contact, displaying user interface elements associated with each image of the plurality of images; and
  responsive to occurrence of an additional user input that selects a respective user interface element associated with the image, causing the image to be sent to the first contact.

* * * * *